(12) United States Patent
Ogawa

(10) Patent No.: US 6,686,017 B2
(45) Date of Patent: *Feb. 3, 2004

(54) OPTICAL RECORDING FILM, METHOD FOR MANUFACTURING THE SAME, OPTICAL RECORDING MEDIUM, METHOD FOR MANUFACTURING THE SAME, OPTICAL RECORDING METHOD, INFORMATION RECORDING/ REPRODUCING APPARATUS, INFORMATION REPRODUCING/ RECORDING METHOD, COMPUTER SYSTEM AND VIDEO SIGNAL RECORDING/ REPRODUCING SYSTEM

(75) Inventor: Kazufumi Ogawa, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 68 days.

This patent is subject to a terminal disclaimer.

(21) Appl. No.: 10/084,811

(22) Filed: Feb. 25, 2002

(65) Prior Publication Data

US 2002/0119279 A1 Aug. 29, 2002

(30) Foreign Application Priority Data

Feb. 28, 2001 (JP) .................................. 2001-053400
Mar. 30, 2001 (JP) .................................. 2001-097834

(51) Int. Cl.$^7$ .................................. B32B 3/02
(52) U.S. Cl. .................. 428/64.1; 428/64.4; 428/447; 428/913
(58) Field of Search .................. 428/64.1, 64.4, 428/447, 913; 430/20, 270.14, 495.1, 945

(56) References Cited

U.S. PATENT DOCUMENTS 5,324,548 A 6/1994 Ogawa et al.
5,489,451 A 2/1996 Omeis et al.
2003/0003381 A1 * 1/2003 Ogawa ........................ 430/20

FOREIGN PATENT DOCUMENTS

EP  0 445 534 A   9/1991
JP  3-229711      10/1991
JP  7-187897      7/1995

OTHER PUBLICATIONS

US 5,846,542, 12/1998, Gibbons et al. (withdrawn)

European Search Report, Jun. 2002.

* cited by examiner

Primary Examiner—Elizabeth Mulvaney
(74) Attorney, Agent, or Firm—Merchant & Gould P.C.

(57) ABSTRACT

An optical recording film includes a chemisorptive thin film with orienting properties fixed directly or through a primer layer to a substrate surface, and a coating formed on a surface of the chemisorptive thin film. The coating has an initial molecule orientation attained by aligning a group of polymerizable molecules in a predetermined direction on the surface of the chemisorptive thin film, and polymerizing the polymerizable molecules to one another. Regions with changed initial molecule orientation and regions with unchanged initial molecule orientation of the coating are formed when selectively irradiating the coating with light that changes the initial molecule orientation, thus making optical information recording possible. It is also possible to introduce photodegrading functional groups into the coating. By introducing functional groups whose orientation is changed by light or functional group that are degraded by light, an optical recording film allowing optical recording and an optical recording medium using the same are provided.

100 Claims, 15 Drawing Sheets

White bars represent
$C_6H_5-CH-CO-C_6H_4-O-(CH_2)_6-O-$

OPTICAL RECORDING FILM, METHOD FOR MANUFACTURING THE SAME, OPTICAL RECORDING MEDIUM, METHOD FOR MANUFACTURING THE SAME, OPTICAL RECORDING METHOD, INFORMATION RECORDING/ REPRODUCING APPARATUS, INFORMATION REPRODUCING/ RECORDING METHOD, COMPUTER SYSTEM AND VIDEO SIGNAL RECORDING/ REPRODUCING SYSTEM

FIELD OF THE INVENTION

The present invention relates to a write-once (information can be written once, thereafter it can only be reproduced) optical recording film, a method for manufacturing the same, an optical recording medium, a method for manufacturing the same, an information recording/reproducing apparatus using the same, a computer system using the same, and a video signal recording/reproducing system.

BACKGROUND OF THE INVENTION

Recently, the amount of electronic information has risen dramatically, so that there is a need for the development of high-capacity low-cost optical information storage media. High-capacity low-cost optical information storage media are for example in high demand for recording video information of various formats and as supplemental storage media for computers. Most of the high-capacity optical information recording media that are currently under development use magnetic recording, optomagnetic recording or phase-change recording.

In magnetic recording, a super-thin layer of a metallic magnetic material is provided in a medium substrate, so that information is recorded by magnetizing the magnetic material by irradiation with magnetic force lines.

In optomagnetic recording, a magnetic chemisorptive thin film is heated partially to above the Curie temperature or the temperature compensation point, and information is written by extinguishing the coercivity of these portions and inverting the orientation of the magnetization into the direction of a magnetic recording field applied from outside.

In phase-change recording, a recording film made of a special alloy is irradiated with a laser beam, and information is recorded by switching the alloy between a crystalline state and an amorphous state.

However, when using any of these recording methods, the recording layer is formed by vacuum vapor deposition. Therefore, there is the problem that the manufacturing costs for these optical recording media are high.

Furthermore, with these methods, there is the problem that optical recording media that are compatible with various types of information recording/reproducing apparatuses cannot be manufactured easily.

SUMMARY OF THE INVENTION

In view of the above, it is a first object of the present invention to provide an optical recording film which an optical recording layer can be formed using an organic thin film, but without using vacuum vapor deposition, and a method for manufacturing the same.

It is a second object of the present invention to provide an inexpensive high-density write-once optical recording medium using this optical recording film.

It is a third object of the present invention to provide a computer system and a video signal recording/reproducing system using the write-once optical recording medium.

A first write-once optical recording film in accordance with the present invention includes:
 a chemisorptive thin film with orienting properties fixed directly or through a primer layer to a substrate surface; and
 a coating formed on a surface of the chemisorptive thin film;
 wherein the coating has an initial molecule orientation attained by aligning a group of polymerizable molecules in a predetermined direction on the surface of the chemisorptive thin film, and polymerizing the polymerizable molecules to one another; and
 wherein regions with changed initial molecule orientation and regions with unchanged initial molecule orientation of the coating are formed when selectively irradiating the coating with light that changes the initial molecule orientation, making optical information recording possible.

A first method for manufacturing a write-once optical recording film in accordance with the present invention includes:
 forming a chemisorptive thin film on a substrate;
 subjecting the chemisorptive thin film to an orientation treatment;
 bringing a surface of the chemisorptive thin film in contact with polymerizable molecules by applying a solution in which the polymerizable molecules have been dissolved to the surface of the chemisorptive thin film, removing the solvent, and aligning a group of the polymerizable molecules in a predetermined direction at the surface of the chemisorptive thin film with the orientation regulating force of the chemisorptive thin film; and
 forming a coating by bonding (e.g. polymerizing or crosslinking) the polymerizable molecules to one another.

In accordance with the present invention, a first optical recording medium comprising an optical recording layer on at least one surface of a medium substrate includes an optical recording film comprising:
 a chemisorptive thin film with orienting properties fixed directly or through a primer layer to a substrate surface; and
 a coating formed on a surface of the chemisorptive thin film;
 wherein the coating has an initial molecule orientation attained by aligning a group of polymerizable molecules in a predetermined direction on the surface of the chemisorptive thin film, and polymerizing the polymerizable molecules to one another; and
 wherein regions with changed initial molecule orientation and regions with unchanged initial molecule orientation of the coating are formed by selectively irradiating the coating with light that changes the initial molecule orientation, making optical information recording possible.

In accordance with the present invention, a first method for manufacturing an optical recording medium provided with a recording layer in which optical information can be recorded by changing an initial molecule orientation of a coating constituting the recording layer by selectively irradiating focused light, includes:

forming a chemisorptive thin film on at least one surface of a medium substrate;

subjecting the chemisorptive thin film to an orientation treatment;

bringing a surface of the chemisorptive thin film in contact with polymerizable molecules by applying a solution in which the polymerizable molecules have been dissolved to the surface of the chemisorptive thin film, removing the solvent, and aligning a group of the polymerizable molecules in a predetermined direction at the surface of the chemisorptive thin film with the orientation regulating force of the chemisorptive thin film; and forming a coating by polymerizing the polymerizable molecules to one another.

In accordance with the present invention, a first method for optical recording on an optical recording medium provided with an optical recording layer on at least one surface of a substrate is provided, wherein the optical recording layer comprises a chemisorptive thin film with orienting properties fixed directly or through a primer layer to the surface of the substrate, and a coating formed on a surface of the chemisorptive thin film;

wherein the coating has an initial molecule orientation attained by aligning a group of polymerizable molecules in a predetermined direction on the surface of the chemisorptive thin film, and polymerizing the polymerizable molecules to one another;

wherein regions with changed initial molecule orientation and regions with unchanged initial molecule orientation of the coating are formed when selectively irradiating the coating with light that changes the initial molecule orientation, thus recording optical information.

In accordance with the present invention, a first information recording/reproducing apparatus for recording and reproducing information on a write-once optical recording medium, wherein the write-once optical recording medium is provided with an optical recording layer on at least one surface of a substrate;

wherein the optical recording layer comprises a chemisorptive thin film with orienting properties fixed directly or through a primer layer to the surface of the substrate, and a coating formed on a surface of the chemisorptive thin film;

wherein the coating has an initial molecule orientation attained by aligning a group of polymerizable molecules in a predetermined direction on the surface of the chemisorptive thin film, and polymerizing the polymerizable molecules to one another; and wherein regions with changed initial molecule orientation and regions with unchanged initial molecule orientation of the coating can be formed by selectively irradiating the coating with light that changes the initial molecule orientation;

comprises:

a signal input/output portion;

a recording light emitting portion selectively emitting recording light for writing information elements by changing the initial molecule orientation of the chemisorptive thin film constituting the recording layer, in accordance with an information signal from the signal input/output portion;

an information recording portion including said optical recording medium, on which information is recorded by irradiating the recording light emitted from the recording light emitting portion;

a reference light emitting portion for emitting reference light that does not change the initial molecule orientation of the coating constituting the recording layer, used for reproduction of information recorded on the optical recording medium of the information recording portion;

an information element detecting portion which irradiates the reference light on the optical recording medium, detects with an optical sensor an intensity change of a polarized component of reflected light, transmitted light or scattered light of the reference light, due to differences in information elements, and outputs a predetermined electrical signal to the signal input/output portion, based on the detected results;

a position control driving portion, which shifts or rotates the optical recording medium in order to selectively irradiate the recording light and the reference light on predetermined positions of the optical recording medium; and a control circuit portion for controlling the recording operation by coordinating the recording light emitting portion and the position control driving portion, and controlling the reproduction operation by coordinating the information element detecting portion and the position control driving portion.

A first computer system in accordance with the present invention includes:

an arithmetic processing device including a main memory;

an auxiliary recording device connected to the arithmetic processing device and serving as an auxiliary memory;

an input device connected to the arithmetic processing device;

an output device connected to the arithmetic processing device; and a control device for controlling data communication between the devices;

wherein the auxiliary recording device is an information recording/reproducing device using an optical recording medium;

wherein the optical recording medium is a write-once optical recording medium provided with an optical recording layer on at least one surface of a substrate;

wherein the optical recording layer comprises a chemisorptive thin film with orienting properties fixed directly or through a primer layer to a surface of the substrate, and a coating formed on a surface of the chemisorptive thin film;

wherein the coating has an initial molecule orientation attained by aligning a group of polymerizable molecules in a predetermined direction on the surface of the chemisorptive thin film, and polymerizing the polymerizable molecules to one another; and wherein regions with changed initial molecule orientation and regions with unchanged initial molecule orientation of the coating can be formed when selectively irradiating the coating with light that changes the initial molecule orientation;

the computer system comprising:

a signal input/output portion;

a recording light emitting portion selectively emitting recording light for writing information elements by changing and destroying the initial molecule orientation of the coating constituting the recording layer, in accordance with an information signal from the signal input/output portion;

an information recording portion including said optical recording medium, on which information is recorded by irradiating the recording light emitted from the recording light emitting portion;

a reference light emitting portion for emitting reference light that does not change the initial molecule orientation of the coating constituting the recording layer, used for reproduction of information recorded on the optical recording medium of the information recording portion;

an information element detecting portion which irradiates the reference light on the optical recording medium, detects with an optical sensor an intensity change of a polarized component of reflected light, transmitted light or scattered light of the reference light that has passed through a polarizer, due to differences in information elements, and outputs a predetermined electrical signal to the signal input/output portion, based on the detected results;

a position control driving portion, which shifts or rotates the optical recording medium in order to selectively irradiate the recording light and the reference light on predetermined positions of the optical recording medium; and a control circuit portion for controlling the recording operation by coordinating the recording light emitting portion and the position control driving portion, and controlling the reproduction operation by coordinating the information element detecting portion and the position control driving portion.

In another computer system making use of an optical information storage medium, an improvement is that the optical information storage medium comprises the first write-once optical recording film in accordance with the present invention.

A first video signal recording/reproducing system in accordance with the present invention includes:

a video signal input/output control device controlling the input source and the output destination of a video signal;

a video recording/reproducing device connected to the video signal input/output control device;

a video output device connected to the video signal input/output control device; and a control command input device for sending input/output control commands to the video signal input/output control device, connected to the video signal input/output control device;

wherein the video recording/reproducing device is an information recording/reproducing device using an optical recording medium;

wherein the optical recording medium is a write-once optical recording medium provided with an optical recording layer on at least one surface of a substrate;

wherein the optical recording layer comprises a chemisorptive thin film with orienting properties fixed directly or through a primer layer to a surface of the substrate, and a coating formed on a surface of the chemisorptive thin film;

wherein the coating has an initial molecule orientation attained by aligning a group of polymerizable molecules in a predetermined direction on the surface of the chemisorptive thin film, and polymerizing the polymerizable molecules to one another; and wherein regions with changed initial molecule orientation and regions with unchanged initial molecule orientation of the coating can be formed when selectively irradiating the coating with light that changes the initial molecule orientation;

the video signal recording/reproducing system comprising:

a signal input/output portion;

a recording light emitting portion selectively emitting recording light for writing information elements by changing and destroying the initial molecule orientation of the coating constituting the recording layer, in accordance with an information signal from the signal input/output portion;

an information recording portion including said optical recording medium, on which information is recorded by irradiating the recording light emitted from the recording light emitting portion;

a reference light emitting portion for emitting reference light that does not change the initial molecule orientation of the coating constituting the recording layer, used for reproduction of information recorded on the optical recording medium of the information recording portion;

an information element detecting portion which irradiates the reference light on the optical recording medium, detects with an optical sensor an intensity change of a polarized component of reflected light, transmitted light or scattered light of the reference light that has passed through a polarizer, due to differences in information elements, and outputs a predetermined electrical signal to the signal input/output portion, based on the detected results;

a position control driving portion, which shifts or rotates the optical recording medium in order to selectively irradiate the recording light and the reference light on predetermined positions of the optical recording medium; and a control circuit portion for controlling the recording operation by coordinating the recording light emitting portion and the position control driving portion, and controlling the reproduction operation by coordinating the information element detecting portion and the position control driving portion.

In another video signal recording/reproducing system making use of an optical information storage medium, an improvement is that the optical information storage medium comprises the first write-once optical recording film in accordance with the present invention.

In a second aspect, a write-once optical recording film in accordance with the present invention comprises:

a thin film made of chemisorptive molecules fixed directly or through a primer layer to a substrate surface by covalent bonding;

wherein optical information can be recorded on the thin film by irradiating light to degrade the molecules at the irradiated portions.

A second method for manufacturing a write-once optical recording film in accordance with the present invention, which comprises a thin film made of chemisorptive molecules fixed by covalent bonds directly or through a primer layer to a substrate surface, wherein optical information can be recorded on the thin film by irradiating light to degrade the molecules at the irradiated portions;

comprises bringing a chemisorptive compound including a chemisorptive group and a functional group that degrades when irradiated with light in contact with a substrate or a primer layer including active hydrogen at its surface to cause an elimination reaction between the chemisorptive group and the active hydrogen, and thereby fixing the chemisorptive compound by covalent bonding directly or through a primer layer to a substrate surface.

A second write-once optical recording medium including a write-once optical recording film comprises a substrate and a thin film made of chemisorptive molecules fixed by covalent bonds directly or through a primer layer to one or both sides of the substrate, in which optical information can be recorded;

wherein the optical recording film can be optically recorded by irradiating light to degrade the molecules at the irradiated portions.

A second method for manufacturing a write-once optical recording medium, which comprises a substrate and a thin film made of chemisorptive molecules fixed by covalent bonds directly or through a primer layer to one or both sides of the substrate, wherein optical information can be recorded in the thin film by irradiating light to degrade the molecules at the irradiated portions;

comprises bringing a chemisorptive compound including a chemisorptive group and a functional group that degrades when irradiated with light in contact with a substrate or a primer layer including active hydrogen at its surface to cause an elimination reaction between the chemisorptive group and the active hydrogen, and fixing the chemisorptive compound by covalent bonding directly or through a primer layer to the substrate surface.

A second method for recording/reproducing information on a write-once optical recording medium, which comprises a substrate and a thin film made of chemisorptive molecules fixed by covalent bonds directly or through a primer layer to one or both sides of the substrate, wherein optical information can be recorded in the thin film by irradiating light to degrade the molecules at the irradiated portions, comprises:

a recording step of recording information by irradiating recording light on the optical recording film to degrade the irradiated portions into degraded portions, and by combining the degraded portions and non-degraded portions; and a reproduction step of reproducing information by irradiating reproduction light on the degraded portions and the non-degraded portions and detecting a difference in the optical intensity after the light has reached the degraded portions and the non-degraded portions.

A second apparatus for recording/reproducing information on a write-once optical recording medium, which comprises a substrate and a thin film made of chemisorptive molecules fixed by covalent bonds directly or through a primer layer to one or both sides of the substrate, wherein optical information can be recorded in the thin film by irradiating light to degrade the molecules at the irradiated portions, comprises:

a signal input/output means for input/output of information signals of information converted into electrical signals and operation command signals to/from an external device;

a recording light irradiation means for irradiating recording light in order to degrade the molecules constituting the optical recording film, in accordance with an information signal from the signal input/output means;

a reproduction light irradiation means for irradiating reproduction light that does not degrade the molecules constituting the optical recording film, used for reproduction of information recorded on the optical recording medium of the information recording portion;

an information element detecting means which irradiates the reference light on the optical recording medium, detects an intensity of reflected light or transmitted light after the reproduction light has reached the optical recording film, and outputs a predetermined electrical signal to the signal input/output means, based on the detected results;

an optical recording medium driving means for irradiating the recording light or the reproduction light onto a predetermined position of the optical recording film; and a control circuit means for controlling the recording operation by coordinating the recording light irradiation means and the optical recording medium driving means, and controlling the reproduction operation by coordinating the reproduction light irradiation means, the optical recording medium driving means and the information element detecting means.

BRIEF DESCRIPTION OF THE DRAWINGS

FIG. 2A is a diagram of the monomolecular film before the orientation treatment.

FIG. 2B is a diagram illustrating the monomolecular film after the orientation treatment.

FIG. 2C is a diagram illustrating the monomolecular film after crosslinking.

FIG. 3A illustrates how polymerizable liquid crystal molecules are formed randomly.

FIG. 3B illustrates the state of the polymerizable liquid crystal molecules after the orientation treatment. And FIG. 3C illustrates the state of the polymer liquid crystal molecules after polymerization.

FIG. 9A is a plan view illustrating a method for rubbing with a rubbing roll, and FIG. 9B is a cross-sectional view taken from the right illustrating the method for rubbing with a rubbing roll.

FIG. 10A is a cross-sectional conceptual diagram of the medium on which optical information has been recorded.

FIG. 10B is a conceptual diagram of the medium on which optical information has been recorded.

FIG. 14A is a schematic diagram illustrating the recording method.

FIG. 14B is a plan view schematically illustrating the recorded state.

DETAILED DESCRIPTION OF THE INVENTION

Figure 1:
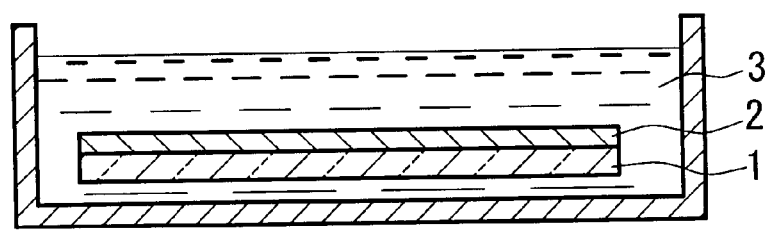
FIG. 1 is a diagram illustrating a chemisorptive thin film formation step for producing a monomolecular film on a substrate in accordance with Working Example 1 of the present invention.

The polymerizable molecules of the present invention are aligned in accordance with the above-described orienting properties in a predetermined orientation and with a predetermined tilt on the surface of a chemisorptive thin film. Here, "chemisorptive thin film" refers to a thin film, in which a surface adsorbing agent having reactive groups, such as chlorosilyl groups alkoxysilyl groups, on its molecule ends is used to cause e.g. a dehydrochlorination reaction or dealcoholization reaction between the reactive groups and active hydrogen on the substrate surface, thus covalently bonding the surface adsorbing molecules to the substrate surface. Such films are also known as "self-assembling films" to the person skilled in the art.

The reason why in the present invention a coating is provided on a chemisorptive thin film with orienting properties is because it is necessary to orient the polymerizable molecules in a predetermined orientation. By simply providing the coating on a chemisorptive thin film without orienting properties, it may not be possible to orient the molecules in a certain orientation. Thus, the orientation regulating force of the chemisorptive thin film is utilized to orient the polymerizable molecules on the chemisorptive thin film. Here, "orientation regulating force" refers to a force that automatically orients the polymerizable molecules that are formed on top of the chemisorptive thin film and are influenced by the orientation of the chemisorptive thin film.

As long as the chemisorptive thin film has orienting properties, it can be a monomolecular film or a polymer film.

If the chemisorptive thin film with orienting properties is a monomolecular thin film, then the molecules constituting a chemisorptive thin film are aligned orderly, tilted in a certain direction. There are gaps between neighboring molecules constituting the chemisorptive thin film, and when the shape of the polymerizable molecules conforms to these gaps, they can be fitted into these gaps. As mentioned above, the molecules constituting the chemisorptive thin film are tilted in a predetermined direction, so that also the polymerizable molecules fitted into the gaps are tilted in a predetermined direction. Moreover, the polymerizable molecules are linked to one another by polymer coupling. Thus, also in the coating provided on the chemisorptive thin film, the polymerizable molecules are fixed while tilted in a certain direction and aligned orderly, so that it is possible to provide an optical recording film with high uniformity.

If the chemisorptive thin film having the above-described orienting function is a polymer film, then the polymer absorbs the irregularities of the layer below it, so that an optical recording film with superior flatness can be provided.

The monomolecular film or polymer film is made of molecules having photosensitive groups, and by crosslinking, the photosensitive groups in the chemisorptive thin film are bonded to one another by crosslinking. In this example, the photosensitive groups are bonded by crosslinking, and the molecules are fixed, so that the orientation state of the molecules constituting the chemisorptive thin film is three-dimensionally stable. As a result, a chemisorptive thin film with superior orientation regulating force with respect to polymerizable molecules is attained.

The photosensitive groups also can include double or triple bonds. Furthermore, the photosensitive groups also can be chalcone groups or cinnamate groups.

It is preferable that the polymerizable molecules are polymerizable liquid crystal molecules. Polymerizable liquid crystal molecules can be aligned orderly in accordance with the orienting properties of the chemisorptive thin film, and the polymerizable liquid crystal molecules can be polymer bonded to one another in this state. As a result, a coating with uniform initial molecule orientation is achieved, so that an optical recording film with a high contrast between the written positions and non-written positions of the optical recording and with superior recording stability can be provided. Here, "initial molecule orientation" means the orientation in which the polymerizable molecules are automatically oriented when they are formed on the chemisorptive thin film, influenced by the orientation chemisorptive thin film.

The polymerizable liquid crystal molecules can have groups including double or triple bonds. If the polymerizable liquid crystal molecules have groups including double or triple bonds, then the groups easily can be polymerized to one another. The polymerizable liquid crystal molecules also can be photopolymerizable liquid crystal molecules. If the polymerizable liquid crystal molecules are photopolymerizable liquid crystal molecules, then the molecules easily can be polymerized to one another by irradiation with light.

It is also possible to use the substance represented by the following general formula (A) for the polymerizable liquid crystal molecules:
(Formula 8)

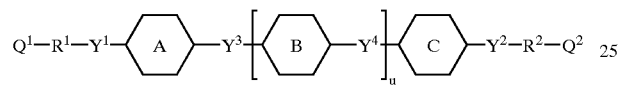

(A)

In Formula 8, $Q^1$ represents a functional group selected from the group consisting of an acryloyloxy group, a methacryloyloxy group, ClCH=CHCOO—, an acryloamide group, a methacryloamide group, ClCH=CHCONH—, a vinyl group, $CH_2$=CCl—, CHCl=CH—, an epoxy group, an ethynyl group, a mercapto group and $CH_2$=CHO—; $Q^2$ represents a functional group selected from the group consisting of a hydrogen atom, an acryloyloxy group, a methacryloyloxy group, ClCH=CHCOO—, an acryloamide group, a methacryloamide group, ClCH=CHCONH—, a vinyl group, $CH_2$=CCl—, CHCl=CH—, an epoxy group, an ethynyl group, a mercapto group and $CH_2$=CHO—; $R^1$ and $R^2$ represent, independently, a straight-chain or branching bivalent hydrocarbon group with a carbon number of 1 to 18; $Y^1$ and $Y^2$ represent, independently, a linking group selected from the group consisting of a single bond, —O—, and —S—; u represents one of the integers 0 and 1; the 6-membered rings A, B and C independently, are selected from the group consisting of
(Formula 9)

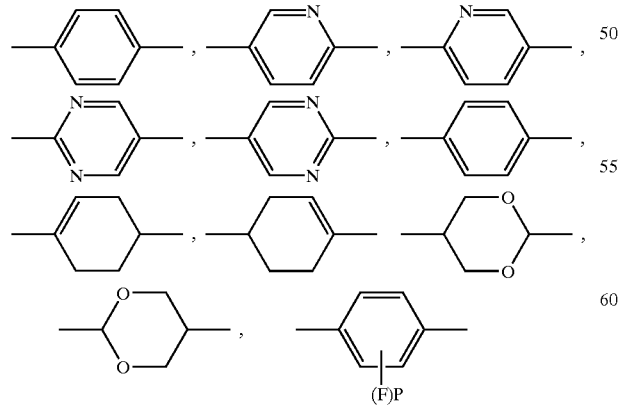

p represents an integer of 1 to 4, $Y^3$ and $Y^4$ represent, independently, a linking chain selected from the group consisting of single bond, —$CH_2CH_2$—, —$CH_2C(CH_3)$ H—, —$C(CH_3)HCH_2$—, —$CH_2O$—, —$OCH_2$—, —$CF_2O$—, —$OCF_2$—, —COO—, —OCO—, —C≡C—, —CH=CH—, —CF=CF—, —$(CH_2)_4$—, —$CH_2CH_2CH_2O$—, —$OCH_2CH_2CH_2$—, —CH=CH—$CH_2CH_2$— and —$CH_2CH_2$—CH=CH—.

This is because it is easy to obtain the desired polymer film when using these polymerizable liquid crystal molecules.

In the general formula (A), the portion represented by the following general formula (B)
(Formula 10)

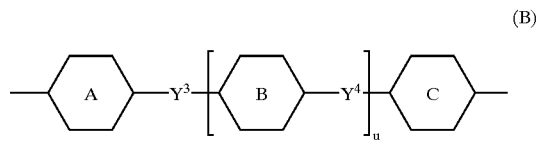

(B)

also can be one of the groups represented by the following formulas (C):
(Formula 11)

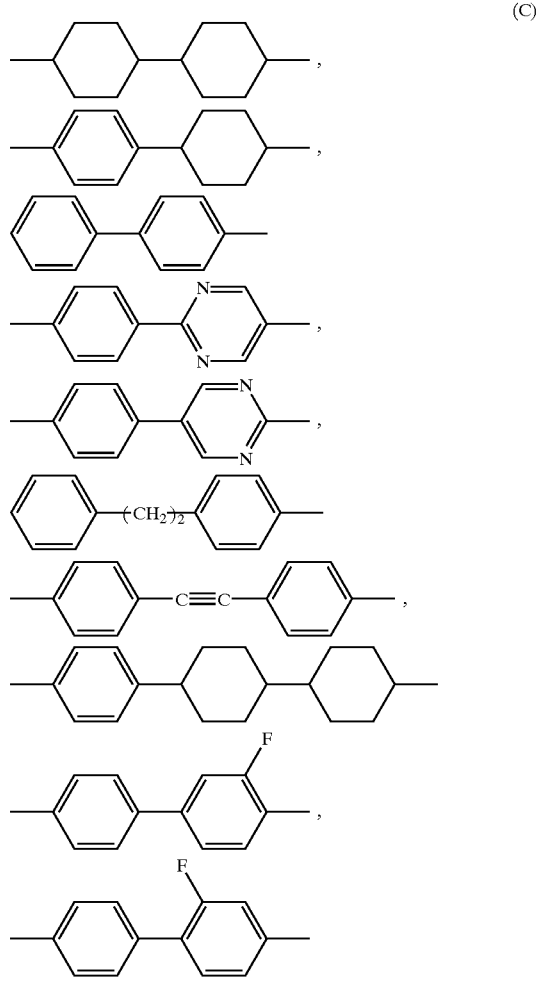

(C)

If the polymerizable liquid crystal molecules include such a group, then they react more readily to light, so that by irradiating them with light, it is possible to orient the polymerizable liquid crystal molecules better with the desired tilt angle.

In the above-noted general formula (A), the portion denoted by the general formula (D)
(Formula 12)

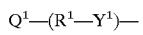 (D)

also can include an acryloyloxy group.

Acryloyloxy groups are photopolymer groups, so that it is possible to perform the polymerization of the liquid crystal molecules reliably.

In the above-noted general formula (A), the portion denoted by the general formula (D) and the portion denoted by the general formula (E)
(Formula 13)

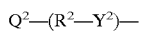 (E)

can also both include an acryloyloxy group.

When both the portion denoted by the general formula (D) and the portion denoted by the general formula (E) include an acryloyloxy group, the liquid crystal molecules can form at both ends crosslinking bonds with other liquid crystal molecules. As a result, a coating with superior orientation stability is attained.

In the general formula (A), the functional group denoted by the general formula (D) and the functional group denoted by the general formula (E) also can be the same.

This is because if in the general formula (A), the functional group denoted by the general formula (D) and the functional group denoted by the general formula (E) are the same, then the liquid crystal molecules have superior symmetry, so that it is possible to attain a coating with uniform orientation.

In the general formula (A), $R^2$ also can be a straight-chain or branching bivalent hydrocarbon group with a carbon number of 1 to 10. If $R^2$ is a straight-chain or branching bivalent hydrocarbon group with a carbon number of 1 to 10, then orientation in accordance with the orientation regulating force of the chemisorptive thin film becomes easier, so that a coating with superior orientation can be attained. More preferably, it is a straight-chain or branching bivalent hydrocarbon group with a carbon number of 1 to 3, which is even easier to orient.

The group of polymerizable liquid crystal molecules is tilted in a predetermined direction on the chemisorptive thin film in accordance with the orienting properties of the chemisorptive thin film having an orienting function, and the polymerizable liquid crystal molecules are polymerized/fixed to one another. With this configuration, the polymerizable liquid crystal molecules are oriented uniformly and have superior orientation stability, so that an optical recording film with a high contrast between the written positions and non-written positions of the optical recording and with superior recording stability can be provided.

There is no particular limitation with regard to the method for forming the chemisorptive thin film, and any of the methods known in the art can be used. For example, the step of forming the chemisorptive thin film can be the formation of a monomolecular film in a dry atmosphere by bringing a chemisorptive solution including a silane-based chemisorptive substance having a photosensitive group and a non-aqueous organic solvent in contact with the substrate surface, and chemisorbing the molecules of the chemisorptive substance in the chemisorptive solution to the substrate surface. With this configuration, it is possible to manufacture a chemisorptive thin film having gaps into which polymerizable molecules can be fitted between neighboring molecules constituting the chemisorptive thin film.

In the step of forming the chemisorptive thin film, it is also possible to form a polymer film by applying a solution in which a polymer precursor has been dissolved on the substrate, followed by drying or heating the substrate, and curing the precursor. With this configuration, it is possible to form a flat polymer film despite irregularities in the substrate, so that an optical recording film with superior flatness can be manufactured.

The above-mentioned orientation treatment step can be a polarized light orientation step of orienting by irradiating the substrate surface on which the chemisorptive thin film is formed with polarized light. With this configuration, the chemisorptive thin film surface can be oriented uniformly, so that a chemisorptive thin film having superior orientation regulating force can be attained and a uniform optical recording film can be manufactured.

The orientation treatment step also can be a step of irradiating polarized light on the monomolecular film or the polymer film including film molecules having photosensitive groups to polymerize or crosslink the photosensitive groups, and thus orientation treating the monomolecular film and the polymer film. With this configuration, the photosensitive groups are bonded by crosslinking to one another, and the molecules are fixed, so that the orientation of the molecules constituting the chemisorptive thin film is stabilized three-dimensionally. As a result, it is possible to attain a chemisorptive thin film with superior orientation regulating force with respect to the polymerizable molecules, so that it is possible to manufacture an optical recording film with which stable optical recording is possible.

In the orientation treatment step, the polarized light that is irradiated can be UV light. This is because by using UV light, it is possible to bond the photosensitive groups to one another efficiently by crosslinking.

The orientation treatment step also can be a step of orientation treating by rubbing the polymer film. When rubbing is used, then the orientation treatment of the chemisorptive thin film surface is facilitated.

In the polymerizable molecule orientation step, it is also possible to use polymerizable liquid crystal molecules as the polymerizable molecules, and to use an organic solvent as the solvent in which the polymerizable liquid crystal molecules are dissolved. With this configuration, liquid crystal molecules are used, so that it is possible to achieve a uniform orientation due to the orientation regulating force of the chemisorptive thin film. Also, the liquid crystal molecules easily can be bonded by crosslinking to one another, so that a coating with a three-dimensionally stable structure is attained, which makes it possible to manufacture an optical recording film on which optical information can be recorded stably. Furthermore, if an organic solvent is used as the solvent in which the polymerizable liquid crystal molecules are dissolved, then the polymerizable liquid crystal molecules can be dissolved with high efficiency.

It is more preferable that organic solvent that is used has a boiling point of at least 100° C. and at most 250° C. If the boiling point is lower than 100° C., then the solvent is removed from the substrate surface before the polymerizable liquid crystal molecules are sufficiently oriented, which is undesirable. On the other hand, if the boiling point is higher than 250° C., then solvent remains on the substrate surface even after the polymerizable liquid crystal molecules have been oriented, thus lowering the stability of the orientation, which is also undesirable.

The coating formation step also can be a step of polymerizing the molecules by irradiating the polymerizable molecules with light. With this configuration, the photo-polymerization proceeds with high efficiency, so that an optical recording film can be manufactured with high efficiency.

In the coating formation step, it is also possible to use photo-polymerizable liquid crystal molecules for the polymerizable molecules. Such liquid crystal molecules easily can be polymerized by irradiation with light, because they are photo-polymerizable.

In the coating formation step, it is preferable that the light that is irradiated is UV light. Irradiating UV light promotes photo-polymerization, so that the optical recording film can be manufactured with high efficiency.

It is also possible to mix a substance as represented by the general formula (A) with a functional acrylate monomer that is different from that substance and use it as the polymerizable liquid crystal molecules. Functional acrylate monomers are cured when irradiated with UV light, so that an optical recording film with high film strength can be manufactured.

It is also possible to mix a substance as represented by the general formula (A) with a functional acrylate monomer that is different from that substance, further mix a sensitizing agent into that mixture, and use the result as the polymerizable liquid crystal molecules. Adding a sensitizing agent further promotes the polymerization of the polymer film.

For the sensitizing agent, it is possible to use a substance that responds to UV light. Mixing a substance that responds to UV light, the photo-polymerization of the polymer film is promoted, so that the optical recording film can be manufactured with high efficiency.

As the substance that responds to UV light, it is possible to use a substance containing —$C_6H_4CO$— in its molecules. A substance containing —$C_6H_4CO$— has higher sensitivity to UV light.

It is sufficient if the medium substrate of the present invention includes at least a substrate, but it also can include a protective layer, a reflective film and other layers, as desired.

The substrate can be made of metal, ceramic, glass or synthetic resin.

The medium substrate also can be made of the substrate and a reflective layer including a metal that is layered on the substrate. With this configuration, it is possible to provide a reflective optical recording medium.

The reflective layer can include aluminum. With this configuration, the reflectance of the light that is irradiated when writing optical information or reading out optical information is high, so that an optical recording medium is attained, which allows the reading and writing of optical information with high sensitivity. A preferable reflectance is about 97 to 98%.

It is also possible to provide a further transparent protective layer on the reflective layer. With this configuration, it is possible to improve the corrosion resistance of the surface of the reflective layer, providing an optical recording medium with high durability. It is preferable that such a transparent protective layer is made of an inorganic substance, and it is even more preferable that this inorganic substance is $SiO_2$ or $SiN_x$ (stoichiometrically $Si_3N_4$, but the actual valence is not determined, so that x can be any suitable value).

It is also possible that a reflective film is layered on both sides of the substrate, forming optical recording layers on both sides of the optical recording medium. With this configuration, it is possible to record double the optical information on one optical recording medium.

The above-mentioned coating also can be provided over the entire surface of the chemisorptive thin film with orienting properties. Moreover, the coating can be provided partially on the chemisorptive thin film with orienting properties. It is possible to provide several kinds of films, in accordance with the intended use of the optical recording medium.

The optical recording layer has at least one optical recording region. With this configuration, it is possible to form a plurality of optical recording regions on one optical recording layer. As a result, it is possible to provide a plurality of optical recording regions conforming to a track pattern, and regions where optical recording is possible can be distinguished clearly from regions where optical recording is not possible, so that an optical recording medium with excellent contrast can be provided. It should be noted that a means for providing a plurality of optical regions should provide a plurality of the above-mentioned coatings on the medium substrate.

The medium substrate can be disk-shaped or tape-shaped. With such shapes, the shape is the same as for conventional optical recording media, so that it is possible to provide an optical recording medium that is easy to handle.

If the medium substrate is disk-shaped, then the optical information regions can be arranged in concentric rings or in a spiral shape on the medium substrate. For the optical recording regions, it is also possible to form the recording layer by arranging on the medium substrate linear groups parallel to a direction that intersects at a predetermined angle with the longitudinal direction of a tape. With this configuration, the coating is arranged in the regions where optical information recording takes place, so that an optical recording medium is attained in which the reading and writing of optical information is easy.

As described above, in the optical recording regions of the optical recording medium of the present invention, a group of polymerizable molecules, which are aligned in a predetermined direction and with a predetermined tilt on the surface of a chemisorptive thin film, are fixed to one another by polymerization. When light that is focused on the optical recording regions is irradiated selectively, then the initial molecule orientation of the coating is changed. Depending on whether the initial molecule orientation of the coating has been changed or not, it is possible to write information on the optical recording medium.

Here, "changing the initial molecule orientation of the coating" means the cutting of polymer bonds between the polymerizable molecules by irradiation of light, or the changing of the initial alignment state having a predetermined direction and a predetermined tilt on the surface of the chemisorptive thin film by degrading molecules constituting the coating other than the polymer bonds. Furthermore, it also includes the loss of the initial orientation state by melting or the like, which is not brought about by cutting the polymer bonds between the polymerizable molecules nor by the degrading of the molecules constituting the film.

What changes the initial molecule orientation of the film is the optical energy of the irradiated light or thermal energy converted from the optical energy.

It is preferable that the reflective film is formed before the chemisorptive thin film formation step. It is also possible to form the reflective film by vapor deposition of a film including aluminum on the substrate surface.

After the step of forming the metal reflective layer, it is also possible to form a transparent protective film made of an inorganic substance. Furthermore, it is also possible form the transparent protective film by any method selected from the group consisting of CVD, vapor deposition and sputtering using $SiO_2$ or $SiN_x$ as the inorganic substance.

In the chemisorptive thin film formation step, it is also possible to form the chemisorptive thin film on at least one surface of the medium substrate on the entire surface. Furthermore, in the chemisorptive thin film formation step, it is also possible to form the chemisorptive thin film partially on at least one surface of the medium substrate. By changing the pattern of the formed chemisorptive thin film, it is possible to change the pattern of the coating formed on the chemisorptive thin film.

The chemisorptive thin film formation step may include a step of producing a chemisorptive solution by dissolving in an non-aqueous organic solvent chemisorptive thin film constituting molecules having, in their molecules, a photosensitive group and a functional group that reacts with the medium substrate surface forming chemical bonds, and a step of bringing the chemisorptive solution in contact with a substrate having active hydrogen at its surface, thus chemisorbing the chemisorptive thin film constituting molecules to the substrate surface.

Directly after the chemisorptive thin film formation, the substrate surface on which the chemisorptive thin film is formed can be rinsed with a rinsing solution made of a non-aqueous organic solvent, and non-adsorbed chemisorptive thin film constituting molecules can be removed. Thus, a monomolecular film can be formed. It is preferable that the non-aqueous organic solvent used above is a dehydrated hydrocarbon solvent, carbon fluoride solvent, carbon chloride solvent or silicone solvent, because then there is only little water present, and moisture absorbance is inhibited. Non-adsorbed chemisorptive thin film constituting molecules can be present on the monomolecular film formed in the chemisorptive thin film formation step. If the chemisorptive thin film is rinsed with the rinsing solution, then the non-adsorbed molecules are removed, and a high-quality monomolecular film can be formed, having many gaps for fitting the molecules constituting the polymer film.

If the substrate is a synthetic resin, then a step of introducing active hydrogen to the substrate surface is added, for example by subjecting the substrate surface before the chemisorptive thin film formation step to any of the methods selected from the group consisting of a plasma treatment, a corona treatment and a far UV light treatment. This is because, if the substrate is a synthetic resin, then it is necessary to have adsorbing groups for sufficient adsorption of the chemisorptive thin film forming molecules on the substrate surface.

It is also possible to add, before the chemisorptive thin film formation step, a step of forming a layer having active hydrogen on the substrate surface. The step of forming a layer having active hydrogen on the substrate surface also can be a step of forming a metal layer. Furthermore, this metal layer also can be used as a reflective layer. With this configuration, it is possible to simultaneously introduce active hydrogen to the surface of the medium substrate and form a reflective layer.

For the active hydrogen present in the medium substrate surface, it is possible to use hydroxyl groups. Hydroxyl groups have a high reactivity with chemisorptive thin film constituting molecules, so that in this way a uniform chemisorptive thin film can be formed.

The chemisorptive thin film formation step also can be a step of applying a solution in which a polymer has been dissolved in an organic solvent to the medium substrate surface, and after removing the solvent, heating and fixing the polymer to form a polymer film. With this configuration, a flat polymer film can be formed even if the medium substrate surface has irregularities, so that an optical recording medium with superior flatness can be manufactured.

The above-mentioned orientation treatment step can be carried out by orientation treating the entire chemisorptive thin film that has been formed. Or, the above-mentioned orientation treatment step also can be carried out by partially orientation treating the chemisorptive thin film that has been formed. It is also possible to change the pattern of the coating that is formed on the chemisorptive thin film by changing the orientation treatment parameters for the chemisorptive thin film.

The orientation treatment step also can be a polarized light orientation step of an orientation treatment by irradiating polarized light on the medium substrate surface on which the chemisorptive thin film has been formed. In the orientation treatment step, the polarized light can be irradiated on the entire chemisorptive thin film, or it can be irradiated onto a portion of the chemisorptive thin film. The chemisorptive thin film can be a monomolecular film or a polymer film, which can be made of chemisorptive thin film constituting molecules including photosensitive groups, and it is also possible to irradiate polarized light in dots on the chemisorptive thin film while moving the medium substrate. If the chemisorptive thin film is a monomolecular film, then the molecules at the polarized light irradiation position are arranged orderly, so that also the molecules constituting the polymer film are arranged orderly, and it is possible to form a recording format with high efficiency. On the other hand, if the chemisorptive thin film is a polymer film, then the polymer film absorbs surface irregularities when the substrate surface has an irregular shape, so that it is possible to manufacture a flat optical recording medium.

If the medium substrate is disk-shaped, then it is possible to irradiate polarized light in dots along the tracks formed on the medium surface while rotating the medium substrate. With this configuration, it is possible to orient the chemisorptive thin film regularly at a plurality of positions, so that it is possible to manufacture an optical recording medium provided with recording regions on which optical information can be recorded at high densities.

It is preferable that the polarization direction of the polarized light irradiated in dots is the rotation direction of the medium substrate or a direction that intersects at right angles with the rotation direction. With this configuration, the polarization direction of the polarized light determines the orientation of the chemisorptive thin film, so that it also determines the orientation of the polymerizable molecules arranged on the chemisorptive thin film. Consequently, if the initial molecule orientation of the coating is changed by irradiating light when writing optical information, then the directions of reflected light, scattered light and transmitted light irradiated when reading the optical information are different in the changed regions and in the unchanged regions. Thus, it is possible to manufacture an optical recoding medium with which optical information can be read with high efficiency.

If the medium substrate is tape-shaped, then polarized light can be irradiated in dots along the tracks formed on the medium substrate while letting the medium substrate travel forward. With this configuration, it is possible to orient the chemisorptive thin film regularly at a plurality of different positions, so that it is possible to manufacture an optical recording medium provided with recording regions on which optical information can be recorded at high densities.

The orientation treatment step also can be a step of rubbing the polymer film while moving the medium substrate. If the medium substrate is disk-shaped, then it is also possible to rub the entire polymer film surface while rotating the medium substrate. If the medium substrate is tape-shaped, then it is also possible to rub the polymer film while letting the medium substrate travel forward. Furthermore, it is also possible to produce a tape-shaped optical recording medium by rubbing the polymer film while letting a wide medium substrate film travel forward and cutting the medium substrate after forming the polymer film. By rubbing, a chemisorptive thin film having an orienting function can be formed with high efficiency, so that it is possible to form an optical recording medium with high efficiency. It is also possible to produce a tape-shaped optical recording medium by rubbing the polymer film while letting a wide medium substrate film travel forward and cutting the medium substrate after forming the polymer film. Thus, it is possible to manufacture a plurality of optical recording media by rubbing once, which is even more efficient.

In the step of forming the coating, it is possible to form a coating on the entire surface of the chemisorptive thin film by applying a solution in which polymerizable molecules have been dissolved on the entire surface of the chemisorptive thin film to bring the polymerizable molecules in contact with the chemisorptive thin film surface, removing the solvent, orienting the polymerizable molecules with the orientation regulating force of the chemisorptive thin film, and polymerizing the polymerizable molecules to one another. Also, in the step of forming the coating, it is possible to form a coating on a portion of the chemisorptive thin film by applying a solution in which polymerizable molecules have been dissolved on the entire surface of the chemisorptive thin film to bring the polymerizable molecules in contact with the chemisorptive thin film surface, removing the solvent, orienting the polymerizable molecules with the orientation regulating force of the chemisorptive thin film, and polymerizing a portion of the group of polymerizable molecules to one another.

In the step of forming the coating, it is also possible to form a coating partially by applying a solution in which polymerizable molecules have been dissolved on a portion of the chemisorptive thin film to bring the polymerizable molecules in contact with the chemisorptive thin film surface, removing the solvent, orienting the polymerizable molecules with the orientation regulating force of the chemisorptive thin film, and polymerizing the polymerizable molecules that have been applied on the chemisorptive thin film to one another.

In the step of forming the coating, it is also possible to form the coating by irradiating a group of polymerizable molecules with dot-shaped polarized light while moving the medium substrate.

If the medium substrate is disk-shaped, then it is also possible to irradiate polarized light in dots onto a group of polymerizable molecules along tracks while rotating the medium substrate. It is preferable that the polarization direction of the polarized light that is irradiated in dots is the rotation direction of the medium substrate or a direction that intersects at right angles with the rotation direction.

If the medium substrate is tape-shaped, then it is also possible to irradiate polarized light in dots onto a group of polymerizable molecules along tracks while letting the medium substrate travel forward.

In the information recording/reproducing apparatus of the present invention, the reference light that is irradiated can be polarized light, and it is possible to detect the intensity change of a polarized light component only with an optical sensor, or to detect that light with an optical sensor after it has passed through a polarizer.

Furthermore, the reference light that is irradiated can be polarized light, and it is possible to detect the intensity change of a polarized light component only with an optical sensor, or to detect that light with an optical sensor after it has passed through a polarizer.

The emitted recording light also can be UV light. With this configuration, the beam diameter can be smaller when focusing the irradiated light.

The wavelength of the emitted recording light and the wavelength of the emitted reference light can be the same. With this configuration, the recording light and the reference light can be irradiated using the same light source, so that the apparatus can be made smaller.

The wavelength of the emitted recording light and the wavelength of the emitted reference light also can be different. With this configuration, the irradiation of the reference light has no influence on the initial orientation of the coating, so that it is possible to provide an information recording/reproducing apparatus with a stable recording state.

The emitted recording light and the emitted reference light can both be laser light. With this configuration, the irradiated beams can be made sharp, so that it is possible to provide an information recording/reproducing apparatus with which high-density recording is possible.

The irradiation area of the emitted recording light on the medium surface can be smaller than the irradiation area of the emitted reference light on the medium surface. With this configuration, it is possible to provide an information recording/reproducing apparatus with few reading errors during recording/reproducing.

The energy density of the emitted recording light can be made larger than the energy density of the emitted reference light. With this configuration, recorded information is not destroyed by irradiating the reference light, so that it is possible to provide an information recording/reproducing apparatus with stable recording information.

The reference light emitting portion and the optical sensor can be provided on the same side of the recording medium, and the intensity change of a polarized component of the reflected reference light that has been reflected by the recording medium or the scatted reference light that has been scatted at the recording medium surface can be detected with the optical sensor. Thus, a reflection-type information recording/reproducing apparatus can be provided.

It is also possible to arrange the recording medium between the reference light emitting portion and the optical sensor, and to detect the intensity change of a polarized component of transmitted reference light that has been transmitted through the recording medium. Thus, a transmission-type information recording/reproducing apparatus can be provided.

The information recording/reproducing apparatus can record and reproduce optical information with the following methods.

One possible method is a method for recording and reproducing information on/from a write-once optical recording medium as described above, which includes a recording layer on which optical information can be recorded depending on whether an initial molecule orientation of a coating constituting the recording layer is changed or not by selectively irradiating focused light. In this method, information is recorded by selectively irradiating recording light onto the recording layer to write information elements depending on whether the initial molecule orientation of the coating constituting the recording film has been changed or not. Information is reproduced by selectively irradiating reference light that does not destroy the orientation of the polymer film on the recording layer, and detecting with an optical sensor, from the light that has passed through a polarizer, intensity changes in a polarized component of reflected light, transmitted light or scattered light of the reference light, which depend on whether the initial molecule orientation of the coating in the recording layer has been changed or not.

When reading information, it is preferable that the polarizer is arranged such that the polarization direction is parallel or perpendicular to the initial orientation of the coating. Thus, at the portions maintaining the initial orientation of the coating, light with an oscillation direction that is parallel to the initial orientation is reflected or transmitted. On the other hand, at the portions where the initial orientation of the coating has been changed, the orientation plane has been disturbed, so that almost no light with an oscillation direction that is parallel to the initial orientation is reflected or transmitted. Consequently, if the polarizer is arranged such that the optical transmission axis is parallel to the initial orientation of the coating, then at the portions maintaining the initial orientation of the coating, the intensity of a polarized light component parallel to the initial orientation of the molecules is large. On the other hand, at the portions where the initial orientation of the coating has not been maintained, the intensity of a polarized light component of reflected light and transmitted light parallel to the initial orientation of the molecules is small, due to the disturbance of the initial orientation. As a result, there is a change in intensity of the polarized light component between the portions that have maintained the initial orientation of the coating and the portions that have not maintained the initial orientation of the coating. Consequently, optical information can be read with high sensitivity by arranging a polarizer such that its optical transmission axis is parallel to the initial orientation of the coating. Conversely, if the polarizer is arranged such that its optical transmission axis is perpendicular to the initial orientation of the coating, then the intensity of the polarized component of the reflected light, the transmitted light and the scattered light becomes opposite to the above. Also in this case, it is possible to read optical information with high sensitivity.

Another possible method is a method for recording and reproducing information on/from a write-once optical recording medium as described above, which includes a recording layer on which optical information can be recorded depending on whether an initial molecule orientation of a coating constituting the recording layer is changed or not by selectively irradiating focused light. In this method, information is recorded by selectively irradiating recording light onto the recording layer to write information elements depending on whether the initial molecule orientation of the coating constituting the recording film has been changed or not. Information is reproduced by selectively irradiating polarized light that does not change the initial molecule orientation of the coating as reference light on the recording layer, and detecting with an optical sensor intensity changes in a polarized component of reflected light, transmitted light or scattered light of the reference light, which depend on whether the initial molecule orientation of the coating in the recording layer has been changed or not.

It is preferable that the reference light irradiated when reading the information oscillates in a direction that is parallel or perpendicular with respect to the direction in which the coating is oriented initially. If, at the portions that have maintained the initial orientation of the coating, the reference light oscillates in a direction that is parallel to the direction in which the coating is oriented initially, then the reference light is transmitted by the coating. In this case, if a reflective layer is provided, then the reflected light again is transmitted through the coating in the same oscillation direction. Therefore, the intensity of a polarized component of reflected light or transmitted light is large. On the other hand, at the portions that have not maintained the initial orientation of the coating, the initial orientation is disturbed, so that the intensity of the polarized component of reflected light or transmitted light is small. As a result, there is a change in intensity of the polarized light component between the port ions that have maintained the initial orientation of the coating and the portions that have not maintained the initial orientation of the coating. Consequently, optical information can be read with high sensitivity. Conversely, if the reference light is irradiated such that its oscillation direction is perpendicular to the initial orientation of the coating, then the intensity of the polarized component of the reflected light, the transmitted light and the scattered light becomes opposite to the above. Also in this case, it is possible to read optical information with high sensitivity, because there is a change in intensity in a polarized component, depending on whether or not the initial molecule orientation of the coating has been changed.

Yet another possible method is a method for recording and reproducing information on/from a write-once optical recording medium as described above, which includes a recording layer on which optical information can be recorded depending on whether an initial molecule orientation of a coating constituting the recording layer is changed or not by selectively irradiating focused light. In this method, information is recorded by selectively irradiating recording light onto the recording layer to write information elements depending on whether the initial molecule orientation of the coating constituting the recording film has been changed or not. Information is reproduced by selectively irradiating polarized light that does not change the initial molecule orientation of the coating as reference light on the recording layer, and detecting with an optical sensor, from the light that has passed through a polarizer, intensity changes in a polarized component of reflected light, transmitted light or scattered light of the reference light, which depend on whether the initial molecule orientation of the coating in the recording layer has been changed or not.

It is preferable that the irradiated light that is irradiated when reading information oscillates in a direction that is parallel or perpendicular with respect to the direction in which the coating is oriented initially. With this configuration, optical information can be read with high sensitivity.

It is also possible that the reference light irradiated when reading information oscillates parallel or perpendicular with respect to the direction in which the coating is oriented initially, and the polarizer is arranged such that the optical transmission axis is parallel or perpendicular with respect to the direction in which the coating is oriented initially. Thus, for the same reasons as explained above, it is possible to read optical information with high sensitivity.

It is also possible to write information by changing the initial molecule orientation of the coating using thermal energy of recording light that is irradiated when writing information. With this configuration, the initial molecule orientation of the coating can be changed easily, so that optical information can be written with high sensitivity.

The recording light that is irradiated when writing information and the reference light that is irradiated when reading information can be irradiated with different wavelengths.

UV light can be irradiated as the recording light.

The foregoing was an explanation of a first inventive concept (orientation changing optical recording film and application thereof).

The following is an explanation of a second inventive concept (photo-degradable or photothermally degradable optical recording film and application thereof).

According to the second inventive concept, information can be recorded by combining degraded portions and non-degraded portions obtained by classifying locally irradiated portions of an optical recording film as degraded portions and all other portions as non-degraded portions. Moreover, the monomolecular thin film can be formed without using vacuum vapor deposition, so that it can be used as an inexpensive recording layer. Also, with such an optical recording film, information is recorded using a degradation reaction (irreversible reaction), so that the storing properties of the recorded information are favorable. In the present invention, "substrate" includes both a substrate alone as well as a substrate with a thin film formed on its surface.

It is preferable that the degrading in the optical recording film is carried out by cleaving certain molecular bonds. Thus, information can be recorded with high precision, because the degraded portions are aligned by cleaving certain bonds. In particular with an optical recording film in which only one molecular bond is cleaved by irradiating light, information can be recorded with very high precision.

In the optical recording film, when the thin film is made of molecules having a photodegradable functional group, then that functional group is degraded by the irradiation of light, so that information can be recorded with high precision. Here, "photodegradable functional group" means a functional group that undergoes a degradation reaction through an excited state due to optical absorption. Using a molecule having such a functional group, the degradation reaction proceeds even at temperatures that are not very high, so that the substrate can be selected from a wider range. For the photodegradable functional group, it is possible to use any suitable functional group that can undergo a photodegradation reaction with UV light, such as a benzophenone residue, a benzyldimethylketal residue or a 1-hydroxy-cyclohexyl-phenylketone residue. With a functional group that undergoes a degradation reaction under UV light, fogging (unintended formation of degraded portions) will not occur when exposed to visible or infrared light during storage. Here, "residue" refers to the molecular form after reaction. For example, it can be a functional group or the like obtained by removing one or more hydrogen atoms from a chemical compound.

Also, if the thin film in the optical recording film is made of molecules including a thermally degradable functional group, then those functional groups are thermally degraded when irradiated with light, so that information recording can be carried out with high precision. Here, "thermally degradable functional group" refers to functional groups that undergo a degradation reaction utilizing the thermal effect of light. Using molecules having such a functional group, it is also possible to select the irradiated light without having to consider the absorbed wavelength, so that the recording light can be selected from a wider range. As the thermally degradable functional groups, a benzoin residue or a benzopinacole residue can be used.

It is preferable that the molecules constituting the thin film are straight-chain or rod-shaped molecules having a thermally degradable functional group or a photodegradable functional group on one molecule end, that the functional group on one molecule end is oriented in a direction pointing away from the substrate surface, and that the other end is covalently bonded to the substrate surface. Here, "straight-chain or rod-shaped molecules" (in the following also referred to simply as "straight-chain molecules") means molecules in which the group of atoms constituting the molecule is aligned in a straight line. With optical recording films made of such straight-chain molecules, the film constituting molecules are aligned as upright rods, and the thermally degradable functional groups or photodegradable functional groups are aligned at a predetermined position away from the substrate surface, so that the recording of information can be carried out with high precision. In particular, with straight-chain molecules including phenyl groups, the dipole moment in the molecules is large, so that there is the advantage that the energy for recording or reproducing can be small. Furthermore, if the light irradiation is constricted to a small region, then it is possible to record information at the molecule aggregate level (of several hundred to several thousand molecules), so that a recording medium with extremely high recording capacity can be provided.

For the functional group that is degraded when irradiated with light, it is suitable to use a photodegradable functional group or a thermally degradable functional group. Specific examples of those functional groups are noted above. As a chemisorptive group, it is preferable to use at least one functional group selected from the group consisting of halosilyl groups, alkoxysilyl groups and isocyanatosilyl groups. These functional groups are fixed by covalent bonds to the substrate by an elimination reaction with functional groups including active hydrogen, such as hydroxyl groups exposed at the substrate surface, so that an optical recording film with superior peel-off resistance and adhesiveness can be formed.

Moreover, for the substrate at which the functional groups reacting with the chemisorptive groups are exposed, it is preferable to use a substrate with exposed functional groups including active hydrogen. For the functional groups including active hydrogen, it is suitable to use hydroxyl groups. For reasons of availability and cost, it is preferable to use, as the substrate at which the functional groups including active hydrogen are exposed, a glass substrate, a ceramic substrate, a metal substrate, a synthetic resin substrate, or one of those substrates with a silica film or a silicon nitride film formed on it. The surface of these substrates is hydrophilic, so that the optical recording film can be formed efficiently. The silica film etc. can be formed easily by CVD, vacuum vapor deposition or sputtering, for example. If there is little exposed active hydrogen in these substrates, then it is preferable to increase the exposed active oxygen by at least one surface treatment method selected from the group consisting of plasma treatment, corona treatment and far UV light treatment.

It is preferable that after forming the film, the optical recording film formed on the substrate surface is rinsed with a non-aqueous organic solvent. This rinses away the chemisorptive molecules that have not been bonded to the substrate, so that an optical recording film can be provided in which the recording and reproducing of information can be carried out with high precision. As the non-aqueous organic solvent, it is possible to use a hydrocarbon solvent, a halogenized hydrocarbon solvent, a silicone-based hydrocarbon solvent, either alone or in a combination of two or more. With these solvents, the unreacted chemisorptive molecules can be removed reliably without reacting the optical recording film that has been formed.

It is preferable that the substrate is an optical reflective substrate or an optically transmissive substrate. If it is an optically reflective substrate, then the optical recording medium is one in which reflected light is detected after irradiation with reproduction light (reflective optical recording medium). For such an optically reflective substrate, it is preferable to use an optically reflective film such as a metal substrate, or to use a glass substrate, a ceramic substrate, a metal substrate or a synthetic resin substrate that has an optically reflective film formed on a suitable substrate surface. If a glass substrate, a ceramic substrate or a metal substrate is used, then the rigidity is high, so that an optical recording medium with superior durability can be provided. With a synthetic resin substrate, an optical recording medium with superior flexibility can be provided. Considering its high optical reflectance and low cost, it is preferable to use a film including aluminum as the optically reflective film. It is also possible to form an optically transmissive thin film on the uppermost surface of the substrate. If a silica film or a silicon nitride film is used for the optically transmissive thin film, then an optical recording medium with high recording density can be provided, because silica or silicon nitride films have a high density of exposed active hydrogen.

On the other hand, if the substrate is an optically transmissive substrate, then the optical recording medium is one in which after irradiation with reproduction light, the transmitted light is detected (transmissive optical recording medium). For such an optically transmissive substrate, it is suitable to use an optically transmissive substrate such as a glass substrate, or to use an optically transmissive substrate with an optically transmissive thin film formed on one or both sides. If a silica film or a silicon nitride film is used for the optically transmissive thin film, then an optical recording medium with high recording density can be provided.

If the optical recording medium has a plurality of information recording unit regions on which one information element can be written, depending on whether the film constituting molecules of the optical recording film are degraded or non-degraded, then an optical recording medium can be provided with which digital information can be recorded. Here, "information recording unit regions" means regions in which one information element is recorded on the optical recording film. "Information element" refers to the elements when the information has been broken down to its minimal units (information units). More specifically, in conventional binary recording formats, in which the information units are single bits of information expressed by "0"s and "1" s, those "0"s and "1" s are the information elements. If the information recording unit regions are dot-shaped, then more digital information can be recorded.

Regarding the shape of the substrate, disk shapes, tape shapes and card shapes are preferable, because this allows the utilization of technology for optical recording media that is already in existence. If the substrate is disk-shaped, then it is preferable that the information recording unit regions on the optical recording film are aligned in concentric rings or in a spiral shape, because this allows high recording densities. On the other hand, in the case of tape-shaped or card-shaped substrates, it is preferable that the information recording unit regions of the optical recording film are aligned in parallel straight-chain groups at a predetermined angle with respect to the longitudinal direction of the substrate, because this allows high recording densities.

If, in the information recording/reproducing method, a method is used as the recording method in which recording light is successively irradiated on the optical recording film, and degraded portions corresponding to the irradiated portions are formed successively, then information can be recorded sequentially. And if a method is used as the recording method, in which a light-blocking member provided with light-passing portions corresponding to irradiated portions on the optical recording film, or a light-passing member provided with light-blocking portions corresponding to the portions other than the irradiated portions on the optical recording film is placed in opposition to the optical recording film, recording light is irradiated via this member onto the optical recording film, and the degraded portions corresponding to the irradiated portions are formed all together, then a large amount of information can be recorded in a short time. Thus, the recording and the reproduction of information can be performed with high precision, since the degrading is performed by cleaving certain portions in the molecules.

If, in the information recording/reproducing method, a photodegradation reaction by optical irradiation or a thermal degradation reaction by optical irradiation is used when forming the degraded portions, then degraded portions can be formed in the optical recording film, and as a result, information can be recorded. If a photodegradation reaction is used, then the information recording can be carried out through a degradation reaction not involving high temperatures, so that the substrate can be selected from a broader range. On the other hand, if a thermal degradation reaction is used, then no consideration has to be given to the optical absorption wavelength with regard to the type of the optical recording film, so that the recording light can be selected from a broader range.

If UV light is used as the light for the recording, then the recording time (writing time) can be shortened, because of its high energy and its superior degradation efficiency. Furthermore, it can be constricted easily, so that recordings at high density are possible.

If infrared light or visible light is used for the light for reproduction, then the recorded information is hardly destroyed during reproduction, because of its low energy, so that reproduction can be carried out favorably.

Moreover, if the diameter of the recording light is smaller than the diameter of the reproduction light, then there is the advantage that the number of errors during recording can be decreased.

With the information recording/reproducing apparatus of the present invention, it is possible to carry out the recording and the reproduction of information on the above-described write-once optical recording medium with one apparatus.

Furthermore, it is preferable that in the information recording/reproducing apparatus of the present invention, the wavelength of the light that is irradiated from the recording light irradiation means is different from the wavelength of the light that is irradiated from the reproduction light irradiation means. This is, because if the recording light and the reproduction light have different wavelengths, then the recording of information during reproduction can be avoided. Furthermore, it is preferable that the recording light irradiation means irradiates UV light. It is also preferable that that the reproduction light irradiating means irradiates visible light or infrared light. Furthermore, if the diameter of the light that is irradiated by the recording light irradiation means is smaller than the diameter of the light that is irradiated by the reproduction light irradiation means, then recording errors can be inhibited. Moreover, if the power density of the reproduction light is smaller than the power density of the recording light, then recording during reproduction can be avoided.

It is also possible to devise an information recording/reproducing apparatus using the optical recording medium of the present invention as a computer system provided with an auxiliary storage device. With this configuration, a computer system that is inexpensive and has a high recording capacity can be provided. Here, "computer system" means a system that generally is provided with an arithmetic processing device having a main memory, an auxiliary storage device, an input device, an output device, and a communication control device controlling the communication among these devices, wherein upon a recording command entered from the input device, input information from the input device is transmitted as recording information signals of input information converted into electrical signals, via the arithmetic processing device to the auxiliary storage device, and recorded by the auxiliary storage device based on the transmitted recording information signals, and upon a reproduction command entered from the input device, the information recorded in the auxiliary storage device is read out as reproduction information signals from the auxiliary storage device, transferred via the arithmetic processing device to the output device, and reproduced by the output device based on the transferred reproduction information signals.

Also possible is a video signal recording/reproducing system provided with the information recording/reproducing apparatus of the present invention as a video storage device. With this configuration, a video signal recording/reproducing system that is inexpensive and has a high recording capacity can be provided. Here, "video signal recording/reproducing system" means a system that generally is provided with a video signal input/output control device controlling the input and the output of video signals, a video storage device, a video output device, and a control command input device for sending input/output control commands to the video signal input/output control device, wherein upon a recording command entered from the control command input device, video signals from an external video signal sender are transmitted via the video signal input/output control device to the video storage device, and the video information is recorded in the video storage device based on the transmitted video signals, and upon a reproduction command entered from the control command input device, the video information recorded in the video storage device is read out as reproduction video signals, transferred via the video signal input/output control device to the video output device, and reproduced by the video output device based on the transferred reproduction video signals.

As explained above, the present invention can provide an optical recording film made of an organic thin film formed by chemisorption and a method for manufacturing the same. Moreover, it can provide an inexpensive high-density write-once optical recording medium with which high-precision reading is possible. Furthermore, it can provide a computer system and a video signal recording/reproducing system using this write-once optical recording medium.

Embodiment 1

Figure 2A:
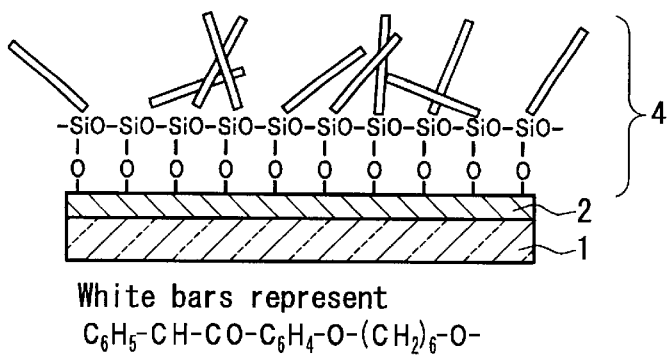
FIGS. 2A to 2C are diagrams schematically illustrating states of the chemisorptive thin film in Working Example 1 of the present invention.
Figure 2B:
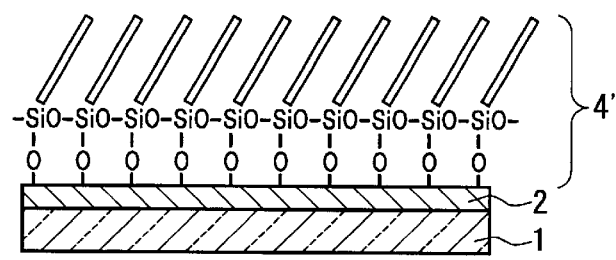
Figure 2C:
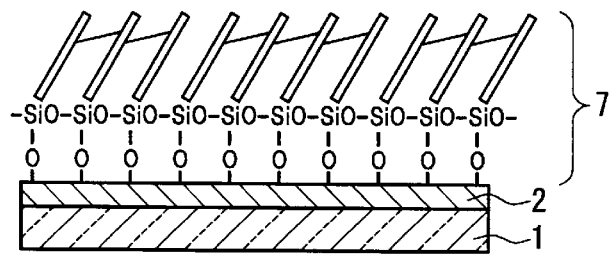

An embodiment of the optical recording film of the present invention is explained based on FIGS. 1 to 3, showing an example of a method for manufacturing the optical recording film. FIG. 1 is a diagram illustrating the chemisorptive thin film formation step of producing a monomolecular film on the substrate. FIGS. 2A to 2C schematically illustrate states of the chemisorptive thin film. FIG. 2A is a diagram illustrating the state of the monomolecular film before the orientation treatment. FIG. 2B is a diagram illustrating the state of the monomolecular film after the orientation treatment. FIG. 2C is a diagram illustrating the state of the monomolecular film after crosslinking.

First, the chemisorptive thin film formation step is performed, which forms a chemisorptive thin film on the substrate 1. There is no particular limitation regarding the material of the substrate 1, and depending on the purpose of use, it is possible to use a variety of materials known in the art. Regarding their ease of handling, it is preferable to use a metal, a ceramic or a synthetic resin, for example. If the substrate is disk-shaped, then it is preferable to use a metal, such as aluminum or an aluminum alloy, glass, a ceramic, or polycarbonate, because of the rigidity of those materials. If the substrate is tape-shaped, then it is preferable to use a synthetic resin with superior flexibility, such as polyester. There is no particular limitation regarding the shape of the substrate.

In the example in FIG. 1, a disk-shaped substrate 1 is used. The substrate does not have to be disk-shaped, and it also can be tape-shaped or card-shaped. Furthermore, also in the optically oriented film, it is possible to provide a reflective film 2 on a substrate 1, as for the optical recording medium. It should be noted that the reflective film 2 also can be a primer layer in accordance with the present invention.

For the chemisorptive thin film formed on the substrate, a chemisorptive solution 3 is prepared by dissolving in a non-aqueous organic solvent under a dry atmosphere a chemisorptive substance including a photosensitive group and a functional group (surface-active agent) that forms a chemical bond by reaction with the reflective layer 2. Then, the chemisorptive solution 3 is brought into contact with the substrate 1, and the molecules of the chemisorptive substance in the chemisorptive solution 3 are chemisorbed by the surface of the substrate 1.

A preferable chemisorptive substance is a silane-based chemisorptive substance including a photosensitive group. More specifically, using the compound $C_6H_5$—CH═CH—CO—$C_6H_4$—O—$(CH_2)_6$—O—$SiCl_3$, which includes a photosensitive group and a trichlorosilane group, as a silane-based compound, the chemisorptive reaction shown in the following chemical reaction (F) takes place. That is to say, the chlorosilyl groups in the compound and the OH-groups present at the surface of the substrate 1 undergo a dehydrochlorination reaction, and the compound is chemisorbed to the surface of the substrate 1.

(Formula 14)

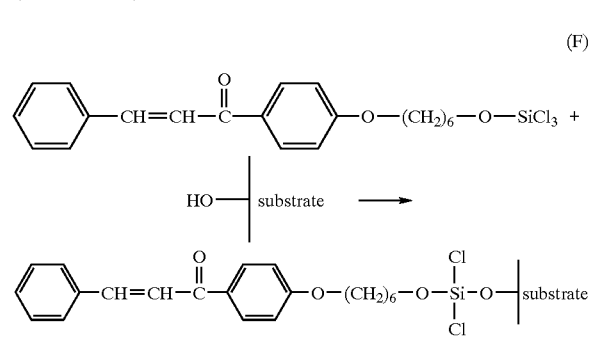

(F)

Here, the silane compound is highly active with respect to water, so that it is deactivated when the water content in the chemisorptive solution is too high. Thus, to let the chemisorption reaction proceed smoothly, a non-aqueous organic solution is used, which contains no active hydrogen groups, such as —OH groups. Furthermore, it is preferable that the bringing into contact of the chemisorptive solution with the surface of the substrate 1 takes place in a dry atmosphere. Furthermore, "chemisorptive solution including a silane compound" means a solution in which a silane compound has been dissolved in a solvent, but it also can be one in which a portion of the silane compound is not dissolved. An example of such a solution is a supersaturated chemisorptive solution.

Examples of silane compounds that can be used for the present invention include the compounds listed below:

(a1)

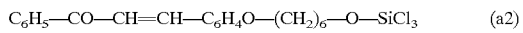

(a2)

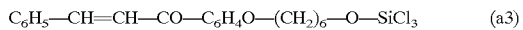

(a3)

Of these compounds, the compound (a1) includes a cinnamoyl group as the photosensitive group, whereas the compounds (a2) and (a3) include a chalconyl group as the photosensitive group.

Furthermore, instead of the chlorosilane compound, it is also possible to use an isocyanate compound or an alkoxy compound, in which the chlorosilyl group has been replaced by an isocyanate group or an alkoxy group. For example, the following compounds can be given as examples:

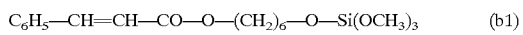

(b1)

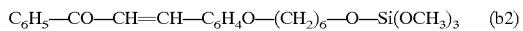

(b2)

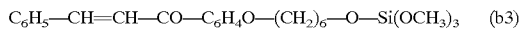

(b3)

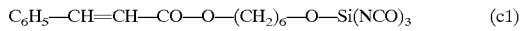

(c1)

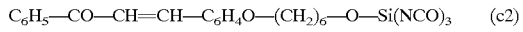

(c2)

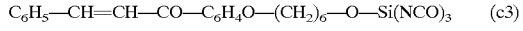

(c3)

The chlorosilane compound in (a1) to (a3) undergoes a dehydrochlorination reaction with the active hydrogen present at the primer surface, for example the hydrogen included in —OH groups, —COOH groups, —CHO groups, —$NH_2$ groups or >NH groups, forming covalent bonds.

Moreover, the alkoxy silane compound in (b1) to (b3) undergoes a dealcoholization reaction with the active hydrogen present at the primer surface, for example the hydrogen included in —OH groups, —COOH groups, —CHO groups, —$NH_2$ groups or >NH groups, forming covalent bonds.

Moreover, the isocyanate silane compound in (c1) to (c3) undergoes a deisocyanation reaction with the active hydrogen present at the primer surface, for example the hydrogen included in —OH groups, —COOH groups, —CHO groups, —$NH_2$ groups or >NH groups, forming covalent bonds.

The film obtained by such an elimination reaction is also called a "chemisorptive film" or "self-assembling film."

When an isocyanate compound or an alkoxy compound is used, and the chemisorption is carried out by contact with the substrate, then the generation of hydrogen chloride (HCl) can be prevented. Thus, there are the advantages that the substrate is not damaged, and that the workability is superior.

Moreover, examples of suitable organic solvents for dissolving the chemisorptive substance include dehydrated hydrocarbon-based solvents, carbon fluoride solvents and silicone solvents, and solvents that can be used as petroleum-based solvents include petroleum naphtha, solvent naphtha, petroleum ether, petroleum benzine, isoparaffin, normal paraffin, decalin, industrial gasoline/kerosene, ligroin, dimethylsilicone, phenylsilicone, alkyl modified silicone and polyester silicone. As a carbon fluoride solvent, it is possible to use a fluorocarbon based solvent, Fluorinate (trademark by 3M Corp.) or Afluide (trademark by Asahi Glass Corp.), for example. These solvents can be used alone or, if compatible solvents, in a mixture of two or more. In particular, silicone has a low water content, a low moisture absorbance, and easily dissolves chlorosilane compounds, so that it can prevent the direct contact between the chlorosilane compound and water. Consequently, with a chlorosilane compound and a solvent including silicone, it is possible to avert the adverse influence of hydrolysis due to the water components in the atmosphere during contact with the primer layer.

If, after the oriented film formation step, the substrate is rinsed with a rinsing solution made of a non-aqueous organic solvent to remove the non-adsorbed chemisorptive thin film constituting molecules present on the substrate, then a chemisorptive thin film of the monomolecular film 4 can be formed. Examples of a suitable rinsing method are immersion and steam rinsing. With steam rinsing, all the excessive non-adsorbed chemisorptive thin film constituting molecules on the entire surface of the substrate 1 can be removed aggressively by the osmotic force of the steam, so that it is particularly effective.

By rinsing, a monomolecular film 4 is attained, in which the lipophilic groups $C_6H_5$—CH=CH—CO—$C_6H_4$—O—$(CH_2)_6$—O—Si(—O—)$_3$ are exposed at the surface of the substrate 1.

The non-aqueous organic solvent that is used can be the solvent used for the dissolving of the chemisorptive substance. If a chlorosilane compound, which is one type of silane compounds, is used for the chemisorptive substance, then it is preferable that chloroform or N-methyl-2-pyrrolidone is used for the rinsing solution. Chloroform not only can rinse monomers, it is also superior in the removing of chlorosilane polymers which are generated by the reaction of the chlorosilane compound with water.

When the rinsing solution is dried, the monomolecular film 4 shown in FIG. 2A is obtained.

A polymer film can be formed as the chemisorptive thin film by applying a solution including the silane compound and a solvent to the substrate 1, initiating an elimination reaction with the active hydrogen at the substrate surface, then removing the solvent by drying, heating the substrate 1, and curing the precursor by hydrolysis.

If a polymer film is used as the chemisorptive thin film, and the film thickness of the polymer film is large, then the contrast during read-out between regions where the initial molecule orientation of the coating has changed and regions where it has not changed is small, so that a small film thickness is better. More specifically, it is preferable that the thickness of the chemisorptive thin film is in the range of 0.5 nm to 20 nm.

Next, the chemisorptive thin film formed on the substrate 1 is subjected to an orientation treatment by photoorientation (polarized light orientation step; see FIG. 2B). Thus, a monomolecular film 4' that is oriented in a predetermined direction is obtained. This chemisorptive thin film is a monomolecular film resulting from the chemisorption of aggregate groups of silane compound molecules, wherein the majority of the chemisorptive thin film constituting molecules are exposed orderly at the surface. Therefore, it has superior sensitivity with respect to polarized light, and it is possible to give the film an anisotropic orientation by irradiation of polarized light of low intensity. Furthermore, since the thickness of the orientation film is that of a chemisorptive super-thin film, it is possible to read optical information with high sensitivity. Moreover, in the case of a polymer film with photosensitive groups, the orientation treatment can be carried out with an optical orientation method.

More specifically, optical orientation is performed by the following method. The following explanations refer to the case in which a disk-shaped substrate is subjected to an orientation treatment. Focused polarized UV light (for example, light centered around the 1-line of an extra-high pressure mercury lamp of 313 nm wavelength) having a wavelength distribution near 300 nm to 400 nm is irradiated through a polarizer onto the entire substrate in a direction that is substantially perpendicular to the substrate surface while rotating the substrate and while shifting the focused light in a radial direction, such that the polarization direction is parallel to the shifting direction of the substrate.

The irradiation intensity of the polarized UV light can be in the range of for example 50 to 3000 mJ/cm$^2$ (wavelength: 365 nm). If the chemisorptive thin film is a polymer film with photosensitive groups, then the irradiation intensity of the polarized UV light can be in a range of 500 to 5000 mJ/cm$^2$ (wavelength: 365 nm), for example.

By performing this polarized light orientation step, it is possible to selectively photo-polymerize the photosensitive groups of the chemisorptive thin film constituting molecules in the chemisorptive thin film, and to bond the chemisorptive thin film constituting molecules at the surface of the substrate 1 by crosslinking along the substrate surface (see FIG. 2C). With this polarized light orientation treatment, the monomolecular film 4 is oriented in a predetermined direction and turned into a chemisorptive thin film 7 with orienting properties.

If the chemisorptive thin film is a polymer film without photosensitive groups, then it can be subjected to an orientation treatment by a conventional method known in the art, such as a rubbing method. In this case, the chemisorptive thin film 7 with orienting properties has an orientation regulating force in the rubbing direction.

Figure 3A:
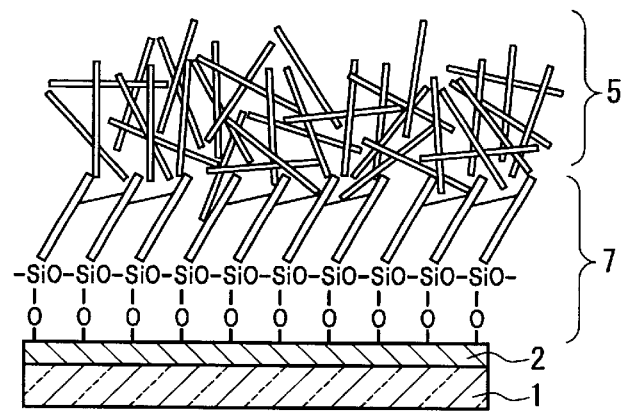
FIGS. 3A to 3C are conceptual diagrams illustrating how the coating is formed in Working Example 1 of the present invention.
Figure 3B:
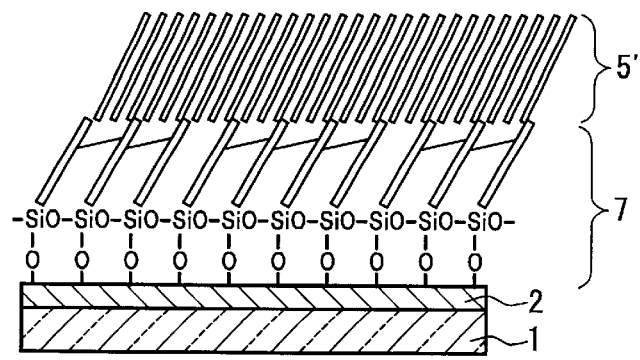
Figure 3C:
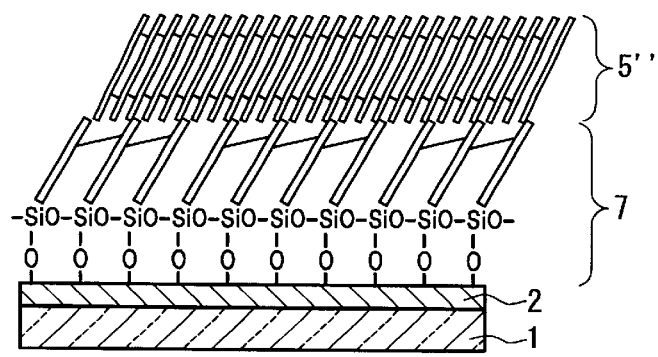

Next, a solution in which polymerizable molecules have been dissolved is applied to the surface of the chemisorptive thin film 7 with orienting properties, thus bringing the polymerizable molecules in contact with the chemisorptive thin film surface, the solvent is removed, and with the orientation regulating force of the chemisorptive thin film, the group of polymerizable molecules is aligned with a predetermined tilt in a predetermined direction on the surface of the chemisorptive thin film. FIGS. 3A to 3C are conceptual diagrams illustrating how the coating of the present invention is formed. FIG. 3A illustrates how a group of polymerizable liquid crystal molecules is present on the chemisorptive thin film. FIG. 3B illustrates the state of the group of the polymerizable liquid crystal molecules after the orientation treatment. And FIG. 3C illustrates the state of the monomolecular film after polymer bonding.

There is no particular limitation regarding the polymerizable molecules, as long as they can be aligned with the orientation regulating force of the chemisorptive thin film 7 with orienting properties, but polymerizable liquid crystal molecules are preferable. Polymerizable liquid crystal molecules can be aligned uniformly on the chemisorptive thin film surface with the orientation regulating force of the chemisorptive thin film.

In this initial polymerizable molecule orientation step, the polymerizable liquid crystal molecules are dissolved in an organic solvent. The organic solvent preferably has a boiling point of at least 100° C. and at most 250° C. Examples of suitable organic solvents are xylene and toluene.

There is no particular limitation regarding the method for bringing the polymerizable molecules in contact with the substrate surface, and a suitable method is application with a spinner, for example.

When the substrate to which the liquid, in which the polymerizable molecules have been dissolved, is dried, the group 5 of polymerizable liquid crystal molecules is present in a non-oriented state on the chemisorptive thin film 7 with orienting properties (FIG. 3A). Thereafter, the entire substrate 1, on which this film of photo-polymerizable liquid crystal molecules is formed, is heated, and the polymerizable liquid crystal molecules are put into an isotropic state. Then, cooling down slowly to room temperature, a film 5' is attained in which the group 5 of photo-polymerizable liquid crystal molecules has been oriented by the orientation regulating force of the chemisorptive thin film on the substrate (FIG. 3B). The cooling speed can be slower than 10° C./10 min from 100° C. to 25° C., for example. It is preferable that the film thickness of the polymerizable molecules is in the range of 10 nm to 100 nm.

Next, a coating formation step of forming a coating 5" is carried out, in which the molecules are polymerized or crosslinked. There is no particular limitation regarding the coating formation step, as long as it is a method that can polymerize the polymerizable molecules, and it preferably polymerizes the polymerizable molecules by irradiation of light onto the polymerizable molecules (FIG. 3C).

In the coating formation step, it is preferable to use photo-polymerizable liquid crystal molecules as the polymerizable molecules. Thus, the molecules can be polymerized by irradiating light.

There is no particular limitation regarding the irradiation of light, as long as it can polymerize the polymerizable molecules, but UV light 6 promoting the polymerization is preferable.

For the polymerizable liquid crystal molecules, it is also possible to use the substance expressed by the above-noted general formula (A) mixed with functional acrylate monomers that are different from that substance. This promotes the polymerization reaction even more.

For the functional acrylate monomers, it is possible to use for example a monofunctional acrylate (such as methylmethacrylate, 2-ethylhexylacrylate, 2-hydroxyethylacrylate, 2-hydroxypropylacrylate, etc.), a 2-functional acrylate (such as 1,3-butanediol diacrylate, 1,4-butanediol diacrylate, 1,6-hexanediol diacrylate, diethyleneglycol diacrylate, neopentylglycol diacrylate, etc.), a 3-functional acrylate (such as pentaerythritol triacrylate, trimethylolpropane triacrylate, etc.), a 4-functional acrylate (such as pentaerythritol tetraacrylate, trimethylolpropane tetraacrylate, etc.), a 5-functional acrylate (such as dipentaerythritol pentaacrylate, etc.), a 6-functional acrylate (such as dipentaerythritol hexaacrylate, etc.), or a >5-functional acrylate (such as dipentaerythritol penta- and hexaacrylate, etc.). Moreover, it is also possible to use functional oligomers, such as epoxy acrylate, urethane acrylate, polyester acrylate, polyether acrylate, silicon acrylate, for example.

Furthermore, it is also possible to add a substance that responds to UV light as a sensitizing agent. For example, a sensitizing agent containing a —C$_6$H$_5$CO— group can be used. Adding several percent of such a sensitizing agent (for example Irgacure™ 651, 184, 500 by Japan Ciba-Geigy Corp. or Kayacure™ BDMK, BP-100 by Nippon Kayaku Corp.) promotes the photoreaction, and shortens the polymerization time considerably.

Figure 4:
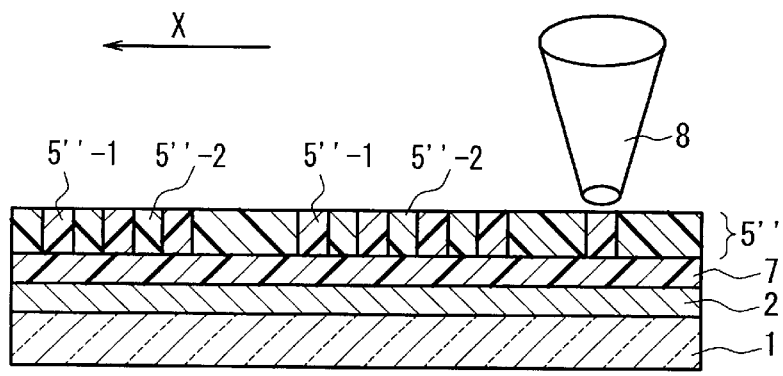
FIG. 4 is a conceptual diagram showing how optical information is recorded on the optical recording film of Working Examples 1 to 4 of the present invention.

Optical information can be recorded on the optical recording film obtained as described above, depending on whether the initial molecule orientation of the coating has been changed by irradiating focused light selectively or not. More specifically, the optical information recording is carried out as shown in FIG. 4. FIG. 4 is a conceptual diagram showing how optical information is recorded on the optical recording film of the present invention.

Focused light is irradiated as dots on the coating 5", while shifting the substrate 1. In regions 5"-1, in which light has been irradiated on the coating 5", the initial molecule orientation of the coating is changed. On the other hand, in regions 5"-2, in which light has not been irradiated on the coating 5", the initial molecule orientation of the coating stays the same. That is to say, with the optical recording film of the present invention, regions with a changed initial molecule orientation and regions with an unchanged initial molecule orientation are formed on the coating by selectively irradiating the coating with light that changes the initial orientation of the coating, thus writing the optical information.

Embodiment 2

The optical recording medium of this embodiment is an example using the above-described optical recording film as an optical recording layer. The aspects that are different from the above-described optical recording film are explained with reference to FIG. 4.

The optical recording medium of the present invention is made of a medium substrate and an optical recording layer. The medium substrate includes at least a substrate 1. Besides the substrate itself, the medium substrate also can include layers different from the optical recording layer, such as a reflective layer or a surface protection layer. As the material of the substrate 1, the material used for the optical recording film in Embodiment 1 can be used.

If the medium substrate is made of a substrate 1 and a reflective layer 2 including a metal that is layered on this substrate, a reflective optical recording medium is obtained. The reflective layer can include at least aluminum. Examples of this include aluminum and aluminum alloys (such as aluminum containing silicon, for example).

A reflective film 23 including such a metal can furnish active hydrogen to the surface of the medium substrate. Consequently, if a synthetic resin is used as the substrate, it also can function as a layer with active hydrogen.

There is no particular limitation to the method for layering the reflective layer 2 on the medium substrate, and any method known in the art can be used. For example, using vapor deposition, a thin and uniform layer can be formed, and is therefore preferable.

It is also possible to form a transparent protective layer made of an inorganic substance immediately after the metal reflective layer 2 has been formed. This prevents corrosion of the reflective film. As such an inorganic layer, $SiO_2$ or $SiN_x$ can be used, for example. As the method for forming the transparent protective film, it is possible to use any method selected from the group consisting of CVD, vapor deposition and sputtering.

If the substrate is a synthetic resin, then active hydrogen can be introduced to the substrate surface by any method selected from the group consisting of plasma treatment, corona treatment and far UV treatment performed on the substrate surface before the chemisorptive thin film formation step. As the source of active hydrogen present on the medium substrate surface, it is possible to use hydroxyl groups.

Figure 5A:
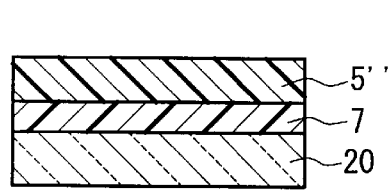
FIGS. 5A to 5E are diagrams schematically illustrating variations of the recording regions formed on the optical recording medium in accordance with Embodiment 1 of the present invention.
Figure 5B:
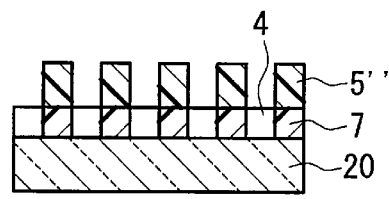
Figure 5C:
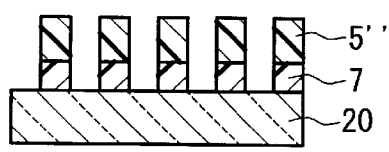
Figure 5D:
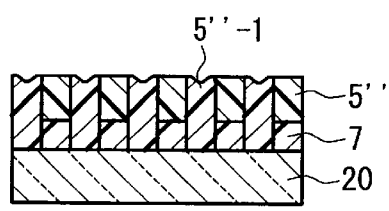

In the recording layer, the coating 5" can be provided over the entire surface of the chemisorptive thin film 7 with orienting properties. FIGS. 5A to 5E schematically illustrate how various types of recording regions are provided on an optical recording medium of the present invention. More specifically, the chemisorptive thin film 7 with orienting properties can be provided over the entire surface of the medium substrate 20, and the coating 5" can be provided on the entire surface of the chemisorptive thin film 7 (FIG. 5A). It is also possible to provide a chemisorptive thin film over the entire surface of the medium substrate 20, but let only a portion 7 of this chemisorptive thin film have orienting properties, and to provide the coating 5" on this portion 7 of the chemisorptive thin film with orienting properties (FIG. 5B). It is further possible to provide a chemisorptive thin film 7 with orienting properties partially on the surface of the medium substrate 20, and to provide the coating 5" on this chemisorptive thin film 7 with orienting properties (FIG. 5C). Moreover, it is also possible to provide the chemisorptive thin film 7 with orienting properties partially on the surface of the substrate medium 20, and to provide the film made of polymerizable molecules on the entire surface of the medium substrate 20, but to orient only the coating 5" provided on the chemisorptive thin film (FIG. 5D).

Figure 5E:
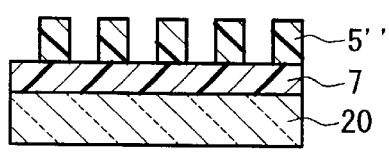

The coating 5" also can be provided partially on the surface of the chemisorptive thin film 7 with orienting properties. For example, it is possible to provide the chemisorptive thin film 7 with orienting properties over the entire surface of the medium substrate 20, and to provide the coating 5" partially on the surface of the chemisorptive thin film 7 (FIG. 5E).

A method for providing the chemisorptive thin film 7 partially on the surface of the medium substrate 20 is to form a monomolecular film or a polymer film partially on the surface of the medium substrate, and to subject the monomolecular film or polymer film to an orientation treatment, for example. Another possibility is to provide the chemisorptive thin film on the entire surface of the medium substrate 20, and then to perform a partial orientation treatment by masking the chemisorptive thin film.

A method for providing the coating 5" partially on the surface of the chemisorptive thin film can be, for example, as follows. The coating 5" can be formed by applying polymerizable molecules partially onto the chemisorptive thin film 7. Alternatively, the coating 5" can be formed by applying polymerizable molecules to the entire chemisorptive thin film, and partially subjecting it to an orientation treatment.

If the coating 5" is provided partially on the medium substrate 20 with the above-described methods, then the coating 5" functions as an optical recording region 19 of the optical recording layer.

If the medium substrate is disk-shaped or tape-shaped, then the following medium substrates can be obtained.

If the medium substrate is disk-shaped, and the coating 5" is provided in concentric rings or in a spiral shape along a track pattern on the medium substrate, then an optical recording film can be obtained in which optical recording regions are arranged in concentric rings or spiral shape on the medium substrate. Moreover, the coating can be continuous and linear, or it can be formed of aligned dots.

If the medium substrate is tape-shaped, and the coating 5" is provided on the medium substrate in linear groups that are parallel to a direction intersecting at a predetermined angle with the longitudinal direction of the tape along a track pattern, then an optical recording medium can be obtained, in which the recording layer is formed by arranging the optical recording regions on the medium substrate in linear groups that are parallel to a direction intersecting at a predetermined angle with the longitudinal direction of the tape.

If the chemisorptive thin film is oriented by rubbing, then, in the case of a disk-shaped medium substrate, the entire surface of the polymer film can be rubbed while rotating the medium substrate. In the case of a tape-shaped medium substrate, the polymer film can be rubbed while letting the medium substrate travel forward. Furthermore, it is possible to produce a tape-shaped optical recording medium by rubbing the polymer film while letting a medium substrate film of a broad width travel forward, and cutting this medium substrate film after the chemisorptive thin film has been formed on the polymer film. Conversely, it is also possible to keep the medium substrate fixed and move or spin a rubbing roll. There is no particular limitation regarding the shape of the rubbing roll used for rubbing, and it is possible to use a cylindrical or a truncated cone-shaped rubbing roll, for example.

Embodiment 3

Figure 6:
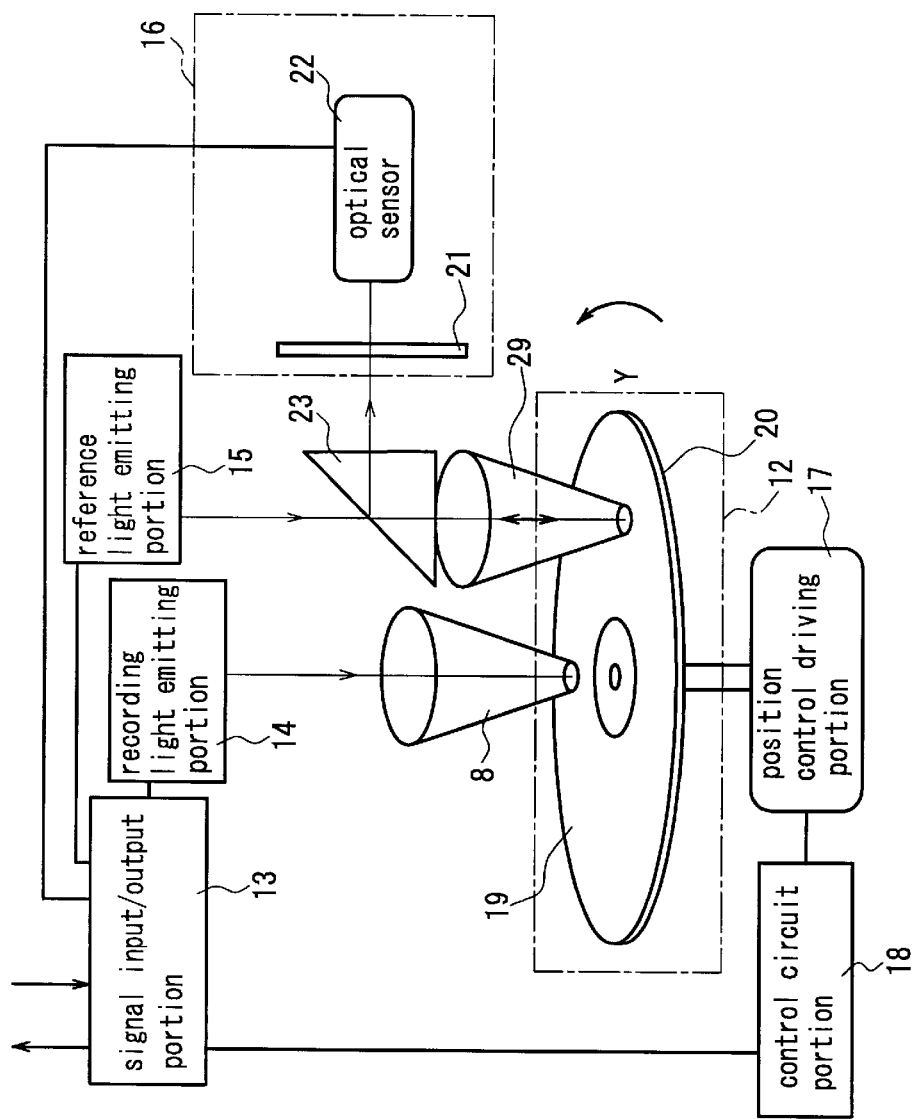
FIG. 6 is a conceptual diagram showing an example of an information recording/reproducing apparatus in accordance with Working Example 4 of the present invention.

FIG. 6 is a conceptual diagram showing an example of an information recording/reproducing apparatus in accordance with the present invention. The information recording/reproducing apparatus shown in FIG. 6 includes an information recording portion (not shown in the drawings) having an optical recording medium 12 manufactured as in Embodiment 2, a signal input/output portion 13, a recording light emitting portion 14, a reference light emitting portion 15, an information element detecting portion 16, a position control driving portion 17, and a control circuit portion 18.

The optical recording medium is rotatively driven by rotative driving with the position control driving portion 17. In the example in FIG. 6, it is rotated in the Y-direction. When recording optical information, an optical signal related to external recording information is transmitted from the signal input/output portion 13 to the recording light emitting portion 14.

The recording light emitting portion 14 emits recording light selectively, in accordance with an information signal made of ON/OFF signals. The recording light emitting portion 14 includes a focusing device, which focuses the emitted recording light (as indicated by numeral 8). There is no particular limitation regarding the recording light, as long as it is light that changes the initial molecule orientation of the optical recording regions of the optical recording medium. An example of suitable recording light is UV light.

With the recording light that is emitted selectively, optical information is written on the optical recording medium 12, by forming portions in which the initial molecule orientation of the optical recording regions has been changed and portions in which the initial molecule orientation of the optical recording regions has not been changed (FIG. 4).

During the reproduction of the optical information, light that does not change the initial molecule orientation of the coating constituting the recording film is emitted selectively as reference light. The reference light emitting portion 15 includes a focusing device, which focuses the emitted reference light (as indicated by numeral 29). There is no particular limitation regarding the reference light, as long as it is light that does not change the initial molecule orientation in the optical recording regions of the optical recording medium, but preferably it is polarized light.

When reference light is irradiated on the optical recording regions 19 of the optical recording medium 12, the intensity of a polarized component of the reflected light, transmitted light or scattered light of the reference light is changed depending on whether the initial molecule orientation has been changed or not. This intensity change is detected with the information element detecting portion 16. In the example in FIG. 6, it is picked up with an optical sensor 22 through a polarizer 21. It should be noted that if polarized light is irradiated as the reference light, then it is possible to pick up intensity changes with the optical sensor 22 also without the polarizer 21. There is no particular limitation regarding the polarizer 21, and it is possible to use one of the polarizers known in the art, such as an ordinary polarization plate. Furthermore, if the direction of the transmission axis of the polarizer is parallel or perpendicular to the orientation of the molecules of the coating, then it is possible to change the forward direction of the light with a beam splitter 23 such that the oscillation direction of the light does not change before it is incident on the polarizer. The detected result is converted into a predetermined electrical signal by the information element detecting portion 16. The electrical signal is outputted by the signal input/output portion 13 to an external detector (not shown in the drawings). With the external detector it is possible to detect the reproduced signal and thus to read information that has been recorded in the optical recording regions 18.

The wavelength of the emitted recording light and the wavelength of the emitted reference light can be the same. In this case, the recording light emitting portion 14 and the reference light emitting portion 15 can be combined, so that a simpler information recording/reproducing apparatus can be provided.

Furthermore, if the recording light emitting portion 14 and the reference light emitting portion 15 have different configurations, then the recording light and the reference light can be irradiated at different wavelengths, so that it is possible to provide an information recording/reproducing apparatus with stable optical information recording, in which no changes of the orientation of the molecules occur during the reading of optical information. In this case, it is preferable that the recording light is UV light.

It is also possible to devise both the emitted recording light and the emitted reference light as laser light. Thus, it is possible to improve the focusing precision of both the recording light and the laser light.

The surface area of the medium substrate irradiated with the emitted recording light can be made smaller than the surface area of the medium substrate irradiated with the emitted reference light. Thus, it is possible to reduce the number of read-out errors during reading.

The energy density of the emitted recording light can be made larger than the energy density of the emitted reference light on the medium substrate. Thus, the orientation of the coating does not change during reading, so that an information recording/reproducing apparatus with stable optical information recording can be provided.

As shown in FIG. 6, the reference light emitting portion 15 and the optical sensor 22 can be provided on the same side of the surface of the recording medium 12. In this case, intensity changes in the reflection light of emitted reference light that is reflected by the recording medium 12 or the scattered light of emitted reference light that is scattered at the surface of the recording medium 12 are detected by the optical sensor 22.

It is also possible to provide the recording medium 12 between the reference light emitting portion 15 and the optical sensor 22. In this case, changes in the intensity of transmission light of emitted reference light that is transmitted through the recording medium 12 are detected by the optical sensor 22.

If the change in intensity of a polarized component of the reflected light, the transmitted light or the scattered light of the emitted reference light is detected by the optical sensor 22 through the polarizer 21, then the polarizer 21 can be arranged such that its optical transmission axis is parallel or perpendicular to the initial orientation of the coating. It should be noted that "initial orientation of the coating" refers to the extended direction of the long axis of the molecules on the projection plane, when the polymerizable molecules, which are tilted in a predetermined direction on the chemisorptive thin film with orienting properties, are projected on the medium substrate. More specifically, it refers to the X-direction in FIG. 4.

When polarized light is irradiated as the reference light, and intensity changes in a polarized component of reflected light, transmitted light or scattered light of the reference light are detected with the optical sensor 22 without passing through the polarizer 21, then the irradiated polarized light can oscillate such that the polarization direction is parallel or perpendicular to the initial orientation of the coating.

When polarized light is irradiated as the reference light, and intensity changes in a polarized component of reflected light, transmitted light or scattered light of the reference light are detected with the optical sensor 22 through the polarizer 21, then the irradiated polarized light can oscillate such that the polarization direction is parallel or perpendicular to the initial orientation of the coating. Alternatively, the polarizer can be arranged such that the optical transmission axis becomes parallel or perpendicular to the initial orientation of the coating.

The control circuit portion 18 sends control signals to the position control driving portion 17, the recording light emitting portion 14, and the information element detecting portion 15, coordinating the movement of the medium substrate 20 with the emission position of the recording light and the emission position of the reference light.

Embodiment 4

Figure 7:
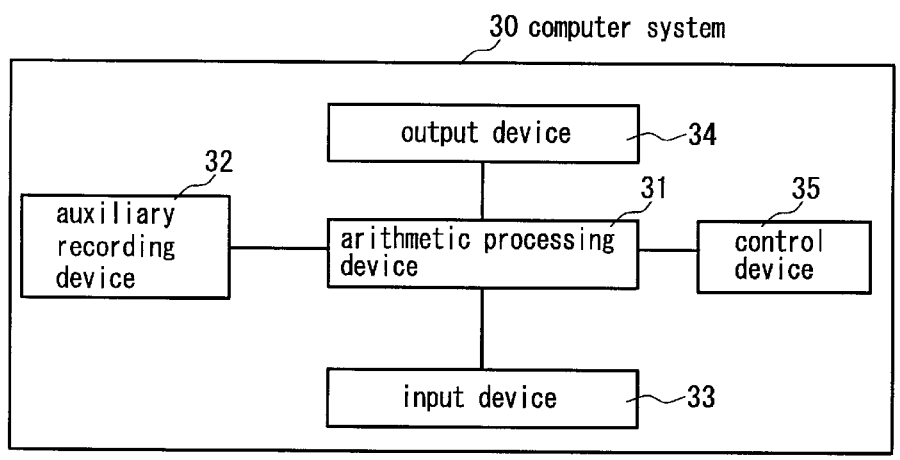
FIG. 7 is a conceptual diagram showing an example of a computer system using an optical recording medium in accordance with Working Example 5 of the present invention.

FIG. 7 schematically illustrates an example of a computer system using an optical recording medium in accordance with the present invention.

The computer system 30 of this embodiment includes an arithmetic processing device 31 having a main memory, an auxiliary recording device 32 connected to the arithmetic processing device using the optical recording medium 12 of the present invention as an auxiliary memory, an input device 33 connected to the arithmetic processing device, an output device 34 connected to the arithmetic processing device and a control device 35 controlling the data communication between the various devices. Here, "connected" refers to an operational connection, and not necessarily a physical connection or presence in the same physical location.

In response to a recording command from the input device 33, the input information from the input device 33 is transmitted as recording information signals to the auxiliary recording device 32, through the arithmetic processing device 31.

The optical recording medium is rotatively driven by the position control driving portion. During the information recording, the recording information signals are transmitted from the signal input/output portion to the recording light emitting portion.

The recording light emitting portion selectively emits the recording light in correspondence to the information signal made of ON/OFF signals.

The selectively emitted recording light writes recording information onto the optical recording medium, with portions where the initial molecule orientation of the optical recording regions has been changed, and portions where the initial molecule orientation of the optical recording regions has not been changed.

During the reproduction of the recorded information, light that does not change the initial molecule orientation of the coating constituting the recording layer is emitted selectively as reference light. The reference light emitting portion includes a focusing device, which focuses the emitted recording light. There is no particular limitation regarding the reference light, as long as it does not change the orientation state of the optical recording regions on the optical recording medium, but it is preferably polarized light.

When, upon a reproduction command from the input device 33, reference light is irradiated on the optical recording regions of the optical recording medium, the intensity of a polarized component of the reflected light, the transmitted light or the scattered light of the reference light varies depending on whether the initial molecule orientation has been changed. This intensity change is detected with an optical sensor through a polarizer. The detected result is then converted into a predetermined electrical signal. This electrical signal is outputted by the signal output portion and transmitted via the arithmetic processing device 31 to the output device 33. Based on the transmitted reproduction information signal, the information is then reproduced by the output device 34.

Embodiment 5

Figure 8:
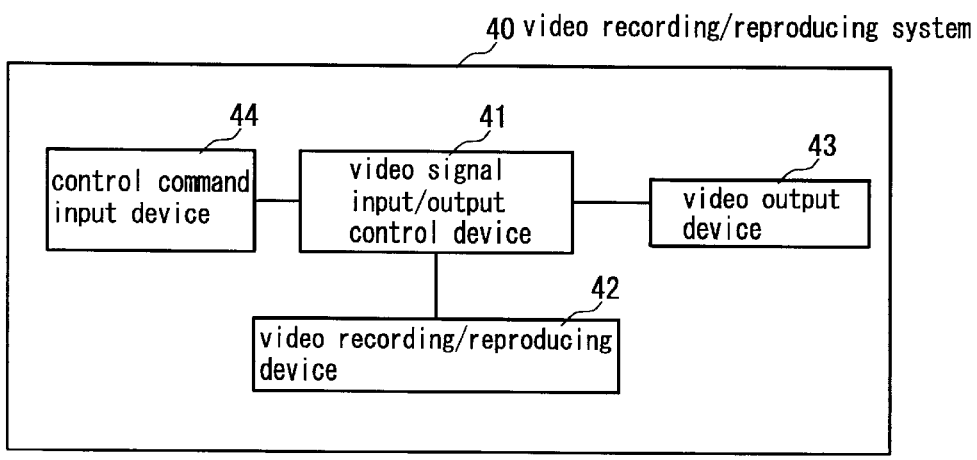
FIG. 8 is a conceptual diagram showing an example of a video recording/reproducing system using an optical recording medium in accordance with Working Example 6 of the present invention.

FIG. 8 schematically illustrates an example of a video recording/reproducing system using an optical recording medium in accordance with the present invention.

The video recording/reproducing system 40 of the present embodiment includes a video signal input/output control device 41 for controlling the input source and the output destination of the video signal, a video recording/reproducing device 42 using the optical recording medium of the present invention connected to the video signal input/output device, a video output device 43 connected to the video signal input/output control device, and a control command input device 44 connected to the video signal input/output device, which sends input/output control commands to the video signal input/output control device. Here, "connected" refers to an operational connection, and does not necessitate a physical connection or presence in the same physical location.

In response to a recording command from the video signal input/output device 41, the input information from the video signal input/output device 41 is transmitted as a video information signal through the control command input device 44 to the video recording/reproducing device 42.

The optical recording medium is rotatively driven by the position control driving portion. During video recording, the video information signal is transmitted from the signal input/output portion to the recording light emitting portion.

The recording light emitting portion selectively emits recording light in correspondence to the information signal made of ON/OFF signals.

The selectively emitted recording light writes video information onto the optical recording medium, with portions where the initial molecule orientation of the optical recording regions has been changed, and portions where the initial molecule orientation of the optical recording regions has not been changed.

During the reproduction of the video information, light that does not change the initial molecule orientation of the coating constituting the recording layer is emitted selectively as reference light. The reference light emitting portion includes a focusing device, which focuses the emitted reference light. There is no particular limitation regarding the reference light, as long as it does not change the orientation state of the optical recording regions on the optical recording medium, but it is preferably polarized light.

When, upon a reproduction command from the video input/output device 43, reference light is irradiated on the optical recording regions of the optical recording medium, the intensity of a polarized component of the reflected light, the transmitted light or the scattered light of the reference light varies depending on whether the initial molecule orientation has been changed. This intensity change is detected with an optical sensor through a polarizer. Based on the detected result, the intensity of a polarized component is then converted into a predetermined electrical signal. This electrical signal is outputted by the signal input/output portion and transmitted via the control command input device 44 to the video input/output device 43. Based on the transmitted reproduction information signal, the information is then reproduced by the video reproduction device 42.

WORKING EXAMPLES

Referring to the working examples below, a more specific explanation of the present invention follows.

Working Example 1

A disk-shaped glass-substrate 1 was prepared, and after thoroughly rinsing and degreasing the substrate surface, aluminum including 2 mass % silicon was applied in a film thickness of about 500 nm by vapor deposition, thus forming a reflective film 2 (see FIG. 1).

On the other hand, the compound represented by $C_6H_5CH=CHCOC_6H_4O(CH_2)_6OSiCl_3$ was prepared as a chemisorptive substance including a photosensitive group and a functional group that reacts with and chemically bonds to the reflective film 2 (also referred to as a "surface active agent"). This compound includes a photosensitive chalcone group ($C_6H_5CH=CHCOC_6H_4-$; absorption peak at 315 nm) absorbing light of 300 nm to 330 nm wavelength and bonding with other molecules and a chlorosilyl group serving as the functional group that reacts with and chemically bonds to the reflective film. This compound was dissolved in an amount of about 1 mass % in dehydrated hexadecane (a non-aqueous organic solvent), thus preparing a chemisorptive solution.

Next, as shown in FIG. 1, this chemisorptive solution 3 was filled into a solvent bath, and the glass substrate 1 on which the reflective layer 2 has been formed was immersed for about 1 hour in this solvent bath under a dry atmosphere (not more than 30% relative humidity). It should be noted that it is also possible to use a method of application instead of immersion. Then, the substrate 1 was retrieved from the solvent bath, rinsed with dehydrated n-hexane, removing the non-adsorbed chemisorptive molecules at the surface, and kept for a while in air including a certain moisture content. Keeping the substrate 1 in air including a certain moisture content allows reaction of that unreacted Cl groups in the adsorbed molecules with OH groups, deactivating the chemisorption of the adsorbed molecules. In this manner, a monomolecular film 4 (of about 1.8 nm film thickness) was formed from the chemisorptive molecules (FIG. 2A).

Analyzing the produced monomolecular film 4 by FTIR (Fourier transform infrared spectroscopy), it was confirmed that the SiCl groups of the chlorosilane chemisorptive substance and the hydroxyl groups at the substrate surface underwent a dechlorination reaction, the bond of the formula (G) below was formed, and due to the reaction with the moisture component in air, the bond of the formula (H) below was formed. In this working example, $Al_2O_3$ was formed on the surface by naturally oxidizing Al in the reflective layer 2 including aluminum on the surface of the substrate 1, so that the surface of the reflective layer 2 reacts with the moisture component in the air and becomes a surface including many —OH groups.

(Formula 15)

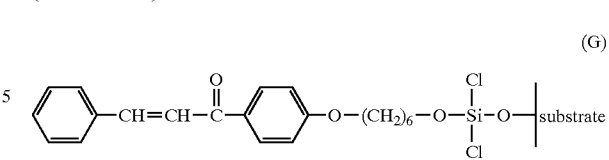

(Formula 16)

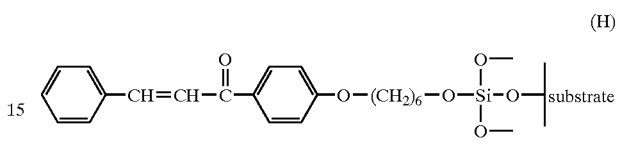

The chemisorptive thin film formed as described above was a monomolecular film 4 aligned such that lipophilic $C_6H_5CH=CHCOC_6H_4-$ groups are exposed at the surface.

It was also possible to chemisorb a chemisorptive thin film to the substrate surface when using a substance including alkoxysilyl groups or isocyanate groups instead of the chlorosilyl groups.

Also when using a chemisorptive substance including a cinnamate group with a double bond or a diacetylene group with a triple bond instead of the chalcone group, a monomolecular film 4 aligned such that lipophilic $C_6H_5CH=CHCOC_6H_4$ groups are exposed at the surface was obtained.

Next, light centered around the 1-line (wavelength: 313 nm) of an extra-high pressure mercury lamp, polarized with a polarization plate (HNP'B by Polaroid Corp.) and focused to a diameter of 1.2 $\mu$m was used. This light was irradiated at 500 mJ/cm$^2$ while rotating the substrate surface on which the chemisorptive thin film was formed, such that the light was substantially perpendicular to the surface of the substrate and its polarization direction was parallel with respect to the substrate. The focused light was irradiated successively while shifting it in the radial direction of the disk-shaped substrate from the perimeter toward the center of the disk, such that the irradiation positions of the focused light overlapped. By repeating this operation, the entire substrate was irradiated with the light focused.

When analyzing the chemisorptive thin film after the irradiation by FTIR, it was found that in the chemisorptive thin film, the chemisorptive molecules were oriented in the polarization direction (FIG. 2B) and the adsorbed molecules were crosslinked by the carbon bonds (see formula (I)) of the vinyl group portions of the chemisorptive molecules (FIG. 2C).

(Formula 17)

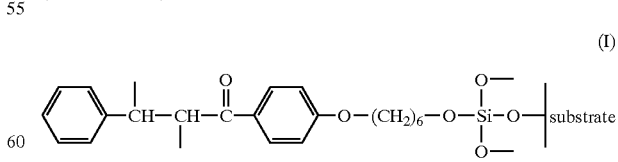

Next, photopolymerizable (UV curable) liquid crystal molecules as represented by the below formula (J) were prepared and dissolved in an amount of about 10 mass % concentration in xylene, yielding a polymerizable molecule solution.

(Formula 18)

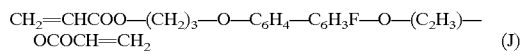
(J)

Then, this polymerizable molecule solution was applied with a spinner on the chemisorptive thin film 7 in which the adsorbed molecules were oriented and fixed by crosslinking. The substrate was dried, forming a film (of about 1 μm film thickness) made of photopolymerizable liquid crystal molecules (see FIG. 3A).

Next, the substrate on which this film made of photopolymerizable liquid crystal molecules was formed was heated to 120° C., and the polymerizable molecules were turned into an isotropic state. After that, the substrate was cooled down slowly to room temperature, and a film was obtained in which the group 5' of photopolymerizable liquid crystal molecules was oriented by the orientation regulating force of the chemisorptive thin film 7 on the substrate (FIG. 3B). For this, a cooling speed of not more than about 10° C./10 min was preferable. Moreover, that the photopolymerizable liquid crystal molecule group was oriented in a predetermined direction was confirmed by FTIR and a liquid crystal test cell orientation method.

Then, using an extra-high pressure mercury lamp, UV light was irradiated at about 300 mJ/cm² on the group 5' of oriented photopolymerizable liquid crystal molecules, and a coating 5" was formed, thus obtaining the optically oriented film (see FIG. 3C).

When, after the UV light irradiation, the film was analyzed by FTIR, it was found that the polymerizable liquid crystal molecules were polymerized via the carbon bonds (see formula (K) below) of the vinyl group portions of the polymerizable liquid crystal molecules.

(Formula 19)

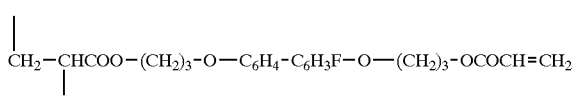
(K)

Next, focused light was irradiated in dots, while rotating the substrate on which the thusly produced coating 5" was formed. When observing the coating surface through a polarizer, the initial molecule orientation in the regions 5"-1 irradiated with light was disturbed, whereas the initial molecule orientation in the regions 5"-2 not irradiated with light was not disturbed (FIG. 4). From this result, it was concluded that the initial molecule orientation of the coating 5" is disturbed by irradiation of light, so that optical recording is possible.

It was also possible to use ceramic or metal for the substrate, instead of glass. These materials include many hydroxyl groups at their surface, so that the monomolecular film 4 could be formed easily.

Furthermore, if a substrate 1 of a synthetic resin with a water-repelling surface was used, then active hydrogen could be introduced to the surface of the substrate 1 by subjecting the surface to a method selected from plasma treatment, corona treatment and far UV light treatment.

Furthermore, it was found that since metals and ceramics are rigid, they are superior as disk-shaped substrates. On the other hand, synthetic resins have superior flexibility, and it was found that they are suitable as tape-shaped substrates.

After adsorbing the chemisorptive substance to the substrate surface, the substrate surface was rinsed with a dehydrated hydrocarbon solvent such as dehydrated n-hexane, a fluorocarbon solvent such as Fluorinate (by 3M Corp.), a chlorocarbon solvent such as chloroform, or a silicone solvent such as a dimethyl silicone derivative, and non-adsorbed molecules could be rinsed away efficiently.

Working Example 2

A photosensitive polyimide resin (Trademark: RN-1194 by Nissan Chemicals Corp.) including a photoreactive functional group was dissolved in γ-butyrolactam. This solution was applied in a film thickness of about 500 nm on a disk-shape glass substrate 1, similar to Working Example 1. The substrate was kept at 200° C. for two hours, the polyimide resin was cured, and a polymer film was formed on the substrate 1.

The polymer film was irradiated with polarized UV light by the same method as in Working Example 1, and an orienting force was imparted on the polymer film. The UV light was irradiated at 1 mJ/cm².

Then, a coating 5" was formed as in Working Example 1. An analysis as in Working Example 1 showed that the polymerizable liquid crystal molecules were bonded by crosslinking in an oriented arrangement.

When focused light was irradiated on the coating as in Working Example 1, the initial molecule orientation changed. As a result, it was found that recording with light is possible also with the coating of this working example.

It should be noted that in the chemisorptive thin film of this working example, the polymer film itself is not oriented, so that as the chemisorptive thin film became thick, the contrast during read-out became weaker. It was found that the thickness of the chemisorptive thin film was preferably not more than 1/10 of the thickness of the coating.

Figure 9A:
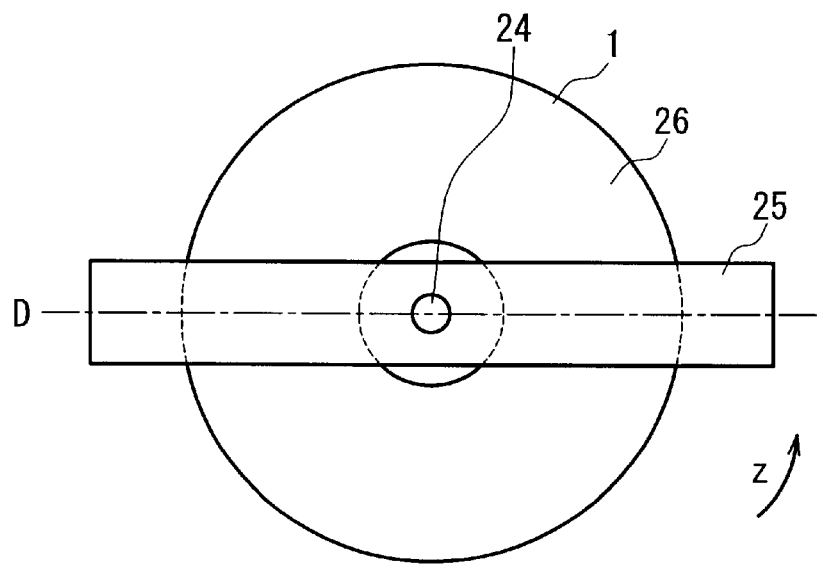
FIGS. 9A and 9B illustrate a method for rubbing a polyimide film in Working Example 2 of the present invention.
Figure 9B:
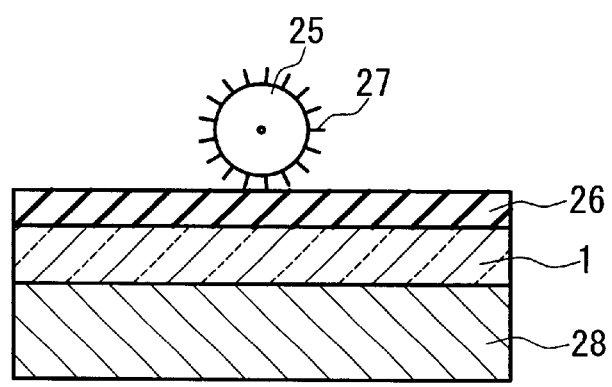

On the other hand, a rubbing treatment was carried out instead of the optical orientation of the polyimide film. FIG. 9 illustrates a method for rubbing the polyimide film. FIG. 9A is a plan view illustrating a method for rubbing with a rubbing roll, and FIG. 9B is a lateral view taken from the right illustrating the method for rubbing with a rubbing roll. More specifically, as shown in FIGS. 9A and 9B, a rubbing roll 25 is oriented in a diameter direction D relative to the substrate 1 such that it passes through the rotation center 24, and carries a rubbing cloth 27 by Rayon Corp. The substrate 1 is fixed on a turntable 28. The turntable 28 can be rotated by a rotation driving means not shown in the drawings. With the rubbing roll 25 fastened, the turntable 28 is rotated in a Z direction. Thus, the polyimide film 26 is rubbed and oriented in concentric rings.

Furthermore, using a truncated cone-shaped rubbing roll positioned in the radial direction of the substrate such that the rubbing cloth touches the rotation center and one end of the substrate, the rubbing roll and the substrate were rotated. Thus, the polyimide film was rubbed even more uniformly in concentric ring-shape.

A coating film 5" was formed in the same manner as in Working Example 1 on the chemisorptive thin film, which has been oriented in this concentric ring-shape. An analysis as in Working Example 1 showed that the polymerizable liquid crystal molecules were bonded by crosslinking in an oriented arrangement.

When focused light was irradiated on the coating as in Working Example 1, the initial molecule orientation changed. As a result, it was found that also recording with light is possible with the coating of this working example.

It was further found that adding several percent of a sensitizing agent including a —$C_6H_5CO$— group (for example Irgacure™ 651, 184, 500 by Japan Ciba-Geigy Corp. or Kayacure™ BDMK, BP-100 by Nippon Kayaku Corp.) as the substance that responds to UV light, promoted the photoreaction and shortened the polymerization time considerably.

Providing a chemisorptive thin film on the entire surface of the medium substrate and varying the formation method of the coating formed on it, the following optical recording media were formed.

A chemisorptive film 7 with orienting properties was provided on the entire surface of a medium substrate, and a coating 5" was provided on the entire surface of this chemisorptive thin film 7 (FIG. 5A). Furthermore, a chemisorptive thin film was provided on the entire surface of a medium substrate, and subjecting a portion of the chemisorptive thin film to an orientation treatment, a coating 5" was provided only on those portions 7 of the chemisorptive thin film that had orienting properties (FIG. 5B). And, a chemisorptive thin film 7 was provided on the entire surface of a medium substrate, and a coating 5" was provided partially on the surface of the chemisorptive thin film (FIG. 5E).

By providing a chemisorptive thin film partially on the surface of the medium substrate and varying the formation method of the coating formed on it, the following optical recording media were formed.

A chemisorptive thin film 7 with orienting properties was provided partially on the surface of a medium substrate, and a coating 5" was provided only on those portions 7 of the chemisorptive thin film that had orienting properties (FIG. 5C). Furthermore, a chemisorptive thin film 7 with orienting properties was provided partially on the surface of a medium substrate, and a film made of polymerizable molecules was provided on the entire surface of the medium substrate, but the oriented coating 5" was formed only on the chemisorptive thin film 7 (FIG. 5D).

Working Example 3

A disk-shaped glass substrate 1 was prepared, the surface of the substrate was thoroughly rinsed and degreased, and then aluminum including 2 mass % of silicon was applied in a film thickness of about 200 nm by vacuum vapor deposition, forming a reflective layer 2, thus producing a disk-shaped medium substrate.

Next, as in Working Example 1, a chemisorptive thin film was formed on the medium substrate, and a coating was formed, thus manufacturing an optical recording medium.

Figure 10A:
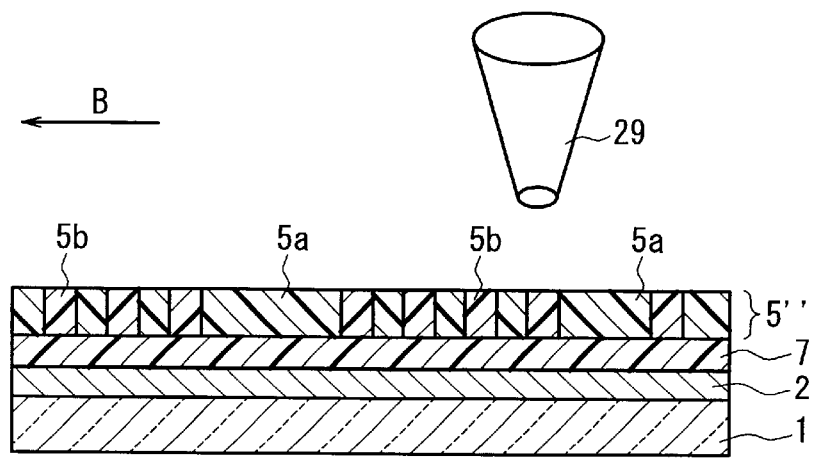
FIGS. 10A and 10B are conceptual diagrams showing, at the molecular level, a cross-sectional and a top view of the medium on which optical information has been recorded on an optical recording medium according to Working Example 3 of the present invention.
Figure 10B:
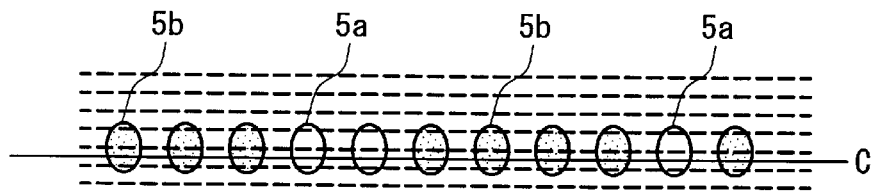

Then, while rotating the medium substrate, light was irradiated in synchronization with the rotation of the medium substrate. For this irradiation of light, focused polarized light was irradiated, with ON/OFF control by a digital signal, in dots at 1 J/cm$^2$ from a direction that was substantially perpendicular to the substrate surface and such that the oscillation direction was parallel to the initial orientation of the medium substrate. The state of the optical recording is shown in FIGS. 10A and 10B. FIGS. 10A and 10B are conceptual diagrams showing, at the molecular level, a cross-sectional and a top view of the medium on which optical information has been recorded on an optical recording medium according to this Working Example 3 of the present invention. FIG. 10A is a cross-sectional diagram of the medium on which optical information has been recorded. FIG. 10B is a diagram of the medium on which optical information has been recorded. As can be seen in FIGS. 10A and 10B, in the optical recording layer, there were regions 5b in which the initial molecule orientation has been changed and regions 5a in which the initial molecule orientation has not been changed, in correspondence with the ONs and OFFs of the digital signal. Due to this change of the initial molecule orientation, optical information could be recorded on the optical recording medium.

With the medium substrate on which the optical information had been recorded, the recording could be read out as follows.

Weak focused visible light 29 (for example, wavelength: 530 nm; energy: 100 mJ/cm$^2$ at the secondary harmonic of a YAG (yttrium aluminum garnet) laser) was irradiated in accordance with a track pattern onto the regions 5a and 5b on the line C, while rotating the medium substrate in B direction. The intensity changes of the light of the same wavelength reflected back from the regions 5a and 5b on the track pattern were sensed through a polarizing plate arranged such that the polarization direction was perpendicular to the rotation direction of the medium substrate. At the region 5a where the initial molecule orientation had not been changed, almost no reflection light could be detected. On the other hand, at the region 5b where the initial molecule orientation had been changed, about one third of the irradiated light was reflected back. As a result, it was found that the recorded optical information could be read out with high precision as the ONs and OFFs of a digital signal.

On the above-described reflective layer, a transparent protective film made of $SiO_x$ (stoichiometrically $SiO_2$, but the actual valence is not determined, so that x can be any suitable value) or $SiN_x$ (stoichiometrically $Si_3N_4$, but the actual valence is not determined, so that x can be any suitable value) was formed by CVD, vapor deposition or sputtering. It was found that this not only made the substrate surface hydrophilic, but also attained a medium substrate with superior friction resistance and scratch resistance.

Using a transparent glass substrate on which no metal reflective layer has been formed, an optical recording medium was prepared. Thus, a transmissive optical recording medium was obtained.

Furthermore, by partially forming a chemisorptive thin film and partially forming a coating, a plurality of optical recording regions were provided on the medium substrate.

Also, it was confirmed that when the medium substrate is disk-shaped, and the optical recording regions are arranged in concentric ring-shape or spiral shape on the medium substrate, then optical information could be written or read out easily.

Furthermore, it was confirmed that when the medium substrate is tape-shaped, and the optical recording regions are arranged on the medium substrate in linear groups parallel to a direction that intersects at a predetermined angle with the longitudinal direction of the tape, thus forming the recording layer, optical information could be written or read out easily.

Furthermore, forming the reflective layer 2 on both sides of the medium substrate and providing an optical recording layer on both reflective layers 2, double the optical recording was possible on the same optical recording medium.

Furthermore, the writing of optical information was possible even when during the writing of optical information, the polarization direction of the irradiated dot-shaped polarized light was set to a direction intersecting perpendicularly with the rotation direction of the medium substrate.

Moreover, when the optical recording medium was tape-shaped, the writing of optical information was possible by irradiating polarized light in dots along a track pattern in a direction intersecting at a predetermined angle with the longitudinal direction of the tape while letting the tape travel forward.

It was also possible to produce a plurality of tape-shaped optical recording media by rubbing the polymer film while letting a broad medium substrate film travel forward, and cutting the medium substrate film after forming the chemisorptive thin film on the polymer film.

Working Example 4

FIG. 6 is a conceptual diagram showing an example of an information recording/reproducing apparatus according to the present invention. The information recording/reproducing apparatus shown in FIG. 6 includes an information recording portion (not shown in the drawings) having an optical recording medium 12 manufactured as in Working Example 3, a signal input/output portion 13, a recording light emitting portion 14, a reference light emitting portion 15, an information element detecting portion 16, a position control driving portion 17, and a control circuit portion 18.

The optical recording medium 12 is driven rotatively by the position control driving portion. During the recording of optical information, optical signals related to the external information to be recorded were transmitted from the signal input/output portion 13 to the recording light emitting portion 14.

The recording light emitting portion 14 emitted, in form of dots, recording light 8 focused to a diameter of 0.5 $\mu$m, in accordance with information signals made of ON and OFF signals. UV light was irradiated as recording light at 1 J/cm$^2$ from a direction perpendicular to the substrate surface.

Due to the selectively emitted recording light, optical information could be written onto the optical recording medium 12, with portions in which the initial molecule orientation of the optical recording regions were changed and portions in which the initial molecule orientation of the optical recording regions were unchanged.

During the reproduction of the optical information, weak visible light that was focused to a diameter of 1 $\mu$m (as denoted by numeral 23) was emitted from the reference light emitting portion 15 (wavelength 5310 nm, 100 mJ/cm$^2$ at the secondary harmonic of a YAG laser).

The intensity of the reflected light with the same wavelength reflected from the surface of the optical recording medium 12 was detected with an optical sensor 22 through a polarizing plate 21 whose polarization direction was arranged in a perpendicular direction with respect to the rotation direction of the medium substrate 12. At the regions that had not been irradiated with recording light, almost no reflection light could be detected, whereas at the regions that had been irradiated with recording light, about $\frac{1}{3}$ of the irradiated light was reflected back, so that the optical recording information could be read out with high precision as the ONs and OFFs of a digital signal.

It should be noted that when polarized light was irradiated as the reference light, it was also possible to detect intensity changes with the optical sensor 22 without the polarization plate 21.

The wavelength of the emitted recording light was the same as the wavelength of the emitted reference light. Thus, a simpler information recording/reproducing apparatus could be provided, because the recording light emitting portion 14 and the reference light emitting portion 15 can be combined.

Laser light was used for both the emitted recording light and the emitted reference light. It was confirmed that this could improve the focusing precision of the recording light and the reference light.

The area of the medium substrate surface that was irradiated with the emitted recording light was set to a smaller area than the area of the medium substrate surface that was irradiated with the emitted reference light. It was confirmed that this reduced the read-out errors during read-out.

The energy density of the emitted recording light was set to be larger than the energy density on the medium substrate of the emitted reference light. Thus, an information recording/reproducing apparatus with stable optical information recording could be provided, because the orientation of the coating was not changed during read-out.

The reference light emitting portion and the optical sensor were provided on the same side of the recording medium 12. In this case, intensity changes in the reflected light of emitted reference light that was reflected from the recording medium or of scattered light that was scattered at the surface of the recording medium were detected with the optical sensor.

It was also possible to provide the recording medium between the reference light emitting portion and the optical sensor. In this case, intensity changes in the transmitted light of emitted reference light that was transmitted through the recording medium were detected with the optical sensor.

If an intensity change in a polarized component of reflected light, transmitted light or scattered light of the irradiated reference light was detected with an optical sensor through a polarizer, then the polarizer was arranged such that its optical transmission axis was parallel or perpendicular to the initial orientation of the coating.

If polarized light was irradiated as the reference light, and the intensity change a polarized component of reflected light, transmitted light or scattered light of the reference light was detected with an optical sensor without a polarizer, then the irradiated polarized light was polarized such that its oscillation direction was parallel or perpendicular to the initial orientation of the coating.

If polarized light was irradiated as the reference light, and the intensity change of a polarized component of reflected light, transmitted light or scattered light of the reference light was detected with an optical sensor through a polarizer, then the irradiated polarized light could be polarized such that its oscillation direction was parallel or perpendicular to the initial orientation of the coating. Furthermore, the polarizer could be arranged such that its optical transmission axis was parallel or perpendicular to the initial orientation of the coating.

Working Example 5

A computer system 30 was produced including an arithmetic processing device 31 having a main memory, an auxiliary recording device 32 connected to the arithmetic processing device using the optical recording medium 12 of the Working Example 1 as an auxiliary memory, an input device 33 connected to the arithmetic processing device, an output device 34 connected to the arithmetic processing device and a control device 35 controlling the data communication between the various devices, as shown in FIG. 7.

The auxiliary recording device 32 connected to the arithmetic processing device 31 using the optical recording medium 12 of the present invention as an auxiliary memory was primarily used as a memory for backups.

Working Example 6

A video recording/reproducing system 40 was produced including a video signal input/output control device 41 for controlling the input source and the output destination of a video signal, a video recording/reproducing device 42 using the optical recording medium 12 of Working Example 1 connected to the video signal input/output control device 41, a video output device 43 connected to the video signal input/output control device 41, and a control command input device 44 connected to the video signal input/output control device 41, which sends input/output control commands to the video signal input/output control device 41, as shown in FIG. 8.

This video recording/reproducing system could record a TV broadcast of about 40 hours, and could be used as a home server instead of a VTR for home use equipped with a 100 GB recording capacity.

Working Example 7

Figure 11:
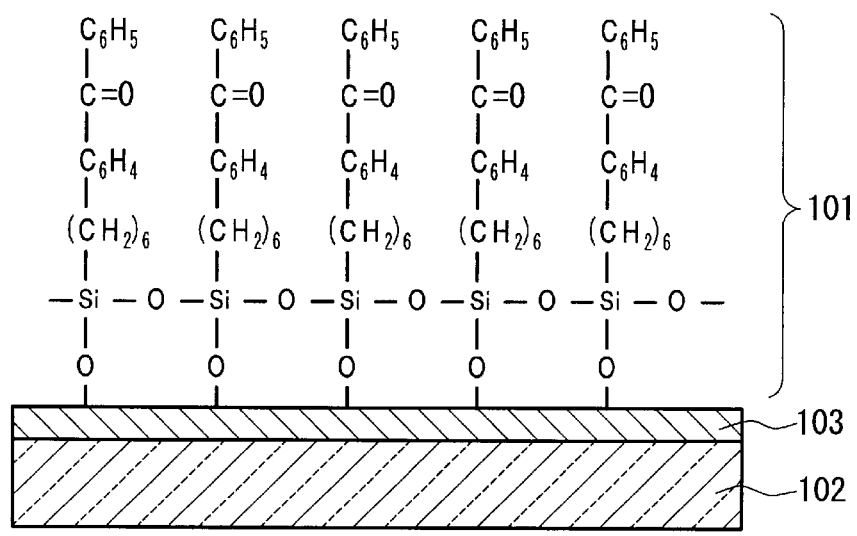
FIG. 11 is a cross-sectional view schematically illustrating a write-once optical recording film in accordance with Working Example 7 of the present invention.

An optical recording film 101 of this working example, which was fixed by covalent bonding to an aluminum film 103 formed on the surface of a glass substrate 102, as shown in FIG. 11, was manufactured as follows. It should be noted that FIG. 11 shows that the film constituting molecules are oriented in the same direction, but they do not necessarily have to be oriented in the same direction and also can be oriented in different directions.

First, a glass substrate 102 was prepared by machining the glass substrate 102 into a disk-shape of about 100 mm diameter and thorough rinsing, and applying Al including 2 mass % Si to the (entire) surface thereof by vacuum vapor deposition, forming an aluminum film 103 of about 500 nm thickness. This aluminum film 103 was naturally oxidized and had many hydroxyl groups (—OH groups) exposed at the surface. With such an aluminum film 103, a monomolecular optical recording film 101 with high molecular density can be formed.

On the other hand, a chemisorptive solution was prepared by dissolving chemisorptive molecules (straight-chain molecules) in dehydrated hexadecane in an amount of about 1 mass % concentration. The chemisorptive molecules can represented by the following formula (L), and include a chlorosilyl group (SiCl) which is a chemisorptive group and a benzophenone residue ($C_6H_5COC_6H_4$—: absorption peak at 254 nm) which is a functional group absorbing light of a specific wavelength and undergoing a degradation reaction. (Formula 20)

$$C_6H_5COC_6H_4(CH_2)_6SiCl_3 \quad (L)$$

Figure 12:
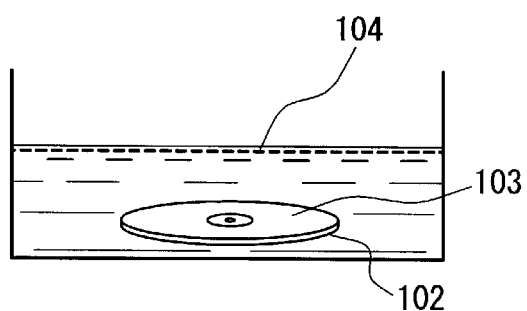
FIG. 12 is a schematic diagram illustrating a method for manufacturing (film manufacturing step) a write-once optical recording film in accordance with Working Example 7 of the present invention.

Next, as shown in FIG. 12, the substrate 102 with the aluminum film 103 was immersed for about one hour in the chemisorptive solution 104 under a dry atmosphere of not more than 30% relative humidity, and the chemisorptive molecules were fixed by covalently bonding to the surface of the aluminum film 103 through a dehydrochlorination reaction between the chlorosilyl groups of the chemisorptive molecules and the hydroxyl groups at the surface of the aluminum film 103 (FIG. 11).

Subsequently, the surface was rinsed with dehydrated n-hexane to remove remaining unreacted chemisorptive molecules, and then exposed to an atmosphere containing a certain moisture content, so that adjacent chemisorptive molecules were linked to one another by siloxane bonds. It should be noted that the chemisorptive molecules on the substrate have a chlorosilyl group at one end and are relatively hydrophilic, whereas the other end has a relatively water-repellent phenyl group ($C_6H_5$—), so that the benzophenone residues were covalently bonded aligned in a position away from the hydrophilic aluminum film 103.

The optical recording film formed in this manner was irradiated from a direction normal to the substrate with light of 254 nm wavelength from an extra-high pressure mercury lamp focused to a diameter of about 1.2 $\mu$m as the recording light, in dots (points) at an irradiation density of 500 mJ/cm$^2$.

Then, when the irradiated portions and the not irradiated portions on the surface were observed with a microscopic Fourier transform infrared spectroscope (microscopic FTIR), it was found that at the irradiated portions the absorption of the phenyl groups near 1600 cm$^{-1}$ was reduced, whereas at the not irradiated portions, there was no change. That is to say, at the irradiated portions, degraded portions were formed by a degradation reaction due to cutting the carbonyl group portions of the benzophenone residues, whereas in the not irradiated portions, there were no degraded portions. Thus, it was found that information can be recorded by forming degraded portions and non-degraded portions on the optical recording film by controlling the irradiation with light.

In the foregoing, a benzophenone residue was used as the photodegradable functional group, but it was confirmed that an optical recording film on which optical recording is possible similarly can be formed using a benzyldimethylketal residue (absorption peak at 255 nm) or a 1-hydroxycyclohexyl-phenylketone residue (absorption peak at 332 nm) instead.

Moreover, chemisorptive molecules having a photodegradable functional group at their molecule end were used, but it is also possible to use chemisorptive molecules having a photodegradable functional group in the middle of the molecule chain.

Furthermore, in the foregoing a chlorosilyl group was used as the chemisorptive group, but it was confirmed that an optical recording film with which optical recording is similarly possible also can be formed when using a halosilyl group, an alkoxysilyl group or an isocyanatosilyl group instead.

Moreover, a glass substrate was used as the substrate, but the present invention is not limited to this, and it is also possible to use other kinds of substrates, such as a ceramic substrate, a metal substrate or a synthetic resin substrate. When a synthetic resin substrate is used, then a substrate can be used in which hydrogen atoms (hydroxyl groups) are introduced by one of the usual surface treatments known in the art, such as plasma treatment, corona treatment or far UV light treatment. Moreover, besides the aluminum film, it is also possible to form a film in which functional groups that can react with the chemisorptive groups are exposed, such as a silica film or a silicon nitride film, on the surface of the substrate.

In the foregoing, the chemisorptive molecules were chemisorbed by immersing the substrate with the Al film in the chemisorptive solution, but there is no limitation to this method, and it is also possible to chemisorb the chemisorptive molecules by spraying the chemisorptive solution to the substrate with the Al film, for example.

Furthermore, in the foregoing, light of 254 nm wavelength from an extra-high pressure mercury lamp was used as the recording light, but it was confirmed that optical recording is similarly possible, for example, with light of 248 nm wavelength from a KrF excimer laser.

Moreover, in the above-described rinsing, dehydrated n-hexane was used, but favorable rinsing also can be performed using other hydrocarbon organic solvents, for example a fluorocarbon organic solvent such as "Fluorinate" (trademark by 3M) a chlorocarbon organic solvent such as chloroform or a silicone organic solvent such as dimethyl silicone.

Working Example 8

An optical recording film was manufactured as in Working Example 1, but instead of the chemisorptive molecules represented by the above-noted formula (L), chemisorptive molecules (straight-chain molecules) represented by the following formula (M) were used, which have a benzoin residue ($C_6H_5CHOHCOC_6H_4$—: temperature at which thermal degradation begins is about 80° C.), which is a thermally degradable functional group.
(Formula 21)

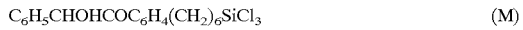
$C_6H_5CHOHCOC_6H_4(CH_2)_6SiCl_3$ (M)

The optical recording film formed in this manner, was irradiated from a direction normal to the substrate, with recording light of 425 nm wavelength (h line) of an extra-high pressure mercury lamp, focused to a diameter of about 1 μm, in dots at an irradiation intensity of 300 mJ/cm².

Then, when the irradiated portions and the not irradiated portions on the surface were observed with a microscopic Fourier transform infrared spectroscope (microscopic FTIR), it was found that at the irradiated portions the absorption of phenyl groups near 1600 cm$^{-1}$ was reduced, whereas at the not irradiated portions, there was no change. That is to say, at the irradiated portions, degraded portions were formed by a degradation reaction, whereas in the not irradiated portions, there were no degraded portions. Thus, it was found that information can be recorded by forming degraded portions and non-degraded portions on the optical recording film by controlling the irradiation with light. It should be noted that the chemisorptive molecules represented by the formula (M) constituting the optical recording film in Working Example 8 do not absorb light of 425 nm, so that different from the recording film of Working Example 7, it seems that a degradation reaction occurred due to local heating by the irradiation of light.

In this working examples, a benzoin residue was used as the thermally degradable functional group, but it was confirmed that an optical recording film on which optical recording is possible can be similarly formed using a benzopinacole residue. It should be noted that the chemisorptive molecules and the substrate are the same as in Working Example 7, so that their further explanation has been omitted.

Optical recording was also possible using an azo compound residue such as a 2-carbamoylazobisbutylonitrile residue or a 2,2'-azobisbutylonitrile residue instead of the benzophenone residue or the benzoin residue used in Working Examples 7 and 8.

Working Example 9

Figure 13:
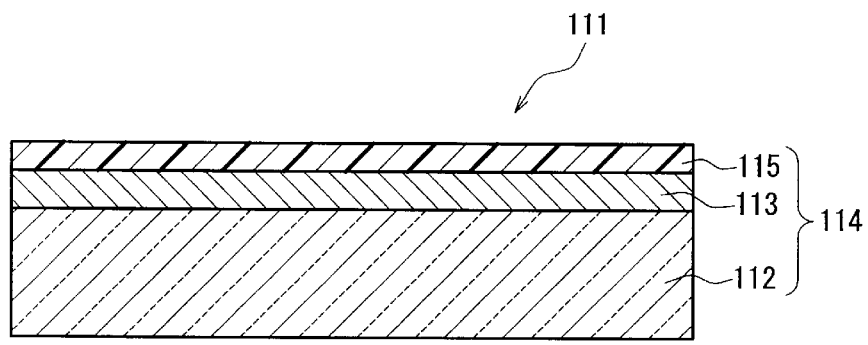
FIG. 13 is a cross-sectional view schematically showing an optical recording medium in accordance with Working Example 9 of the present invention.

As shown in FIG. 13, a write-once optical recording medium 111 according to this working example utilizes reflected light during reproduction (i.e. during read-out), and includes a substrate 114 with an optically reflective film (aluminum film) 113 formed on the surface of a glass substrate 112, and an optical recording film 115 in which an aggregate group of chemisorptive molecules is fixed by covalent bonding to the surface of the optically reflective film 113. This write-once optical recording medium 111 was manufactured as follows.

First, the substrate 114 was prepared by forming the optically reflective film 113 made of Al including 2 mass % Si in a thickness of 200 nm on the surface of the disk-shaped glass substrate 112. Furthermore, a chemisorptive solution was prepared by dissolving the chemisorptive molecules represented by formula (L) in the same manner as in Working Example 7.

Next, using the substrate 114 and the chemisorptive solution, the optical recording medium 111 was manufactured by forming the optical recording film 115 on the substrate 114, as in Working Example 7.

Figure 14A:
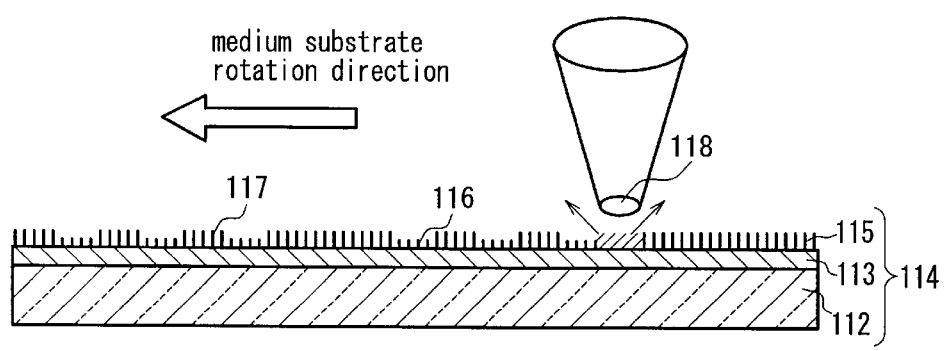
FIGS. 14A to 14B are diagrams illustrating a recording method for an optical recording medium in accordance with Working Example 9 of the present invention.
Figure 14B:
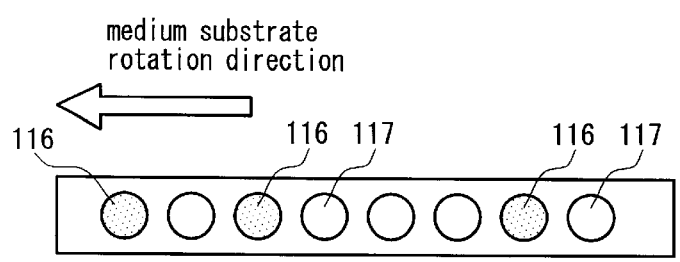

Using light of a wavelength of 254 nm from an extra-high pressure mercury lamp, focused to a diameter of about 1 μm, as the light for recording (writing light) 118, the optical recording medium 111 obtained like this was irradiated intermittently from a direction normal to the optical recording film 115 at an irradiation intensity of 20 mW, as shown in FIGS. 14A and 14B. This intermittent irradiation of light was performed in correspondence with the ONs of a digital signal (of ONs and OFFs), while rotating the optical recording medium (at a rotation velocity of 2400 rpm). As a result, dot-shaped degraded portions 116 were formed in the optical recording film 115 in correspondence to the ONs, and non-degraded portions 117 were formed in correspondence with the OFFs. The degraded portions 116 and the non-degraded portions 117 are information recording unit regions.

Figure 15:
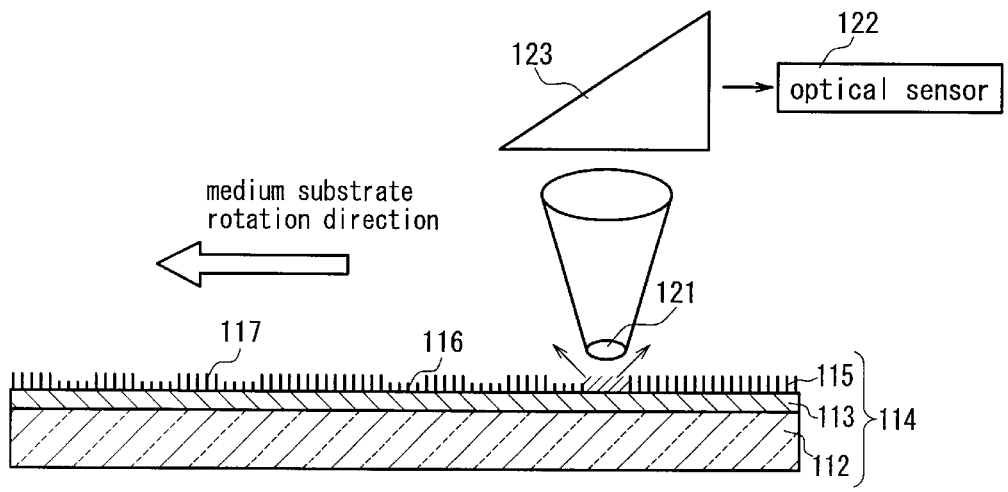
FIG. 15 is a schematic diagram illustrating a reproduction method for an optical recording medium in accordance with Working Example 9 of the present invention.

After that, as shown in FIG. 15, infrared light (light of 780 nm wavelength), focused to a diameter of about 1.5 μm, was irradiated from a direction normal to the optical recording film 115 at an irradiation intensity of 1 mW, as the reproduction light (reference light, read-out light) on the optical recording medium on which a recording has been performed as described above. During the reading, the optical recording medium was rotated at the same speed as during the recording. The irradiated infrared light was transmitted through the optical recording film 115, and the intensity of the light of the same wavelength that was reflected back by the optically reflective film 113 was detected with an optical sensor (infrared sensor) 122. In FIG. 15, numeral 123 denotes a half-mirror. As a result, the intensity of the light that was transmitted through the degraded portions and reflected back was strong, whereas the intensity of the light that was transmitted through the non-degraded portions and reflected back was weak, so that it could be read as the ONs and OFFs of a digital signal.

The recording and reproduction of information was also possible when using chemisorptive molecules having another photodegradable functional group or thermally degradable functional group instead of the chemisorptive molecules with the benzophenone residue.

Furthermore, the recording and reproduction of information was also possible when using, instead of the glass substrate, a ceramic substrate, a metal substrate or a synthetic resin substrate, or a substrate with an optically reflective film formed on one of these substrate. Moreover, the recording and reproduction of information was similarly possible when using an optically reflective substrate that reflects the reproduction light, such as a metal substrate. It is also possible to form an optically transmissive thin film with many exposed active hydrogens, such as silica film or a silicon nitride film, on the surface of the optically reflective film. This increases the molecular density, so that an optical recording film with high recording density can be attained. Furthermore, due to the high density, an optical recording medium with even better anti-peeling properties is attained, because of the physical force due to the fact that the distance between the molecules is short, which acts in addition to the bonding force due to the covalent bonds.

Also, if necessary, it is also possible to form an optically transmissive thin film (protective film) on the surface of the optical recording film, to protect the optical recording film.

Furthermore, in the foregoing, the case of a disk-shaped substrate has been explained, but needless to say, the invention can be applied equally to tape-shaped or card-shaped substrates as well.

Figure 16:
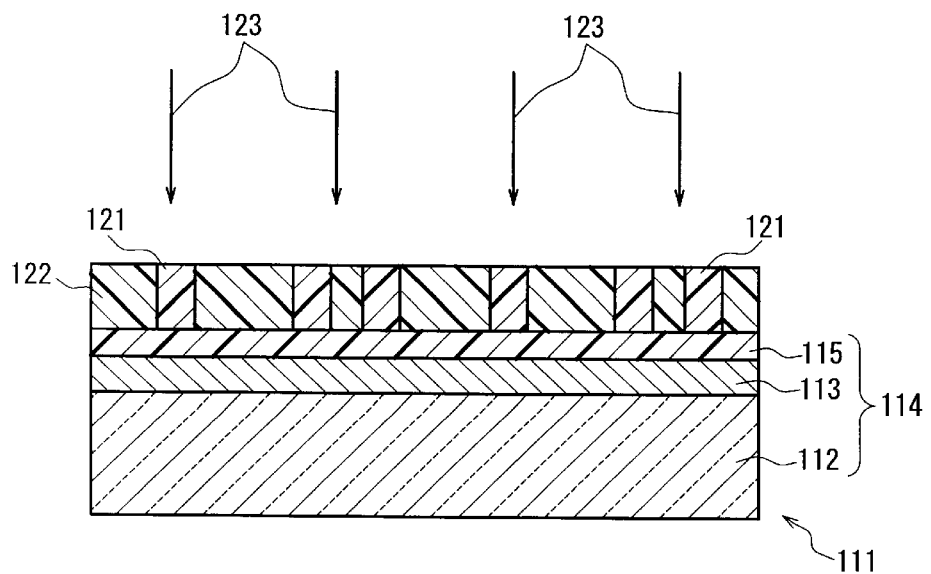
FIG. 16 is a schematic cross-sectional view illustrating another recording method for an optical recording medium in accordance with Working Example 9 of the present invention.

Furthermore, in the above-described recording method (FIGS. 14A and 14B), the light was irradiated sequentially, but there is no limitation to this, and it is also possible to form the degraded portions in the optical recording film together by placing a light-blocking member 122 with light-passing portions 121 corresponding to the irradiation portions in opposition to the optical recording medium 111 with the optical recording film 115 formed on the substrate 114, and irradiating UV light 123 with a UV light irradiation means, as shown in FIG. 16. As the light-blocking member 112 having light-passing portions 121, a metal substrate with through holes (corresponding to the light-passing portions) can be used for example. Instead of the light-blocking member having light-passing portions, it is similarly possible to form the degraded portions using a transparent member having light-blocking portions.

Working Example 10

The write-once optical recording medium of this working example utilizes transmitted light when reproducing, and except that the substrate was made by forming not an optically reflective film but an optically transmitting thin film 133' made of silica on the surface of the disk-shaped glass substrate, the optical recording medium was manufactured in the same manner as in Working Example 9.

Using light of a wavelength of 254 nm from an extra-high pressure mercury lamp, focused to a diameter of about 1 μm, as the light for recording, the optical recording medium obtained like this was irradiated intermittently from a direction normal to the optical recording film at an irradiation intensity of 20 mW (FIG. 14). This intermittent irradiation of light was performed in correspondence with the ONs of a digital signal (of ONs and OFFs), while rotating the optical recording medium (at a rotation velocity of 2400 rpm). As a result, degraded portions were formed in the optical recording film in correspondence to the ONs, and non-degraded portions were formed in correspondence with the OFFs.

Figure 17:
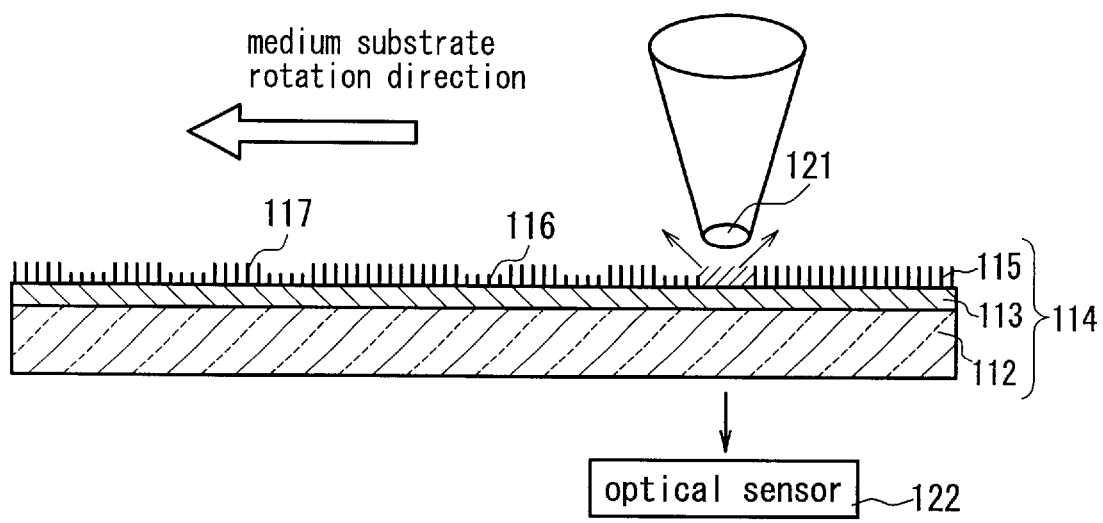
FIG. 17 is a schematic diagram illustrating a reproduction method for an optical recording medium in accordance with Working Example 10 of the present invention.

After that, as shown in FIG. 17, infrared light (light of 830 nm wavelength), focused to a diameter of about 1.6 μm, was irradiated from a direction normal to the optical recording film 115 at an irradiation intensity of 1 mW, as the reproduction light (reference light) 121 on the optical recording medium on which a recording has been performed as described above. During the reading, the optical recording medium was rotated at the same speed as during the recording. The intensity of the light of the same wavelength as the irradiated infrared light that was transmitted through the optical recording film 115 and the substrate 114 was detected with an optical sensor (infrared sensor) 122. As a result, the intensity of the light that was transmitted through the degraded portions was strong, whereas the intensity of the light that was transmitted through the non-degraded portions and reflected back was weak, so that it could be read as the ONs and OFFs of a digital signal.

The recording and reproduction of information was similarly possible when using, instead of the glass substrate, another optically transmissive substrate, such as a synthetic resin substrate, transmitting the reproduction light, or using a substrate on which an optically transmitting film, such as a silica film or a silicon nitride film, is formed on the surface of the substrate. It should be noted that the chemisorptive molecules and the substrate are the same as in Working Example 7, so that their further explanation has been omitted.

Working Example 11

Figure 18:
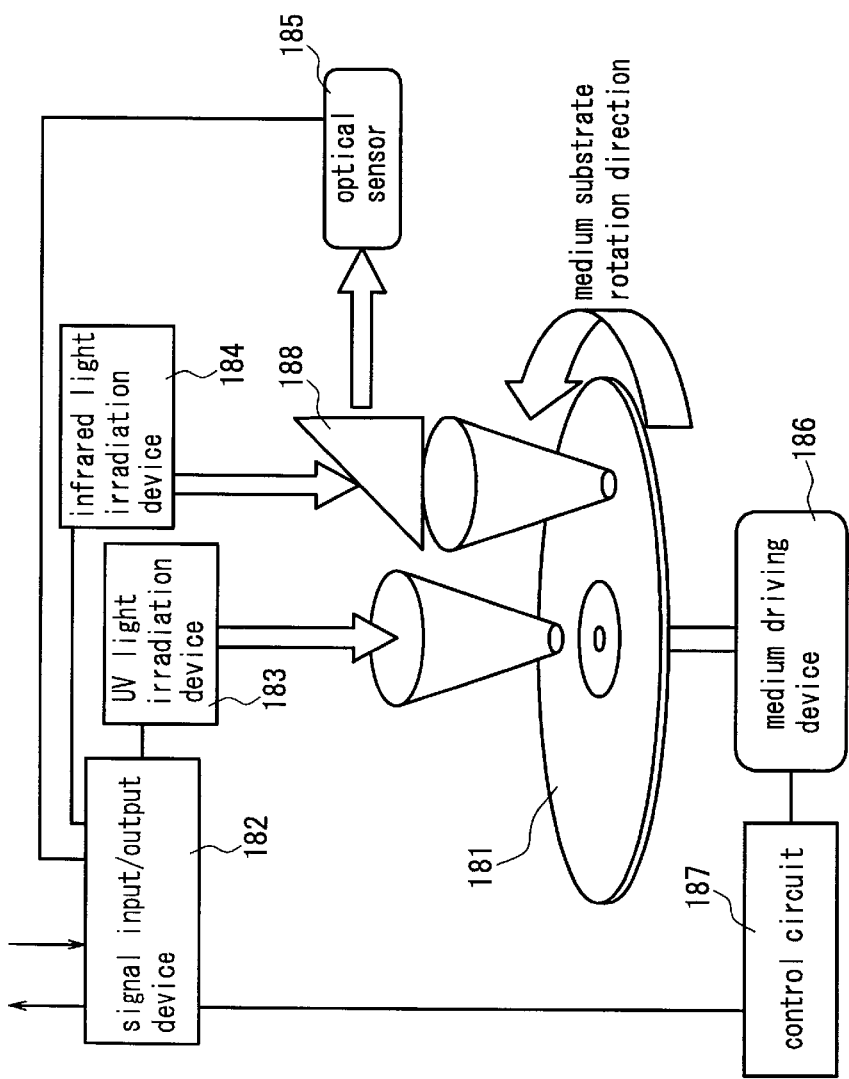
FIG. 18 is a schematic diagram illustrating the configuration of an information recording/reproducing apparatus in accordance with Working Example 11 of the present invention.

As shown in FIG. 18, an information recording/reproducing apparatus in accordance with this working example includes the optical recording medium 111 as manufactured in Working Example 9 as an optical recording medium 181, a signal input/output device 182, a UV light irradiation device 183 serving as a recording light irradiation means, an infrared light irradiation device 184 serving as a reproduction light irradiation means, an optical sensor (infrared sensor) 185 that can detect optical intensities serving as an information element detecting means, a medium driving apparatus 186 serving as an optical recording medium driving means, and a control circuit 187 for performing positioning control among these devices. In FIG. 18, numeral 188 denotes a half-mirror.

Information recording and reproduction with the information recording/reproducing apparatus with this configuration was performed as follows. First, UV light (of 254 nm wavelength) was irradiated from a UV light irradiation device 183 at a diameter of 1 μm and an irradiation intensity of 20 mW, based on a signal from the signal input/output device 182, and information was recorded by turning the irradiated portion of the optical recording film of the optical recording medium 181, which was rotated by the medium driving device 186 and the control circuit 187, into degraded portions. For this information recording, UV light of high energy was used as the light for the recording, so that the information could be recorded in a short period of time. Subsequently, the optical recording medium 181 on which the information was recorded was irradiated with infrared light (of 780 nm wavelength) from an infrared irradiation device 184 at a diameter of 1.5 μm and an irradiation intensity of 1 mW while rotating the optical recording medium at the same speed as during the recording, and the intensity of the infrared light reflected from the optically reflective film was detected with an optical sensor (infrared sensor) 185, and outputted to the signal input/output device 182. Thus, the information was reproduced. For this information reproduction, infrared light was used as the reproduction light, so that the recorded information was not destroyed.

In the foregoing, molecules including a photodegradable functional group were used, but it was similarly possible to record information using molecules having a thermally degradable functional group. When molecules having a thermally degradable functional group were used, then the irradiation energy of the reproduction light was set to not more than one tenth of the irradiation energy of the recording light. Furthermore, if the disk is rotated at the same speed, then the recording was not destroyed during the reproduction when the power density of the recording light was not more than one tenth of the power density of the recording light.

Moreover, the foregoing has been explained for the case that a reflective optical recording medium is used, however it was also possible to use an information recording/reproducing apparatus with a transmissive recording medium similarly. In this case, the optical sensor is of course disposed at a position that is reached by the transmitted light.

Furthermore, the above-described information recording/reproducing apparatus is one that incorporates an optical recording medium, but it also can be one in which the optical recording medium is removable.

Working Example 12

Figure 19:
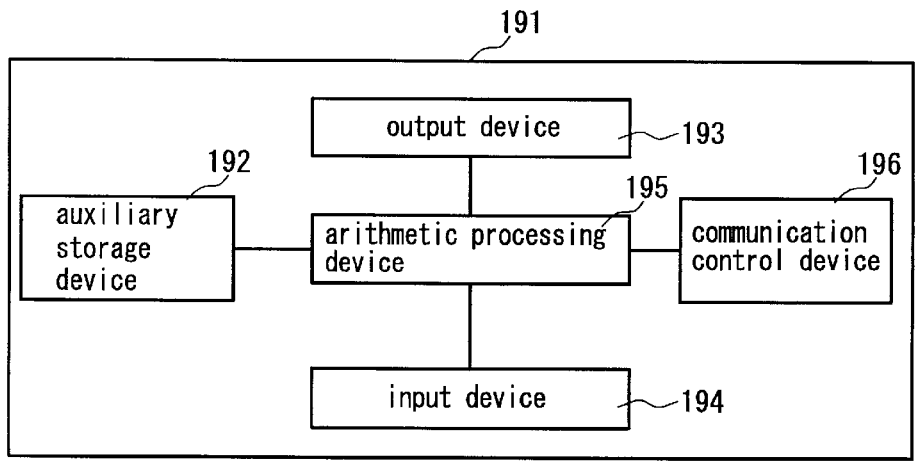
FIG. 19 is a schematic diagram illustrating the configuration of a computer system in accordance with Working Example 12 of the present invention.

As shown in FIG. 19, a computer system 19 in accordance with this working example uses an information recording/reproducing apparatus of 10 gigabyte storage capacity, made of one optical recording medium manufactured as in Working Example 9, as an auxiliary storage device (auxiliary memory) 192, and is made by combining an output device (e.g. monitor) 193, an input device (e.g. keyboard) 194, as well as an arithmetic processing device 195 including a main memory and a communication control device 196 (e.g. personal computer including both).

In this system, the optical recording medium is used together with another auxiliary memory and is used primarily as a memory for backups.

Working Example 13

Figure 20:
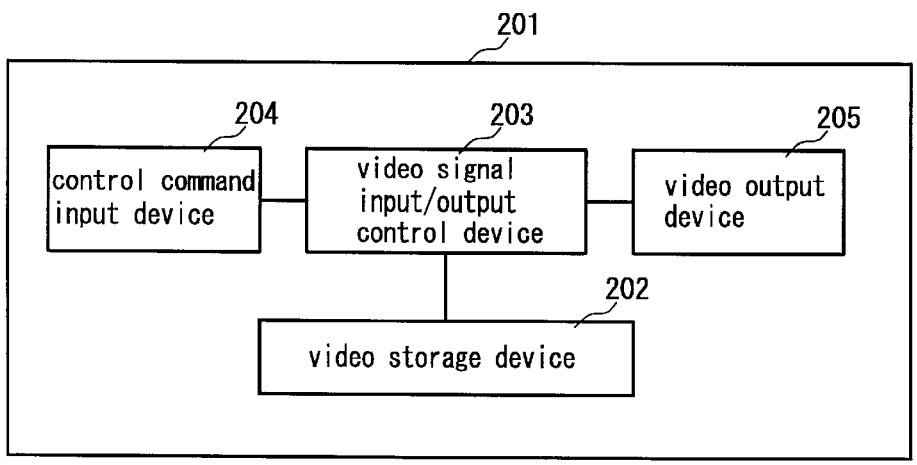
FIG. 20 is a schematic diagram illustrating the configuration of a video signal recording/reproducing system in accordance with Working Example 13 of the present invention.

As shown in FIG. 20, a video signal recording/reproduction system 201 in accordance with this working example uses an information recording/reproducing apparatus of 100 gigabyte storage capacity, made of ten optical recording media manufactured as in Working Example 9, as video storage device 202, and a video signal recording/reproducing system (home server) replacing a VTR for home use with a recording capacity of 100 gigabyte is configured by connecting it to a video signal input/output device 203, a control command input device 204 and a video output device 205.

With this system, a TV broadcast of about 40 hours could be recorded.

Working Example 14

Figure 21:
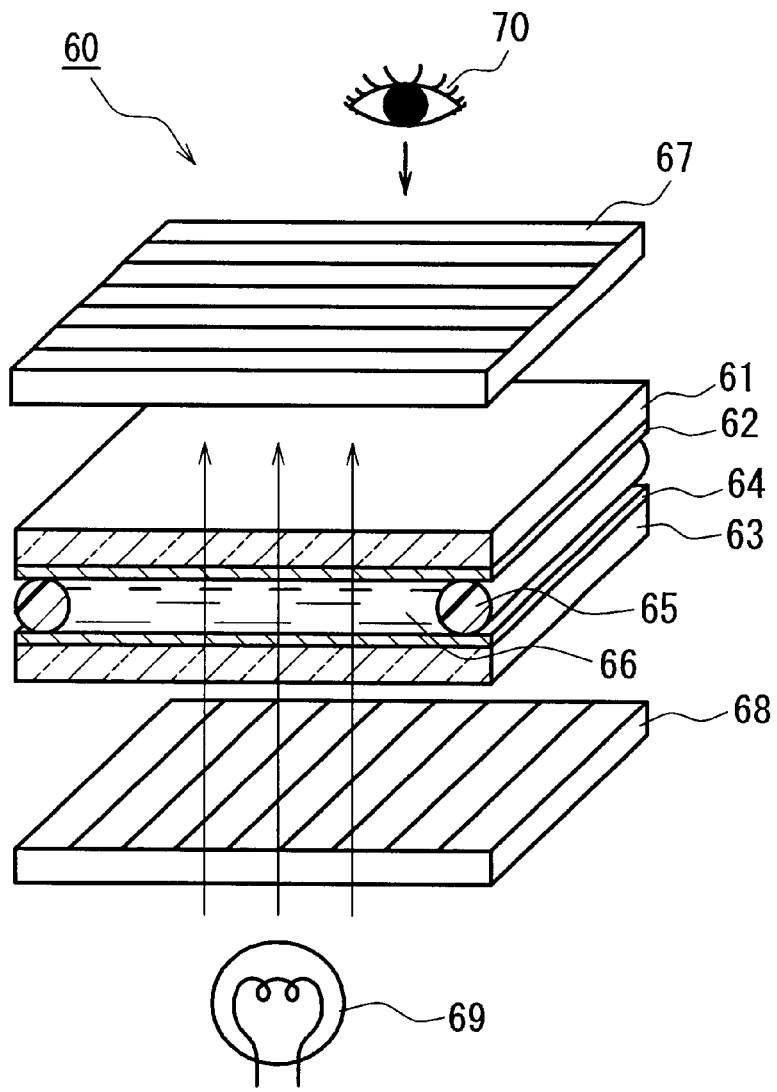
FIG. 21 is a diagram illustrating a method for evaluating the orientation of the molecules constituting the optical recording film in accordance with Working Example 14 of the present invention.

It can be confirmed whether the molecules constituting the optical recording film were oriented or not in the Working Examples 1 to 13 by forming a liquid crystal cell 60 as shown in FIG. 21, sandwiching it with polarizing plates 67 and 68, irradiating light from the back side and observing it from the position denoted by numeral 70. The liquid crystal cell 60 is made by arranging glass plates 61 and 63 on which the molecule films 62 and 64 constituting optical recording films are formed with the molecule films constituting optical recording films on the inner side, sealing with an adhesive 65 while maintaining a gap distance of 5 to 6 μm, and filling the inside with a liquid crystal composition 66 (nematic liquid crystal, for example "LC, MT-5087LA" by Chisso Corp.)

(1) If the polarizing plates 67 and 68 are in a cross arrangement, then the orientation directions of the molecule films 62 and 64 constituting the optical recording film are aligned, and this direction is parallel to one of the polarizing plates and perpendicular to the other. If the liquid crystal is completely oriented, it will be uniformly black. If it is not uniformly black, it means that the orientation is deficient.

(2) If the polarizing plates 67 and 68 are in a parallel arrangement, then the orientation directions of the molecule films 62 and 64 constituting the optical recording film are aligned, and this direction is parallel to both of the polarizing plates. Thus, if the liquid crystal is completely oriented, it will be uniformly white, If it is not uniformly white, it means that the orientation is deficient.

It should be noted that if the substrate on the rear side is not transparent, then one polarizing plate is arranged on the upper side, light is irradiated from the surface, and the reflected light is observed.

With this method, it was possible to confirm that the molecule films constituting the optical recording films obtained with the Working Examples 1 to 13 were oriented.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description. All changes that come within the meaning and range of equivalency of the claims are intended to be embraced therein.

What is claimed is:

1. A write-once optical recording film, comprising:
   a chemisorptive thin film with orienting properties fixed to a substrate surface; and
   a coating formed on a surface of the chemisorptive thin film;
   wherein the coating has an initial molecule orientation attained by aligning a group of polymerizable molecules in a predetermined direction on the surface of the chemisorptive thin film, and polymerizing the polymerizable molecules to one another; and
   wherein regions with changed initial molecule orientation and regions with unchanged initial molecule orientation of the coating are formed when selectively irradiating the coating with light that changes the initial molecule orientation, making optical information recording possible.

2. The write-once optical recording film according to claim 1, wherein the chemisorptive thin film with orienting properties is fixed directly to the substrate surface.

3. The write-once optical recording film according to claim 1, wherein the chemisorptive thin film with orienting properties is fixed through a primer layer to the substrate surface.

4. The write-once optical recording film according to claim 1, wherein the chemisorptive thin film is at least one thin film selected from the group consisting of monomolecular films and polymer films.

5. The write-once optical recording film according to claim 4, wherein the monomolecular thin films and the polymer films include photosensitive groups and the photosensitive groups are bonded to one another by crosslinking.

6. The write-once optical recording film according to claim 5, wherein the photosensitive groups include double bonds or triple bonds.

7. The write-once optical recording film according to claim 6, wherein the photosensitive groups are at least one selected from the group consisting of chalcone groups and cinnamate groups.

8. The write-once optical recording film according to claim 1, wherein the polymerizable molecules are polymerizable liquid crystal molecules.

9. The write-once optical recording film according to claim 8, wherein the polymerizable liquid crystal molecules include double bonds or triple bonds.

10. The write-once optical recording film according to claim 8, wherein the polymerizable liquid crystal molecules are photopolymerizable liquid crystal molecules.

11. The write-once optical recording film according to claim 8, wherein the polymerizable liquid crystal molecules are a substance represented by (Formula 1)

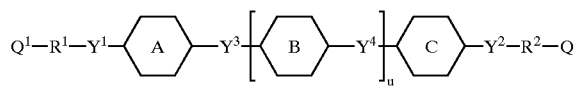
(A)

wherein Q¹ represents a functional group selected from the group consisting of an acryloyloxy group, a methacryloyloxy group, ClCH=CHCOO—, an acryloamide group, a methacryloamide group, ClCH=CHCONH—, a vinyl group, CH₂=CCl—, CHCl=CH—, an epoxy group, an ethynyl group, a mercapto group and CH₂=CHO—; Q² represents a functional group selected from the group consisting of a hydrogen atom, an acryloyloxy group, a methacryloyloxy group, ClCH=CHCOO—, an acryloamide group, a methacryloamide group, ClCH=CHCONH—, a vinyl group, CH₂=CCl—, CHCl=CH—, an epoxy group, an ethynyl group, a mercapto group and CH₂=CHO—; R¹ and R² represent, independently, a straight-chain or branching bivalent hydrocarbon group with a carbon number of 1 to 18; Y¹ and Y² represent, independently, a linking group selected from the group consisting of a single bond, —O—, and —S—; u represents one of the integers 0 and 1; the 6-membered rings A, B and C, independently, are selected from the group consisting of (Formula 2)

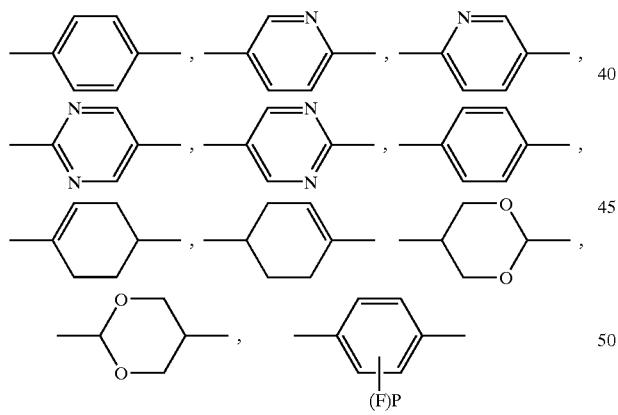

p represents an integer of 1 to 4, Y³ and Y⁴ represent, independently, a linking chain selected from the group consisting of single bond, —CH₂CH₂—, —CH₂C(CH₃)H—, —C(CH₃)HCH₂—, —CH₂O—, —OCH₂—, —CF₂O—, —OCF₂—, —COO—, —OCO—, —C≡C—, —CH=CH—, —CF=CF—, —(CH₂)₄—, —CH₂CH₂CH₂O—, —OCH₂CH₂CH₂—, —CH=CH—CH₂CH₂ — and —CH₂CH₂—CH=CH—.

12. The write-once optical recording film according to claim 11, wherein, in the general formula (A), the portion represented by (Formula 3)

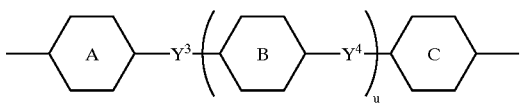
(B)

is an organic group selected from the group consisting of:
(Formula 4)

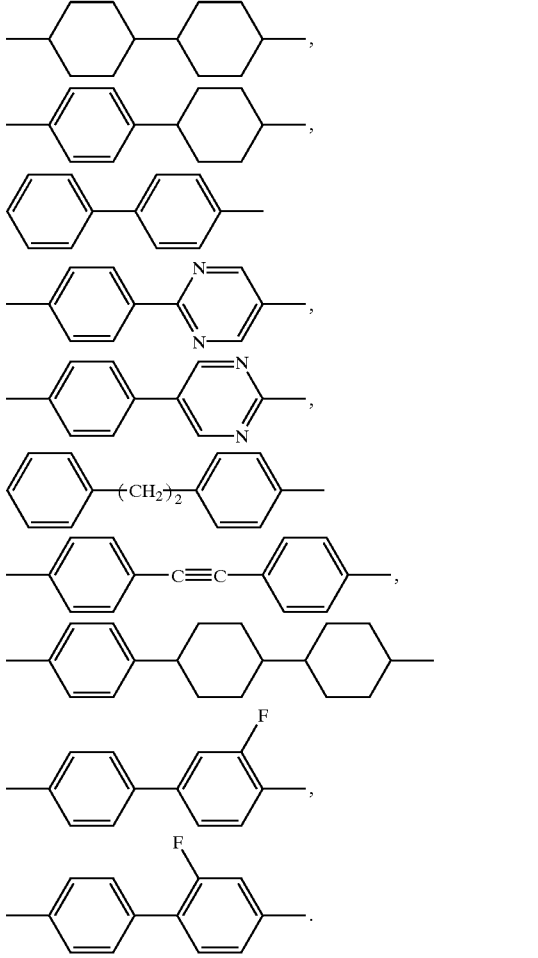
(C)

13. The write-once optical recording film according to claim 11, wherein in the general formula (A), the portion represented by
(Formula 5)

Q¹—(R¹—Y¹)—  (D)

comprises an acryloyloxy group.

14. The write-once optical recording film according to claim 11, wherein in the general formula (A), both the portion represented by the general formula (D) and the portion represented by
(Formula 6)

Q²—(R²—Y²)—  (E)

comprise an acryloyloxy group.

15. The write-once optical recording film according to claim 11, wherein in the general formula (A), the functional group represented by the general formula (D) and the functional group represented by the general formula (E) are the same.

16. The write-once optical recording film according to claim 11, wherein in the general formula (A), $R^2$ is a straight-chain or branching bivalent hydrocarbon group with a carbon number of 1 to 10.

17. The write-once optical recording film according to claim 8,
wherein the polymerizable liquid crystal molecule group is tilted in a predetermined direction on the chemisorptive thin film, in accordance with the orienting properties of the chemisorptive thin film; and
wherein the polymerizable molecules are fixed by polymerization to one another.

18. A method for manufacturing a write-once optical recording film, comprising:
forming a chemisorptive thin film on a substrate;
subjecting the chemisorptive thin film to an orientation treatment;
bringing a surface of the chemisorptive thin film in contact with polymerizable molecules by applying a solution in which the polymerizable molecules have been dissolved to the surface of the chemisorptive thin film, removing the solvent, and aligning a group of the polymerizable molecules in a predetermined direction at the surface of the chemisorptive thin film with the orientation regulating force of the chemisorptive thin film; and
forming a coating by bonding the polymerizable molecules to one another.

19. The method for manufacturing a write-once optical recording film according to claim 18, wherein the chemisorptive thin film is formed as a monomolecular film by bringing a chemisorptive solution including a silane chemisorptive substance having a photosensitive group and a non-aqueous solvent in contact with the substrate surface under a dry atmosphere, covalently bonding the chemisorptive substance molecules in the chemisorptive solution to the substrate surface, and rinsing with a non-aqueous organic solvent.

20. The method for manufacturing a write-once optical recording film according to claim 18, wherein the chemisorptive thin film is formed as a polymer film by bringing a chemisorptive solution including a silane chemisorptive substance having a photosensitive group and a non-aqueous solvent in contact with the substrate surface under a dry atmosphere, and covalently bonding the chemisorptive molecules in the chemisorptive solution to the substrate surface.

21. The method for manufacturing a write-once optical recording film according to claim 18, wherein the orientation treatment is performed by irradiating polarized light on the substrate surface on which the chemisorptive thin film has been formed.

22. The method for manufacturing a write-once optical recording film according to claim 21, wherein the polarized light irradiation orients the monomolecular film or the polymer film by bonding the photosensitive groups.

23. The method for manufacturing a write-once optical recording film according to claim 21, wherein the polarized light that is irradiated is UV light.

24. The method for manufacturing a write-once optical recording film according to claim 18, wherein the orientation treatment is performed by rubbing.

25. The method for manufacturing a write-once optical recording film according to claim 18, wherein for the orientation of the polymerizable molecules, polymerizable liquid crystal molecules are used as the polymerizable molecules, an organic solvent is used as the solvent for dissolving the polymerizable liquid crystal molecules and is dried.

26. The method for manufacturing a write-once optical recording film according to claim 25, wherein the organic solvent has a boiling point of at least 100° C. and at most 250° C.

27. The method for manufacturing a write-once optical recording film according to claim 25, wherein the polymerizable liquid crystal molecules are a substance expressed by (A)

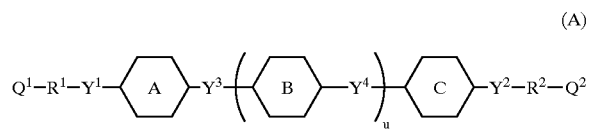

wherein $Q^1$ represents a functional group selected from the group consisting of an acryloyloxy group, a methacryloyloxy group, ClCH=CHCOO—, an acryloamide group, a methacryloamide group, ClCH=CHCONH—, a vinyl group, $CH_2$=CCl—, CHCl=CH—, an epoxy group, an ethynyl group, a mercapto group and $CH_2$=CHO—; $Q^2$ represents a functional group selected from the group consisting of a hydrogen atom, an acryloyloxy group, a methacryloyloxy group, ClCH=CHCOO—, an acryloamide group, a methacryloamide group, ClCH=CHCONH—, a vinyl group, $CH_2$=CCl—, CHCl=CH—, an epoxy group, an ethynyl group, a mercapto group and $CH_2$=CHO—; $R^1$ and $R^2$ represent, independently, a straight-chain or branching bivalent hydrocarbon group with a carbon number of 1 to 18; $Y^1$ and $Y^2$ represent, independently, a linking group selected from the group consisting of a single bond, —O—, and —S—; u represents one of the integers 0 and 1; the 6-membered rings A, B and C, independently, are selected from the group consisting of
(Formula 2)

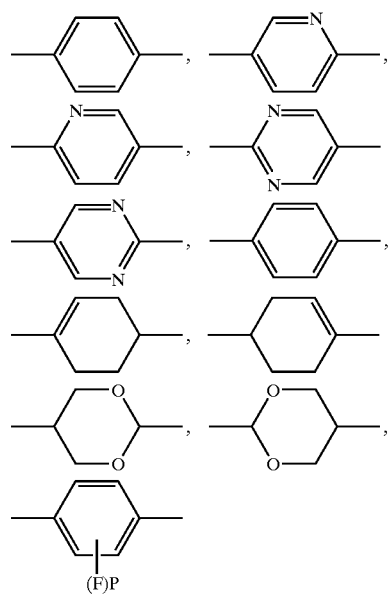

p represents an integer of 1 to 4, $Y^3$ and $Y^4$ represent, independently, a linking chain selected from the group consisting of single bond, —$CH_2CH_2$—, —$CH_2C(CH_3)$ H—, —C(CH$_3$)HCH$_2$—, —CH$_2$O—, —OCH$_2$—, —CF$_2$O—, —OCF$_2$—, —COO—, —OCO—, —C═C—, —CH═CH—, —CF═CF—, —(CH$_2$)$_4$—, —CH$_2$CH$_2$CH$_2$O—, —OCH$_2$CH$_2$CH$_2$—, —CH═CH—CH$_2$CH$_2$— and —CH$_2$CH$_2$—CH═CH—.

28. The method for manufacturing a write-once optical recording film according to claim 18, wherein the coating formation is achieved by polymerizing the polymerizable molecules to one another by irradiating light onto the polymerizable molecules.

29. The method for manufacturing a write-once optical recording film according to claim 28, wherein in the coating formation step, the irradiated light is UV light.

30. The method for manufacturing a write-once optical recording film according to claim 27, wherein functional acrylate monomers are added to the polymerizable liquid crystal molecules.

31. The method for manufacturing a write-once optical recording film according to claim 27, wherein a sensitizing agent is added to the polymerizable liquid crystal molecules.

32. The method for manufacturing a write-once optical recording film according to claim 31, wherein a substance that responds to UV light is used as the sensitizing agent.

33. The method for manufacturing a write-once optical recording film according to claim 32, wherein the substance responding to UV light comprises a —C$_6$H$_4$CO— group.

34. An optical recording medium comprising an optical recording layer on at least one surface of a medium substrate, the optical recording layer comprising:
  a chemisorptive thin film with orienting properties fixed directly or through a primer layer to a substrate surface; and
  a coating formed on a surface of the chemisorptive thin film;
  wherein the coating has an initial molecule orientation attained by aligning a group of polymerizable molecules in a predetermined direction on the surface of the chemisorptive thin film, and polymerizing the polymerizable molecules to one another; and
  wherein regions with changed initial molecule orientation and regions with unchanged initial molecule orientation of the coating are formed by selectively irradiating the coating with light that changes the initial molecule orientation, making optical information recording possible.

35. The optical recording medium according to claim 34, wherein the substrate is made of at least one of the group consisting of metal, ceramic, glass and synthetic resin.

36. The optical recording medium according to claim 34, wherein the medium substrate is made of a support substrate and a reflective layer including a metal that is layered on the substrate.

37. The optical recording medium according to claim 36, wherein the reflective layer includes aluminum.

38. The optical recording medium according to claim 36, wherein a transparent protective film is further provided on the reflective layer.

39. The optical recording medium according to claim 38, wherein the transparent protective film is an inorganic material.

40. The optical recording medium according to claim 39, wherein the inorganic material is at least one selected from the group consisting of SiO$_2$ and SiN$_x$.

41. The optical recording medium according to claim 34, wherein reflective films are formed on both sides of the substrate, and an optical recording layer is formed on the surface of both reflective films.

42. The optical recording medium according to claim 34, wherein the coating is formed on at least a portion of the chemisorptive thin film with orienting properties.

43. The optical recording medium according to claim 34, wherein the shape of the medium substrate is selected from the group consisting of disk-shaped and tape-shaped.

44. The optical recording medium according to claim 43,
  wherein the medium substrate is disk-shaped; and
  wherein the optical recording regions are arranged in a concentric ring or in a spiral shape on the medium substrate.

45. The optical recording medium according to claim 43,
  wherein the medium substrate is tape-shaped; and
  wherein a recording layer is formed, in which the optical recording regions are arranged on the medium substrate in linear groups that are parallel to a direction intersecting at a predetermined angle with the longitudinal direction of the tape.

46. A method for manufacturing an optical recording medium provided with a recording layer in which optical information can be recorded by changing an initial molecule orientation of a coating constituting the recording layer by selectively irradiating focused light, the method comprising:
  forming a chemisorptive thin film on at least one surface of a medium substrate;
  subjecting the chemisorptive thin film to an orientation treatment;
  bringing a surface of the chemisorptive thin film in contact with polymerizable molecules by applying a solution in which the polymerizable molecules have been dissolved to the surface of the chemisorptive thin film, removing the solvent, and aligning a group of the polymerizable molecules in a predetermined direction at the surface of the chemisorptive thin film with the orientation regulating force of the chemisorptive thin film; and
  forming a coating by polymerizing the polymerizable molecules to one another.

47. A method for optical recording on an optical recording medium provided with an optical recording layer on at least one surface of a substrate;
  wherein the optical recording layer comprises a chemisorptive thin film with orienting properties fixed directly or through a primer layer to the surface of the substrate, and a coating formed on a surface of the chemisorptive thin film; and
  wherein the coating has an initial molecule orientation attained by aligning a group of polymerizable molecules in a predetermined direction on the surface of the chemisorptive thin film, and polymerizing the polymerizable molecules to one another;
  the method comprising forming regions with changed initial molecule orientation and regions with unchanged initial molecule orientation of the coating by selectively irradiating the coating with light that changes the initial molecule orientation, thus recording optical information.

48. An information recording/reproducing apparatus for recording and reproducing information on a write-once optical recording medium,
  wherein the write-once optical recording medium is provided with an optical recording layer on at least one surface of a substrate;
  wherein the optical recording layer comprises a chemisorptive thin film with orienting properties fixed directly or through a primer layer to the surface of the substrate, and a coating formed on a surface of the chemisorptive thin film;

wherein the coating has an initial molecule orientation attained by aligning a group of polymerizable molecules in a predetermined direction on the surface of the chemisorptive thin film, and polymerizing the polymerizable molecules to one another; and wherein regions with changed initial molecule orientation and regions with unchanged initial molecule orientation of the coating can be formed by selectively irradiating the coating with light that changes the initial molecule orientation;

the information recording/reproducing apparatus comprising:

a signal input/output portion;

a recording light emitting portion selectively emitting recording light for writing information elements by changing the initial molecule orientation of the chemisorptive thin film constituting the recording layer, in accordance with an information signal from the signal input/output portion;

an information recording portion including said optical recording medium, on which information is recorded by irradiating the recording light emitted from the recording light emitting portion;

a reference light emitting portion for emitting reference light that does not change the initial molecule orientation of the coating constituting the recording layer, used for reproduction of information recorded on the optical recording medium of the information recording portion;

an information element detecting portion which irradiates the reference light on the optical recording medium, detects with an optical sensor an intensity change of a polarized component of reflected light, transmitted light or scattered light of the reference light, due to differences in information elements, and outputs a predetermined electrical signal to the signal input/output portion, based on the detected results;

a position control driving portion, which shifts or rotates the optical recording medium in order to selectively irradiate the recording light and the reference light on predetermined positions of the optical recording medium; and a control circuit portion for controlling the recording operation by coordinating the recording light emitting portion and the position control driving portion, and controlling the reproduction operation by coordinating the information element detecting portion and the position control driving portion.

49. The information recording/reproducing apparatus according to claim 48, wherein the reference light emitting portion emits polarized light as reference light.

50. The information recording/reproducing apparatus according to claim 48, wherein the optical sensor detects transmitted light through a polarizer.

51. A computer system, comprising:

an arithmetic processing device including a main memory;

an auxiliary recording device connected to the arithmetic processing device and serving as an auxiliary memory;

an input device connected to the arithmetic processing device;

an output device connected to the arithmetic processing device; and a control device for controlling data communication between the devices;

wherein the auxiliary recording device is an information recording/reproducing device using an optical recording medium;

wherein the optical recording medium is a write-once optical recording medium provided with an optical recording layer on at least one surface of a substrate;

wherein the optical recording layer comprises a chemisorptive thin film with orienting properties fixed directly or through a primer layer to a surface of the substrate, and a coating formed on a surface of the chemisorptive thin film;

wherein the coating has an initial molecule orientation attained by aligning a group of polymerizable molecules in a predetermined direction on the surface of the chemisorptive thin film, and polymerizing the polymerizable molecules to one another; and wherein regions with changed initial molecule orientation and regions with unchanged initial molecule orientation of the coating can be formed when selectively irradiating the coating with light that changes the initial molecule orientation;

the computer system comprising:

a signal input/output portion;

a recording light emitting portion selectively emitting recording light for writing information elements by changing and destroying the initial molecule orientation of the coating constituting the recording layer, in accordance with an information signal from the signal input/output portion;

an information recording portion including said optical recording medium, on which information is recorded by irradiating the recording light emitted from the recording light emitting portion;

a reference light emitting portion for emitting reference light that does not change the initial molecule orientation of the coating constituting the recording layer, used for reproduction of information recorded on the optical recording medium of the information recording portion;

an information element detecting portion which irradiates the reference light on the optical recording medium, detects with an optical sensor an intensity change of a polarized component of reflected light, transmitted light or scattered light of the reference light that has passed through a polarizer, due to differences in information elements, and outputs a predetermined electrical signal to the signal input/output portion, based on the detected results;

a position control driving portion, which shifts or rotates the optical recording medium in order to selectively irradiate the recording light and the reference light on predetermined positions of the optical recording medium; and a control circuit portion for controlling the recording operation by coordinating the recording light emitting portion and the position control driving portion, and controlling the reproduction operation by coordinating the information element detecting portion and the position control driving portion.

52. A video signal recording/reproducing system, comprising:

a video signal input/output control device controlling the input source and the output destination of a video signal;

a video recording/reproducing device connected to the video signal input/output control device;

a video output device connected to the video signal input/output control device; and a control command input device for sending input/output control commands to the video signal input/output control device, connected to the video signal input/output control device;

wherein the video recording/reproducing device is an information recording/reproducing device using an optical recording medium;

wherein the optical recording medium is a write-once optical recording medium provided with an optical recording layer on at least one surface of a substrate;

wherein the optical recording layer comprises a chemisorptive thin film with orienting properties fixed directly or through a primer layer to a surface of the substrate, and a coating formed on a surface of the chemisorptive thin film;

wherein the coating has an initial molecule orientation attained by aligning a group of polymerizable molecules in a predetermined direction on the surface of the chemisorptive thin film, and polymerizing the polymerizable molecules to one another; and wherein regions with changed initial molecule orientation and regions with unchanged initial molecule orientation of the coating can be formed when selectively irradiating the coating with light that changes the initial molecule orientation;

the video signal recording/reproducing system comprising:

a signal input/output portion;

a recording light emitting portion selectively emitting recording light for writing information elements by changing and destroying the initial molecule orientation of the coating constituting the recording layer, in accordance with an information signal from the signal input/output portion;

an information recording portion including said optical recording medium, on which information is recorded by irradiating the recording light emitted from the recording light emitting portion;

a reference light emitting portion for emitting reference light that does not change the initial molecule orientation of the coating constituting the recording layer, used for reproduction of information recorded on the optical recording medium of the information recording portion;

an information element detecting portion which irradiates the reference light on the optical recording medium, detects with an optical sensor an intensity change of a polarized component of reflected light, transmitted light or scattered light of the reference light that has passed through a polarizer, due to differences in information elements, and outputs a predetermined electrical signal to the signal input/output portion, based on the detected results;

a position control driving portion, which shifts or rotates the optical recording medium in order to selectively irradiate the recording light and the reference light on predetermined positions of the optical recording medium; and a control circuit portion for controlling the recording operation by coordinating the recording light emitting portion and the position control driving portion, and controlling the reproduction operation by coordinating the information element detecting portion and the position control driving portion.

53. A write-once optical recording film, comprising a thin film made of chemisorptive molecules fixed directly or through a primer layer to a substrate surface by covalent bonding;

wherein optical information can be recorded on the thin film by irradiating light to degrade the molecules at the irradiated portions.

54. The write-once optical recording film according to claim 53, wherein the degradation is carried out by cleaving certain bonds in the molecules.

55. The write-once optical recording film according to claim 53, wherein the thin film comprises molecules having a photodegradable functional group.

56. The write-once optical recording film according to claim 55, wherein the photodegradable functional group undergoes a photodegradation reaction under UV light.

57. The write-once optical recording film according to claim 56, wherein the photodegradable functional group undergoing a photodegradation reaction under UV light is at least one functional group selected from the group consisting of a benzophenone residue, a benzyldimethylketal residue and a 1-hydroxy-cyclohexyl-phenylketone residue.

58. The write-once optical recording film according to claim 53, wherein the thin film comprises molecules including a thermally degradable functional group.

59. The write-once optical recording film according to claim 58, wherein the thermally degradable functional group is at least one selected from the group consisting of a benzoin residue and a benzopinacole residue.

60. The write-once optical recording film according to claim 53, wherein the molecules constituting the thin film have a straight-chain or rod-shaped molecular backbone, comprise at one end at least one functional group selected from the group consisting of thermally degradable functional groups and photodegradable functional groups, and that functional group at the one molecule end is oriented in a direction away from the substrate surface.

61. A method for manufacturing a write-once optical recording film, which comprises a thin film made of chemisorptive molecules fixed by covalent bonds directly or through a primer layer to a substrate surface, wherein optical information can be recorded on the thin film by irradiating light to degrade the molecules at the irradiated portions;

the method comprising bringing a chemisorptive compound including a chemisorptive group and a functional group that degrades when irradiated with light in contact with a substrate or a primer layer including active hydrogen at its surface to cause an elimination reaction between the chemisorptive group and the active hydrogen, and fixing the chemisorptive compound by covalent bonding directly or through a primer layer to a substrate surface.

62. The method for manufacturing a write-once optical recording film according to claim 61, wherein, to bring the chemisorptive compound in contact with the substrate or the primer layer, the chemisorptive compound is mixed into a non-aqueous organic solvent to form a chemisorptive solution, which is then brought into contact with the substrate or the primer layer.

63. The method for manufacturing a write-once optical recording film according to claim 61, wherein the functional group that degrades when irradiated with light is a photodegradable functional group or a thermally degradable functional group.

64. The method for manufacturing a write-once optical recording film according to claim 61, wherein the chemisorptive group is at least one functional group selected from the group consisting of halosilyl groups, alkoxysilyl groups and isocyanatosilyl groups.

65. The method for manufacturing a write-once optical recording film according to claim 61, wherein the active hydrogen is hydrogen that is included in at least one functional group selected from the group consisting of —OH, —COOH, —CHO, —NH$_2$ and >NH.

66. The method for manufacturing a write-once optical recording film according to claim 61, wherein the substrate including the functional hydrogen at the surface is at least one substrate selected from the group consisting of glass, ceramic, metal and synthetic resin.

67. The method for manufacturing a write-once optical recording film according to claim 61, wherein the primer layer is at least one film selected from the group consisting of a silica film and a silicon nitride film.

68. The method for manufacturing a write-once optical recording film according to claim 61, wherein after fixing the chemisorptive molecules by covalent bonding directly or through the primer layer to the substrate surface, a monomolecular layer is formed by rinsing with a non-aqueous organic solvent.

69. An optical recording medium including a write-once optical recording film which comprises a substrate and a thin film made of chemisorptive molecules fixed by covalent bonds directly or through a primer layer to one or both sides of the substrate, in which optical information can be recorded;
wherein the optical recording film can be optically recorded by irradiating light to degrade the molecules at the irradiated portions.

70. The write-once optical recording medium according to claim 69, wherein the degradation is performed by cleaving certain bonds in the molecules.

71. The write-once optical recording medium according to claim 69, wherein the optical recording film comprises molecules including a photodegradable functional group or a thermally degradable functional group.

72. The write-once optical recording medium according to claim 69, wherein the molecules constituting the recording film have a straight-chain or rod-shaped molecular backbone, comprise at one end at least one functional group selected from thermally degradable functional groups and photodegradable functional groups, and that functional group at the one molecule end is oriented in a direction away from the substrate surface.

73. The write-once optical recording medium according to claim 69, wherein the substrate is an optically reflective substrate or an optically transmissive substrate.

74. The write-once optical recording medium according to claim 73, wherein the substrate is an optically reflective substrate, or a substrate on one or both sides of which an optically reflective film is formed.

75. The write-once optical recording medium according to claim 74, wherein the optically reflective film comprises aluminum.

76. The write-once optical recording medium according to claim 69, wherein the substrate comprises an optically transmissive thin film on its uppermost surface.

77. The write-once optical recording medium according to claim 76, wherein the optically transmissive thin film is at least one thin film selected from the group consisting of silica films and silicon nitride films.

78. The write-once optical recording medium according to claim 73, wherein the substrate is at least one substrate selected from the group consisting of optically transmissive substrates and substrates that have an optically transmissive thin film formed on one or both sides of the substrates.

79. The write-once optical recording medium according to claim 78, wherein the optically transmissive thin film is at least one thin film selected from the group consisting of a silica film and a silicon nitride film.

80. The write-once optical recording medium according to claim 69, wherein the optical recording film comprises a plurality of information recording unit regions on which one information element can be written, depending on whether the film constituting molecules are degraded or non-degraded.

81. The write-once optical recording medium according to claim 80, wherein the information recording unit regions are dot-shaped.

82. The write-once optical recording medium according to claim 69, wherein the substrate shape is at least one selected from the group consisting of disk-shaped, tape-shaped and card-shaped.

83. The write-once optical recording medium according to claim 82, wherein the substrate is disk-shaped, and the information recording unit regions of the optical recording film are aligned in concentric circular groups or in a spiral shape.

84. The write-once optical recording medium according to claim 82, wherein the substrate is tape-shaped or card-shaped, and the information recording unit regions of the optical recording film are aligned in parallel linear groups that form a predetermined angle with a longitudinal direction of the substrate.

85. A method for manufacturing a write-once optical recording medium, which comprises a substrate and a thin film made of chemisorptive molecules fixed by covalent bonds directly or through a primer layer to one or both sides of the substrate, wherein optical information can be recorded in the thin film by irradiating light to degrade the molecules at the irradiated portions;
the method comprising bringing a chemisorptive compound including a chemisorptive group and a functional group that degrades when irradiated with light in contact with a substrate or a primer layer including active hydrogen at its surface to cause an elimination reaction between the chemisorptive group and the active hydrogen, and fixing the chemisorptive compound by covalent bonding directly or through a primer layer to the substrate surface.

86. A method for recording/reproducing information on a write-once optical recording medium, which comprises a substrate and a thin film made of chemisorptive molecules fixed by covalent bonds directly or through a primer layer to one or both sides of the substrate, wherein optical information can be recorded in the thin film by irradiating light to degrade the molecules at the irradiated portions, comprising:
a recording step of recording information by irradiating recording light on the optical recording film to degrade the irradiated portions into degraded portions, and by combining the degraded portions and non-degraded portions; and
a reproduction step of reproducing information by irradiating reproduction light on the degraded portions and the non-degraded portions and detecting a difference in the optical intensity after the light has reached the degraded portions and the non-degraded portions.

87. The method for recording/reproducing information on a write-once optical recording medium according to claim 86, wherein the recording step comprises a step of sequentially irradiating recording light onto the optical recording film, and sequentially forming degraded portions corresponding to the irradiated portions.

88. The method for recording/reproducing information on a write-once optical recording medium according to claim 86, wherein in the recording step, a light-blocking member provided with light-passing portions corresponding to irradiated portions on the optical recording film, or a light-passing member provided with light-blocking portions corresponding to the portions other than the irradiated portions on the optical recording film is placed in opposition to the optical recording film, recording light is irradiated via this member onto the optical recording film, and the degraded portions corresponding to the irradiated portions are formed all together.

89. The method for recording/reproducing information on a write-once optical recording medium according to claim 86, wherein the degradation is carried out by cleaving certain bonds in the molecules.

90. The method for recording/reproducing information on a write-once optical recording medium according to claim 86, wherein the degraded portions are formed by photodegradation or thermal degradation due to irradiation of light.

91. The method for recording/reproducing information on a write-once optical recording medium according to claim 86, wherein the recording light is UV light.

92. The method for recording/reproducing information on a write-once optical recording medium according to claim 86, wherein the reproduction light is infrared light or visible light.

93. The method for recording/reproducing information on a write-once optical recording medium according to claim 86, wherein a diameter of the recording light is smaller than a diameter of the reproduction light.

94. An apparatus for recording/reproducing information on a write-once optical recording medium, which comprises a substrate and a thin film made of chemisorptive molecules fixed by covalent bonds directly or through a primer layer to one or both sides of the substrate, wherein optical information can be recorded in the thin film by irradiating light to degrade the molecules at the irradiated portions, the apparatus comprising:

a signal input/output means for input/output of information signals of information converted into electrical signals and operation command signals to/from an external device;

a recording light irradiation means for irradiating recording light in order to degrade the molecules constituting the optical recording film, in accordance with an information signal from the signal input/output means;

a reproduction light irradiation means for irradiating reproduction light that does not degrade the molecules constituting the optical recording film, used for reproduction of information recorded on the optical recording medium of the information recording portion;

an information element detecting means which detects an intensity of reflected light or transmitted light after the reproduction light has reached the optical recording film, and outputs a predetermined electrical signal to the signal input/output means, based on the detected results;

an optical recording medium driving means for irradiating the recording light or the reproduction light onto a predetermined position of the optical recording film; and a control circuit means for controlling the recording operation by coordinating the recording light irradiation means and the optical recording medium driving means, and controlling the reproduction operation by coordinating the reproduction light irradiation means, the optical recording medium driving means and the information element detecting means.

95. The apparatus for recording/reproducing information according to claim 94, wherein the degradation is carried out by cleaving certain bonds in the molecules.

96. The apparatus for recording/reproducing information according to claim 94, wherein a wavelength of the light irradiated from the recording light irradiation means is different from a wavelength of the light irradiated from the reproduction light irradiation means.

97. The apparatus for recording/reproducing information according to claim 94, wherein the recording light irradiation means is a UV light irradiation portion.

98. The apparatus for recording/reproducing information according to claim 94, wherein the reproduction light irradiation means is a visible light irradiation portion or an infrared irradiation portion.

99. The apparatus for recording/reproducing information according to claim 94, wherein a diameter of the light irradiated by the recording light irradiation means is smaller than a diameter of the light irradiated by the reproduction light irradiation means.

100. The apparatus for recording/reproducing information according to claim 94, wherein a power density of the reproducing light is smaller than a power density of the recording light.

* * * * *

UNITED STATES PATENT AND TRADEMARK OFFICE
CERTIFICATE OF CORRECTION

PATENT NO. : 6,686,017 B2
DATED : February 3, 2004
INVENTOR(S) : Ogawa

It is certified that error appears in the above-identified patent and that said Letters Patent is hereby corrected as shown below:

Drawings,
Sheet 2 of 15, Fig. 2A, the formula in the legend of Fig. 2A,
"White bars represent
$C_6H_5$-CH-CO-$C_6H_4$-O-$(CH_2)_6$-O-" should read
-- White bars represent
$C_6H_5$-CH=CO-$C_6H_4$-O-$(CH_2)_6$-O- --

Column 59,
Line 2, "–OCO–, –C=C–," should read -- –OCO–, –C≡C–, --

Signed and Sealed this

Tenth Day of May, 2005

JON W. DUDAS
*Director of the United States Patent and Trademark Office*